United States Patent
Harada

(10) Patent No.: US 10,527,829 B2
(45) Date of Patent: Jan. 7, 2020

(54) VARIABLE MAGNIFICATION OPTICAL SYSTEM, OPTICAL APPARATUS, AND METHOD FOR MANUFACTURING VARIABLE MAGNIFICATION OPTICAL SYSTEM

(71) Applicant: Nikon Corporation, Minato-ku, Tokyo (JP)

(72) Inventor: Hiroki Harada, Zushi (JP)

(73) Assignee: Nikon Corporation, Tokyo (JP)

(*) Notice: Subject to any disclaimer, the term of this patent is extended or adjusted under 35 U.S.C. 154(b) by 104 days.

(21) Appl. No.: 15/545,702

(22) PCT Filed: Jan. 29, 2016

(86) PCT No.: PCT/JP2016/052683
§ 371 (c)(1),
(2) Date: Dec. 9, 2017

(87) PCT Pub. No.: WO2016/121939
PCT Pub. Date: Aug. 4, 2016

(65) Prior Publication Data
US 2018/0136444 A1 May 17, 2018

(30) Foreign Application Priority Data
Jan. 30, 2015 (JP) .................... 2015-017916

(51) Int. Cl.
*G02B 15/177* (2006.01)
*G02B 27/64* (2006.01)
(Continued)

(52) U.S. Cl.
CPC .......... *G02B 15/177* (2013.01); *G02B 13/18* (2013.01); *G02B 15/20* (2013.01); *G02B 27/646* (2013.01); *G03B 5/00* (2013.01)

(58) Field of Classification Search
CPC ...... G02B 15/177; G02B 13/18; G02B 15/20; G02B 27/646; G03B 5/00
(Continued)

(56) References Cited

U.S. PATENT DOCUMENTS 5,477,297 A * 12/1995 Suzuki ................. G02B 15/173
348/E5.046
5,502,594 A * 3/1996 Suzuki .................. G02B 15/17
359/557
(Continued)

FOREIGN PATENT DOCUMENTS

JP 11-231220 A 8/1999
JP 2004-061679 A 2/2004
(Continued)

OTHER PUBLICATIONS

Office Action dated Nov. 28, 2017 in Japanese Patent Application No. 2016-572188.
(Continued)

*Primary Examiner* — Frank G Font
(74) *Attorney, Agent, or Firm* — Shapiro, Gabor and Rosenberger, PLLC

(57) ABSTRACT

A variable magnification optical system includes: a first lens group (G1) having a negative refractive power; a second lens group (G2) having a positive refractive power; an intermediate group (Gn) disposed closer to an image side than the second lens group (G2); and a vibration-reduction lens group (VR) disposed closer to the image side than the intermediate group (Gn) and configured to be movable so as to have a component in a direction orthogonal to an optical axis. The system performs varying magnification by changing at least the distance between the first lens group (G1) and the second lens group (G2) and the distance between the second lens group (G2) and the intermediate group (Gn), and the system satisfies Conditional Expression (1).

$$1.000 < f(1 \sim Gn) t / ft < 100.000 \quad (1)$$

13 Claims, 38 Drawing Sheets

(51) Int. Cl.
*G02B 13/18* (2006.01)
*G02B 15/20* (2006.01)
*G03B 5/00* (2006.01)

(58) Field of Classification Search
USPC ........................................................ 359/432
See application file for complete search history.

(56) References Cited

U.S. PATENT DOCUMENTS

| | | | | |
|---|---|---|---|---|
| 5,585,966 | A * | 12/1996 | Suzuki | G02B 15/173 359/554 |
| 5,642,224 | A * | 6/1997 | Suzuki | G02B 15/17 359/554 |
| 5,760,957 | A * | 6/1998 | Suzuki | G02B 15/173 359/554 |
| 5,841,588 | A * | 11/1998 | Suzuki | G02B 15/17 359/683 |
| 5,940,631 | A * | 8/1999 | Hirano | G03B 17/00 396/55 |
| 6,025,962 | A * | 2/2000 | Suzuki | G02B 15/173 359/557 |
| 7,907,350 | B2 * | 3/2011 | Mitsuki | G02B 27/646 359/557 |
| 10,209,499 | B2 * | 2/2019 | Shibata | G02B 15/20 |
| 2004/0218274 | A1 * | 11/2004 | Aoki | G02B 15/173 359/557 |
| 2005/0219708 | A1 * | 10/2005 | Shibayama | G02B 15/173 359/686 |
| 2006/0072213 | A1 * | 4/2006 | Shibayama | G02B 27/646 359/692 |
| 2007/0195425 | A1 * | 8/2007 | Arai | G02B 15/173 359/687 |
| 2007/0206294 | A1 | 9/2007 | Kanai | |
| 2009/0086321 | A1 * | 4/2009 | Mizuguchi | G02B 15/173 359/557 |
| 2010/0165480 | A1 | 7/2010 | Yamaguchi et al. | |
| 2010/0214658 | A1 * | 8/2010 | Ito | G02B 15/173 359/557 |
| 2012/0026589 | A1 | 2/2012 | Tanaka et al. | |
| 2012/0069441 | A1 | 3/2012 | Fujimoto et al. | |
| 2012/0188436 | A1 | 7/2012 | Ozaki | |
| 2012/0229902 | A1 | 9/2012 | Matsumura | |
| 2014/0028891 | A1 | 1/2014 | Otake et al. | |
| 2014/0211082 | A1 | 7/2014 | Imaoka | |
| 2014/0362259 | A1 * | 12/2014 | Yamada | G02B 15/22 348/240.3 |
| 2015/0153550 | A1 | 6/2015 | Yamaguchi et al. | |
| 2018/0196223 | A1 * | 7/2018 | Umeda | G02B 15/20 |

FOREIGN PATENT DOCUMENTS

| | | |
|---|---|---|
| JP | 2004-246043 A | 9/2004 |
| JP | 2007-233045 A | 9/2007 |
| JP | 2008-216881 A | 9/2008 |
| JP | 2010-152145 A | 7/2010 |
| JP | 2011-215600 A | 10/2011 |
| JP | 2012-198505 A | 10/2012 |
| JP | 2012-247687 A | 12/2012 |
| JP | 2013-064912 A | 4/2013 |
| JP | 2014-026169 A | 2/2014 |
| JP | 2014-160229 A | 9/2014 |
| WO | WO 2011/145288 A1 | 11/2011 |
| WO | WO 2014/025015 A1 | 2/2014 |

OTHER PUBLICATIONS

Extended European Search Report dated Oct. 8, 2018, in European Patent Application No. 16743542.9.
Decision of Refusal dated Sep. 4, 2018, in Japanese Patent Application No. 2016-572188.
International Search Report from International Patent Application No. PCT/JP2016/052683, dated Apr. 26, 2016.
Written Opinion of the International Searching Authority from International Patent Application No. PCT/JP2016/052683, dated Apr. 26, 2016.
Office Action dated May 5, 2019, in Chinese Patent Application No. 201680016761.3.
Office Action dated Oct. 8, 2019 in Japanese Patent Application No. 2018-226455.

* cited by examiner (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a) 
LATERAL ABERRATION (b) 
LATERAL ABERRATION (c) 
LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION

VARIABLE MAGNIFICATION OPTICAL SYSTEM, OPTICAL APPARATUS, AND METHOD FOR MANUFACTURING VARIABLE MAGNIFICATION OPTICAL SYSTEM

TECHNICAL FIELD

The present invention relates to a variable magnification optical system, an optical apparatus, and a method for manufacturing the variable magnification optical system.

Priority is claimed on Japanese Patent Application No. 2015-017916, filed Jan. 30, 2015, the content of which is incorporated herein by reference.

TECHNICAL BACKGROUND

Conventionally, a variable magnification optical system having a wide angle of view including a camera shake compensation mechanism has been proposed (for example, see Patent Document 1).

RELATED ART DOCUMENTS

Patent Document
Patent Document 1:
Japanese Patent Application, Publication No. H11-231220

SUMMARY OF INVENTION

Technical Problem

In recent years, there has been increasing demand for a variable magnification optical system which has a satisfactory optical performance and has a brighter F-value.

Solution to Problem

According to an aspect of the present invention, there is provided a variable magnification optical system including: a first lens group having a negative refractive power; a second lens group having a positive refractive power; an intermediate group disposed closer to an image side than the second lens group; and a vibration-reduction lens group disposed closer to the image side than the intermediate group and configured to be movable so as to have a component in a direction orthogonal to an optical axis, wherein the system performs varying magnification by changing at least the distance between the first lens group and the second lens group and the distance between the second lens group and the intermediate group, and the system satisfies the following conditional expression.

$$1.000 < f(1 \sim Gn) t/ft < 100.000$$

where
f(1~Gn)t: a composite focal length from the first lens group to the intermediate group in a telephoto end state
ft: a focal length of the entire system in the telephoto end state According to another aspect of the present invention, there is provided a variable magnification optical system including, in order from an object: a first lens group having a negative refractive power; a second lens group having a positive refractive power, the first and second lens groups; an n-th lens group which is disposed closer to the image side than the second lens group, of which the position in the direction orthogonal to an optical axis is fixed, and which has negative refractive power; and a vibration-reduction lens group disposed closer to the image side than the n-th lens group and configured to be movable so as to have a component in the direction orthogonal to the optical axis, wherein the system performs varying magnification by changing at least the distance between the first lens group and the second lens group and the distance between the second lens group and the n-th lens group, and the system satisfies the following conditional expression.

$$1.000 < f(1 \sim Gn) t/ft < 100.000$$

where
f(1~Gn)t: a composite focal length from the first lens group to the n-th lens group in a telephoto end state
ft: a focal length of the entire system in the telephoto end state According to another aspect of the present invention, there is provided an optical apparatus having the above-described variable magnification optical system mounted thereon.

According to another aspect of the present invention, there is provided a method for manufacturing a variable magnification optical system, wherein the variable magnification optical system includes: a first lens group having a negative refractive power; a second lens group having a positive refractive power; an intermediate group disposed closer to an image side than the second lens group; and a vibration-reduction lens group disposed closer to the image side than the intermediate group and configured to be movable so as to have a component in a direction orthogonal to an optical axis, wherein the system performs varying magnification by changing at least the distance between the first lens group and the second lens group and the distance between the second lens group and the intermediate group, and wherein the method includes arranging the respective lenses in a lens barrel so as to satisfy the following conditional expression.

$$1.000 < f(1 \sim Gn) t/ft < 100.000$$

where
f(1~Gn)t: a composite focal length from the first lens group to the intermediate group in a telephoto end state
ft: a focal length of the entire system in the telephoto end state According to another aspect of the present invention, there is provided a method for manufacturing a variable magnification optical system, wherein the variable magnification optical system includes, in order from an object: a first lens group having a negative refractive power; a second lens group having a positive refractive power, the first and second lens groups; an n-th lens group which is disposed closer to the image side than the second lens group, of which the position in the direction orthogonal to an optical axis is fixed, and which has negative refractive power; and a vibration-reduction lens group disposed closer to the image side than the n-th lens group and configured to be movable so as to have a component in the direction orthogonal to the optical axis, wherein the system performs varying magnification by changing at least the distance between the first lens group and the second lens group and the distance between the second lens group and the n-th lens group, and wherein the method includes arranging the respective lens groups in a lens barrel so as to satisfy the following conditional expression.

$$1.000 < f(1 \sim Gn) t/ft < 100.000$$

where f(1~Gn)t: a composite focal length from the first lens group to the n-th lens group in a telephoto end state ft: a focal length of the entire system in the telephoto end state

DESCRIPTION OF EMBODIMENTS

Figure 1:
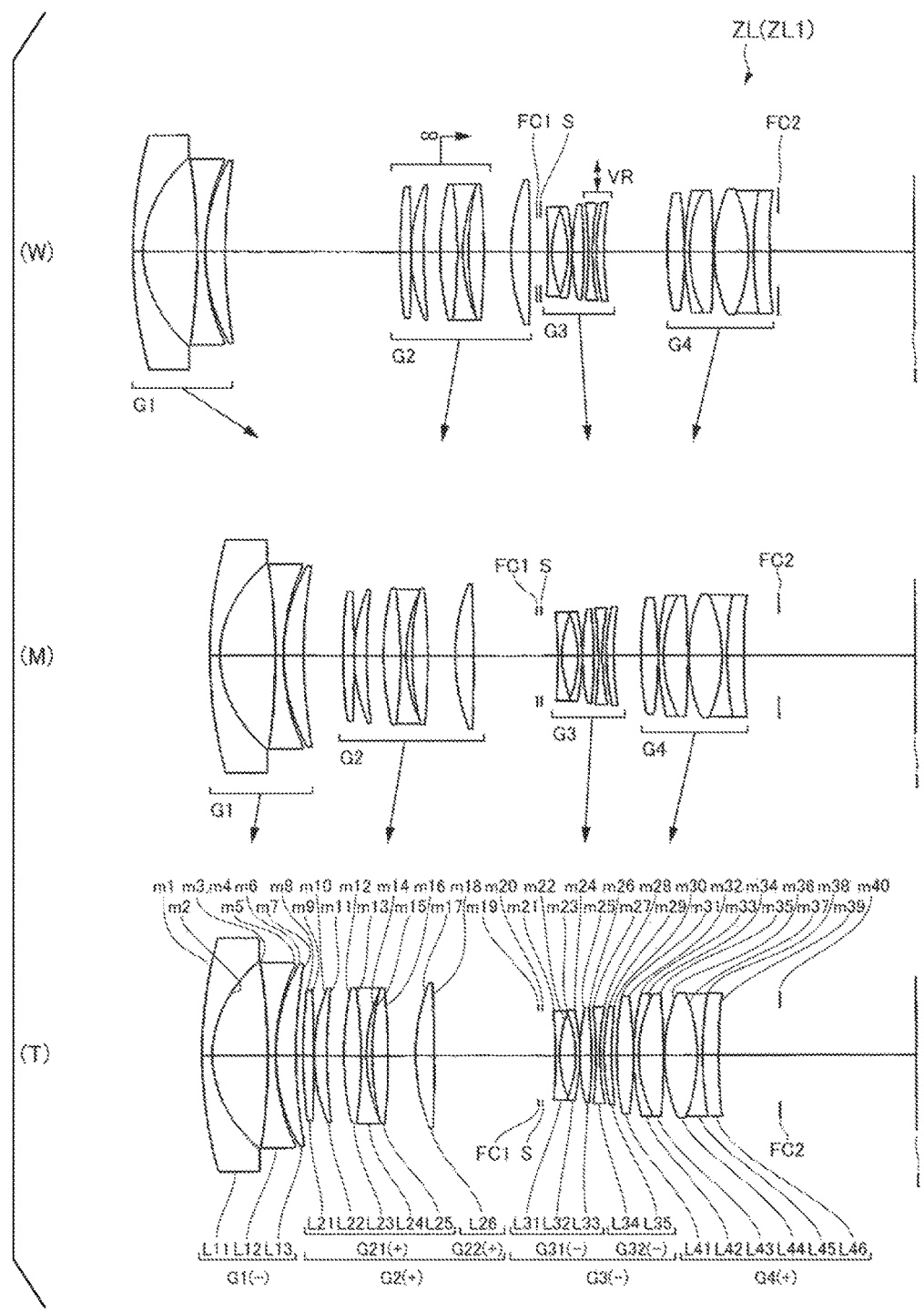
FIG. 1 is a cross-sectional view of a variable magnification optical system according to Example 1, wherein parts (W), (M), and (T) are in a wide-angle end state, an intermediate focal length state, and a telephoto end state, respectively.

An embodiment will now be described with reference to the drawings. FIG. 1 illustrates an example of a configuration of a variable magnification optical system (variable power optical system) ZL. In other examples, the number of lens groups, a lens configuration of each lens group, and the like can be changed appropriately.

In an embodiment, a variable magnification optical system ZL includes a first lens group G1 having a negative refractive power, a second lens group G2 having a positive refractive power, and an intermediate group (an n-th lens group) disposed closer to an image side than the second lens group G2, the system including a vibration-reduction lens group VR disposed closer to the image side than the intermediate group Gn and configured to be moveable so as to have component in a direction orthogonal to an optical axis, the system performing varying magnification (varying power) by changing at least the distance between the first lens group G1 and the second lens group G2 and the distance between the second lens group G2 and the intermediate group Gn. In an example, the position of the intermediate group Gn in the direction orthogonal to the optical axis is immovable, and the intermediate group Gn has a negative refractive power.

In Example 1 illustrated in FIG. 1, the intermediate group Gn of which the position in the direction orthogonal to the optical axis is immovable and which has negative refractive power and the vibration-reduction lens group VR disposed at an image-side of the intermediate group correspond to a 31st lens group G31 and a 32nd lens group G32, respectively. In Examples 2, 3, 5, and 7 to 11 to be described later, the intermediate group Gn and the vibration-reduction lens group VR disposed at an image-side of the intermediate group correspond to a 31st lens group G31 and a 32nd lens group G32, respectively. In Examples 4, 6, and 12, the intermediate group Gn and the vibration-reduction lens group VR disposed at an image-side of the intermediate group correspond to a fourth lens group G4 and a fifth lens group G5.

The vibration-reduction lens group VR preferably has negative refractive power.

As described above, the variable magnification optical system ZL has lens groups having negative, positive, negative, and positive refractive power or negative, positive, negative, positive, and positive refractive power and changes at least the distances between these lens groups. Therefore, it is possible to implement a variable magnification optical system having a wide angle of view. Moreover, the variable magnification optical system ZL includes the intermediate group Gn having a negative refractive power and the vibration-reduction lens group VR (having a negative refractive power) disposed at an image-side of the intermediate group, and the vibration-reduction lens group VR is moved so as to have a component in the direction orthogonal to the optical axis to perform image blur correction. Therefore, it is possible to suppress the occurrence of eccentric coma aberration (decentering coma aberration) and one-sided blur during image blur correction and to obtain satisfactory imaging performance.

The variable magnification optical system ZL satisfies Conditional Expression (1) below.

$$1.000 < f(1 \sim Gn)t/ft < 100.000 \qquad (1)$$

where f(1~Gn)t: a composite focal length from the first lens group G1 to the intermediate group Gn in a telephoto end state ft: a focal length of the entire system in the telephoto end state Conditional Expression (1) is a conditional expression for restoring incident light converged by the first lens group G1 and the second lens group G2 to light (approximately afocal light) substantially parallel to the optical axis using the intermediate group Gn and guiding the light toward the vibration-reduction lens group VR to thereby improve a vibration-reduction performance. When Conditional Expression (1) is satisfied, it is possible to secure a bright F-value of approximately F2.8 to F3.5 and to correct aberrations including spherical aberration satisfactorily.

If the imaging magnification exceeds the upper limit value of Conditional Expression (1), the power of the intermediate group Gn is too large, the correction of aberrations such as spherical aberration by the intermediate group Gn is insufficient, and it is difficult to obtain a variable magnification ratio (variable power ratio) of approximately 3 or higher In order to obtain the effect reliably, it is preferable that the upper limit value of Conditional Expression (1) is set to 50.000. In order to obtain the effect more reliably, it is preferable that the upper limit value of Conditional Expression (1) is set to 25.000.

If the imaging magnification is smaller than the lower limit value of Conditional Expression (1), strong convergent light enters the vibration-reduction lens group VR, and it is difficult to suppress the occurrence of eccentric coma aberration in the telephoto end state during image blur correction and the occurrence of one-sided blur in the wide-angle end state. As a result, it is difficult to set the F-value to be as bright as approximately F2.8 to F3.5. In some cases, the occurrence of spherical aberration becomes severe, and it may be difficult to obtain a satisfactory imaging performance.

In order to obtain the effect reliably, it is preferable that the lower limit value of Conditional Expression (1) is set to 1.500. In order to obtain the effect more reliably, it is preferable that the lower limit value of Conditional Expression (1) is set to 2.000.

Preferably, the variable magnification optical system ZL satisfies Conditional Expression (2) below.

$$1.360 < -f(Gn \sim G(VR))w/fw < 5.000 \qquad (2)$$

where f(Gn~G(VR))w: a composite focal length from the intermediate group Gn to the vibration-reduction lens group VR in the wide-angle end state fw: a focal length of the entire system in the wide-angle end state Conditional Expression (2) is a conditional expression for obtaining a variable magnification ratio of approximately 3 and a satisfactory optical performance by appropriately setting the composite focal length in the wide-angle end state, of the intermediate group Gn and the vibration-reduction lens group VR. When Conditional Expression (2) is satisfied, it is possible to secure a bright F-value of approximately F2.8 to F3.5 and to correct aberrations including spherical aberration satisfactorily.

If the focal length ratio exceeds the upper limit value of Conditional Expression (2), a composite refractive power of the intermediate group Gn and the vibration-reduction lens group VR becomes too small and it is difficult to secure a variable magnification ratio of approximately 3 in the entire system. As a result, it is necessary for the second lens group G2 or other groups to perform varying magnification, and consequently, correction of spherical aberration or coma aberration is insufficient.

In order to obtain the effect reliably, it is preferable that the upper limit value of Conditional Expression (2) is set to 4.000. In order to obtain the effect more reliably, it is preferable that the upper limit value of Conditional Expression (2) is set to 3.000.

If the focal length ratio is smaller than the lower limit value of Conditional Expression (2), the composite refractive power of the intermediate group Gn and the vibration-reduction lens group VR is too large and it is difficult to correct spherical aberration and coma aberration. As a result, it is difficult to obtain a satisfactory imaging performance while obtaining a bright F-value of approximately F2.8 to F3.5.

In order to obtain the effect reliably, it is preferable that the lower limit value of Conditional Expression (2) is set to 1.400. In order to obtain the effect more reliably, it is preferable that the lower limit value of Conditional Expression (2) is set to 1.450.

Preferably, the variable magnification optical system ZL includes an image-side lens group RP having the strongest positive refractive power among the lens groups having a positive refractive power disposed closer to the image side than the vibration-reduction lens group VR, the distance between the image-side lens group RP and the vibration-reduction lens group VR changes upon varying magnification, and preferably, Conditional Expression (3) below is satisfied.

$$0.400 < f(RP)/f(FP) < 2.000 \qquad (3)$$

where f(RP): a focal length of the image-side lens group RP f(FP): a composite focal length in the wide-angle end state, of lenses disposed closer to the image plane side than the first lens group G1 and disposed closer to the object side than the intermediate group Gn Conditional Expression (3) is a conditional expression for obtaining a variable magnification ratio of approximately 3 and a satisfactory optical performance by appropriately setting the refractive power of the image-side lens group RP. When Conditional Expression (3) is satisfied, it is possible to secure a bright F-value of approximately F2.8 to F3.5 and to correct aberrations including spherical aberration satisfactorily.

When the focal length ratio exceeds the upper limit value of Conditional Expression (3), varying magnification by the image-side lens group RP is insufficient and it is difficult to secure a variable magnification ratio of approximately 3 in the entire system. As a result, it is necessary to cause the second lens group G2 or other groups to perform varying magnification, and consequently, correction of spherical aberration or coma aberration is insufficient.

In order to obtain the effect reliably, it is preferable that the upper limit value of Conditional Expression (3) is set to 1.800. In order to obtain the effect more reliably, it is preferable that the upper limit value of Conditional Expression (3) is set to 1.700.

If the focal length ratio is smaller than the lower limit value of Conditional Expression (3), the refractive power of the image-side lens group RP is too large and it is difficult to correct spherical aberration and coma aberration. As a result, it is difficult to obtain a satisfactory imaging performance while obtaining a bright F-value of approximately F2.8 to F3.5.

In order to obtain the effect reliably, it is preferable that the lower limit value of Conditional Expression (3) is set to 0.500. In order to obtain the effect more reliably, it is preferable that the lower limit value of Conditional Expression (3) is set to 0.600.

In the variable magnification optical system ZL, it is preferable that the intermediate group Gn has one or more positive lens components and one or more negative lens components.

The "lens component" refers to a single lens or a cemented lens.

Due to this configuration, it is possible to satisfactorily correct the spherical aberration and the coma aberration using the intermediate group Gn and to improve a vibration-reduction performance. When the intermediate group Gn includes any one of the lens components, correction of spherical aberration and coma aberration by the intermediate group Gn is insufficient, and it is necessary to cause the vibration-reduction lens group VR to correct these aberrations. As a result, the occurrence of eccentric coma aberration or one-sided blur occurring during image blur correction is greater, and it is difficult to maintain a satisfactory imaging performance during image blur correction.

In order to obtain the effect reliably, it is more preferable that the intermediate group Gn has at least two negative lens components and one or more positive lens components.

In the variable magnification optical system ZL, it is preferable that the second lens group G2 has at least four lens components.

Due to this configuration, it is possible to satisfactorily correct spherical aberration and coma aberration using the second lens group G2 and to improve a vibration-reduction performance. When the second lens group G2 has three or fewer lens components, since correction of spherical aberration and coma aberration by the second lens group G2 is insufficient, it is necessary to cause the intermediate group Gn to correct these aberrations. As a result, the occurrence of eccentric coma aberration or one-sided blur occurring during image blur correction is greater, and it is difficult to maintain a satisfactory imaging performance during image blur correction.

In order to obtain the effect reliably, it is preferable that the second lens group G2 has five or more lens components.

In the variable magnification optical system ZL, it is preferable that the second lens group G2 is constituted by, in order from the object, a 21st lens group G21 having a positive refractive power and a 22nd lens group G22 having a positive refractive power, and preferably, focusing from an object at infinity to an object at a close distance is performed by moving the 21st lens group G21 to the image side as a focusing lens group.

Due to this configuration, it is possible to decrease the size and the weight of the lens group that moves upon focusing and to decrease the size of an entire lens system and accelerate the focusing speed during autofocus.

The variable magnification optical system ZL preferably satisfies Conditional Expression (4) below.

$$10.00°<\omega t<30.00° \quad (4)$$

where

ωt: a half-angle of view in the telephoto end state

Conditional Expression (4) is a condition that determines the value of a half-angle of view in the telephoto end state.

When Conditional Expression (4) is satisfied, it is possible to obtain a desired angle of view and to satisfactorily correct coma aberration, distortion, and a curvature of field.

In order to obtain the effect reliably, it is preferable that the upper limit value of Conditional Expression (4) is set to 27.00°. In order to obtain the effect more reliably, it is preferable that the upper limit value of Conditional Expression (4) is set to 24.00°.

In order to obtain the effect reliably, it is preferable that the lower limit value of Conditional Expression (4) is set to 11.00°. In order to obtain the effect more reliably, it is preferable that the lower limit value of Conditional Expression (4) is set to 12.00°.

The variable magnification optical system ZL preferably satisfies Conditional Expression (5) below.

$$30.00°<\omega w<50.00° \quad (5)$$

where

ωw: a half-angle of view in the wide-angle end state

Conditional Expression (5) is a condition that specifies the value of a half-angle of view in the wide-angle end state. When Conditional Expression (5) is satisfied, it is possible to obtain a desired angle of view and to satisfactorily correct coma aberration, distortion, and a curvature of field.

In order to obtain the effect reliably, it is preferable that the upper limit value of Conditional Expression (5) is set to 48.00°. In order to obtain the effect more reliably, it is preferable that the upper limit value of Conditional Expression (5) is set to 45.00°.

In order to obtain the effect reliably, it is preferable that the lower limit value of Conditional Expression (5) is set to 32.00°. In order to obtain the effect more reliably, it is preferable that the lower limit value of Conditional Expression (5) is set to 34.00°.

In the variable magnification optical system ZL, the distance between the 21st lens group G21 and the 22nd lens group G22 may be fixed or variable upon varying magnification.

In the variable magnification optical system ZL, the distance between the intermediate group Gn and the vibration-reduction lens group VR may be fixed or variable upon varying magnification. When the distance is fixed, it is preferable that the composite refractive power of the intermediate group Gn and the vibration-reduction lens group VR is negative.

In the variable magnification optical system ZL, it is preferable that an optical system constituted by lenses disposed closer to the image side than the vibration-reduction lens group VR has a positive refractive power.

The variable magnification optical system ZL preferably has at least one lens group having a positive refractive power on a side closer to the image side than the vibration-reduction lens group VR.

The variable magnification optical system ZL preferably has an aperture stop between the second lens group G2 and the intermediate group Gn.

In this way, it is possible to implement a variable magnification optical system ZL which has a bright F-value and a wide angle of view and in which aberrations are corrected satisfactorily.

Figure 37:
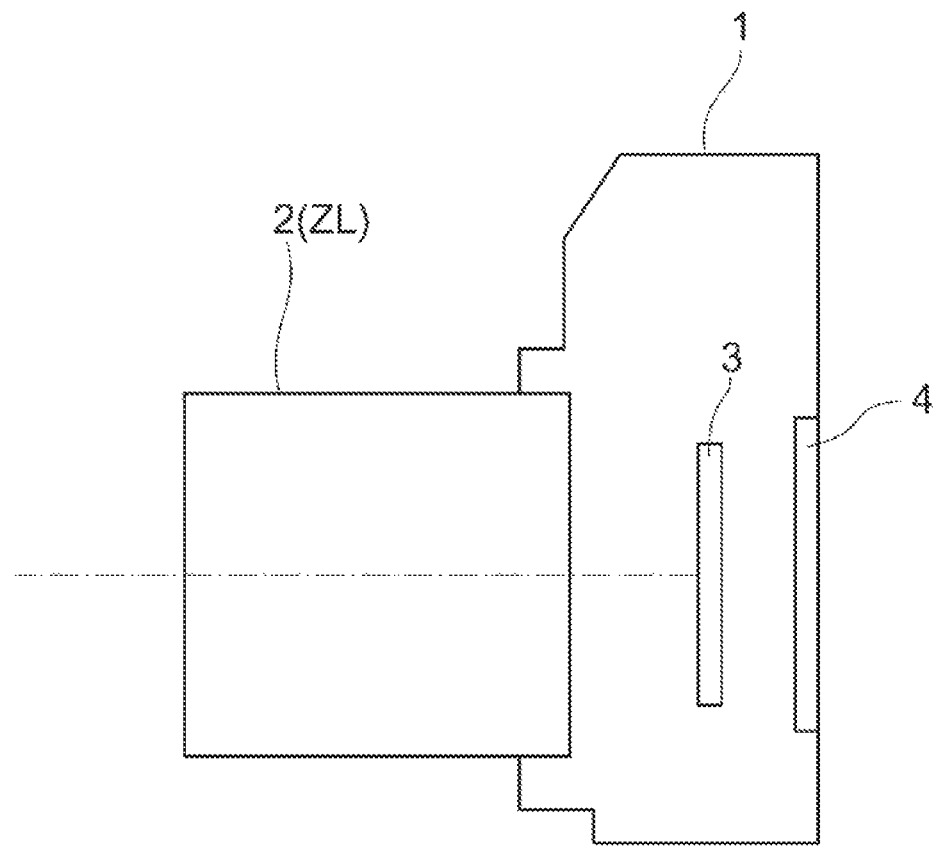
FIG. 37 is a diagram illustrating an example of a configuration of a camera having a variable magnification optical system mounted thereon.

Next, a camera (an optical apparatus) having the above-described variable magnification optical system ZL will be described with reference to the drawings. FIG. 37 illustrates an example of a configuration of a camera having a variable magnification optical system mounted thereon.

As illustrated in FIG. 37, a camera 1 is an interchangeable lens camera (so-called a mirrorless camera) having the above-described variable magnification optical system ZL as an image capturing lens 2. In this camera 1, light from an object (a subject) which is not illustrated is collected by the image capturing lens 2 and forms a subject image on an image plane of the imaging unit 3 via an optical low-pass filter (OLPF) which is not illustrated. The subject image is photoelectrically converted by a photoelectric conversion element provided in the imaging unit 3, whereby the image of the object is generated. This image is displayed on an electronic viewfinder (EVF) 4 provided in the camera 1. In this way, a photographer can view the subject via the EVF 4. Moreover, when a release button (not illustrated) is pressed by the photographer, the image of the subject generated by the imaging unit 3 is stored in a memory (not illustrated). In this way, the photographer can capture the image of the subject using the camera 1.

As can be understood from respective examples to be described later, the variable magnification optical system ZL mounted on the camera 1 as the image capturing lens 2 has a bright F-value and a wide angle of view and has a satisfactory optical performance such that aberrations are corrected satisfactorily due to its characteristic lens configuration. Therefore, according to the camera 1, it is possible to implement an optical apparatus which has a bright F-value and a wide angle of view and has a satisfactory optical performance such that aberrations are corrected satisfactorily.

Although a mirrorless camera has been described as an example of the camera 1, the camera is not limited to this. For example, the same effect as the camera 1 can be obtained even when the above-described variable magnification optical system ZL is mounted on a single-lens reflex camera which has a quick return mirror on a camera body and views a subject using a finder optical system.

Figure 38:
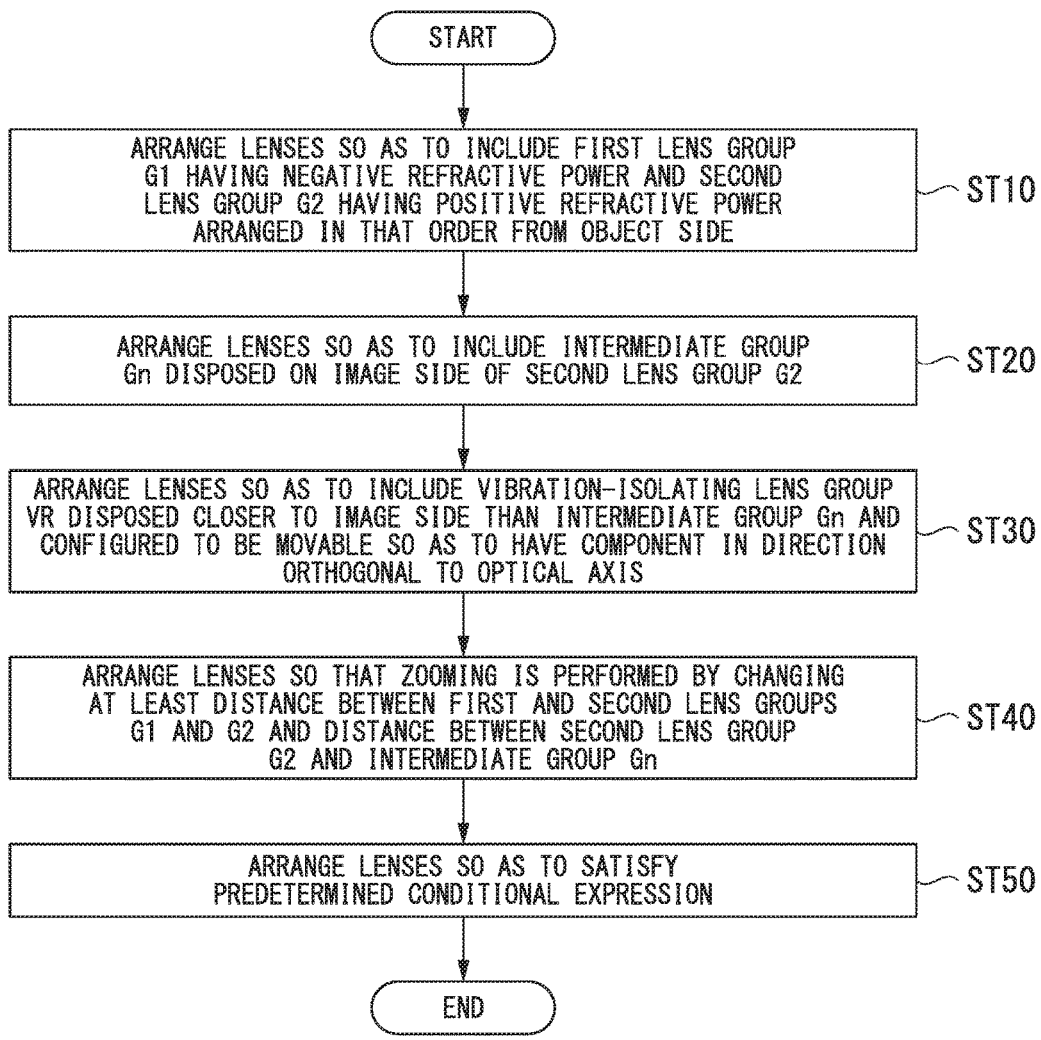
FIG. 38 is a diagram illustrating an outline of an example of a method for manufacturing a variable magnification optical system.

Next, an example of a method for manufacturing the above-described variable magnification optical system ZL will be described. FIG. 38 illustrate an example of a method for manufacturing the variable magnification optical system ZL.

First, respective lenses are arranged in a lens barrel so as to include a first lens group G1 having a negative refractive power and a second lens group G2 having a positive refractive power (step ST10). Respective lenses are arranged so as to have an intermediate group Gn disposed closer to an image side than the second lens group G2 (step ST20). Respective lenses are arranged so as to have a vibration-reduction lens group VR disposed closer to the image side than the intermediate group Gn and configured to be movable so as to have a component in the direction orthogonal to the optical axis (step ST30). Respective lenses are arranged so that varying magnification is performed by changing at least the distance between the first lens group G1 and the second lens group G2 and the distance between the second lens group G2 and the intermediate group Gn (step ST40). The respective lenses are arranged so as to satisfy Conditional Expression (1) below (step ST50).

$$1.000 < f(1 \sim Gn)t/ft < 100.000 \quad (1)$$

where f(1~Gn)t: a composite focal length from the first lens group G1 to the intermediate group Gn in a telephoto end state ft: a focal length of the entire system in the telephoto end state According to an example of a lens arrangement, as illustrated in FIG. 1, a negative meniscus lens L11 having a concave surface oriented toward an image side, a biconcave lens L12, and a positive meniscus lens L13 having a convex surface oriented toward the object side are arranged, in order from the object, to form the first lens group G1. A biconvex lens L21, a positive meniscus lens L22 having a convex surface oriented toward the object side, a cemented lens including a biconvex lens L23 and a biconcave lens L24, and a biconvex lens L25 are arranged, in order from the object, to form the 21st lens group G21. A biconvex lens L26 is arranged to form the 22nd lens group G22. A biconcave lens L31, a negative meniscus lens L32 having a concave surface oriented toward the object side, and a biconvex lens L33 are arranged, in order from the object, to form the 31st lens group G31. A biconcave lens L34 and a positive meniscus lens L35 having a convex surface oriented toward the object side are arranged, in order from the object, to form the 32nd lens group G32. A biconvex lens L41, a cemented lens including a negative meniscus lens L42 having a concave surface oriented toward the image side and a biconvex lens L43, and a cemented lens including a biconvex lens L44, a biconcave lens L45, and a positive meniscus lens L46 having a convex surface oriented toward the object side are, in order from the object, to form the fourth lens group G4. The respective lens groups prepared in this manner are arranged in the above-described order to manufacture the variable magnification optical system ZL.

According to the above-described manufacturing method, it is possible to manufacture the variable magnification optical system ZL which has a bright F-value and a wide angle of view and in which aberrations are corrected satisfactorily.

EXAMPLES

Hereinafter, respective examples will be described with reference to the drawings.

FIGS. 1, 4, 7, 10, 13, 16, 19, 22, 25, 28, 31, and 34 are cross-sectional views illustrating the configuration and the refractive power allocation of variable magnification optical systems ZL (ZL1 to ZL12) according to respective examples. In the lower part of the cross-sectional views of the variable magnification optical systems ZL1 to ZL12, the moving directions along the optical axis of each lens group upon varying magnification from the wide-angle end state (W) to the telephoto end state (T) via the intermediate focal length state (M) are indicated by arrows. In the upper part of the cross-sectional views of the variable magnification optical systems ZL1 to ZL13, the moving direction of the focusing lens group upon focusing from an object at infinity to an object at a close distance is indicated by an arrow and the state of the vibration-reduction lens group VR when correcting image blur is also illustrated.

Respective reference signs in FIG. 1 associated with Example 1 are used independently in respective examples in order to avoid complication of description due to an increased number of reference sign characters. Therefore, even when components in diagrams associated with other examples are denoted by the same reference signs as used in FIG. 1, these components do not necessarily have the same configuration as those of other examples.

Tables 1 to 12 illustrated below are tables of respective specifications of Examples 1 to 12.

In the respective examples, the d-line (wavelength: 587.562 nm) and the g-line (wavelength: 435.835 nm) are selected as an aberration characteristics calculation target.

In [Lens Specification] in tables, a surface number indicates a sequence number of an optical surface from an object side along a traveling direction of light, R indicates a radius of curvature of each optical surface, D indicates a surface distance which is the distance on the optical axis from each optical surface to the next optical surface (or an image plane), nd indicates a refractive index for the d-line, of a material of an optical member, νd indicates the Abbe number for the d-line, of a material of an optical member, and Aperture stop indicates an aperture stop S. When the radius of curvature is "0.00000," this indicates a flat surface for a lens surface and indicates an aperture or a diaphragm surface for an aperture stop. When the optical surface is an aspherical surface, a mark "*" is assigned to the surface number and a paraxial radius of curvature is shown in the radius of curvature column R.

In [Aspheric Data] in tables, the shape of an aspherical surface shown in [Lens Specification] is expressed by Equation (a) below. X(y) indicates the distance along the optical axis direction from a tangential plane at the vertex of an aspherical surface to a position on the aspherical surface at a height y, R indicates a radius of curvature (a paraxial radius of curvature) of a reference spherical surface, κ indicates a conic constant, and Ai indicates an aspheric coefficient at degree i. "E-n" indicates "×10$^{-n}$". For example, 1.234E−05=1.234×10$^{-5}$. An aspheric coefficient A2 at degree 2 is 0 and is not illustrated.

$$X(y)=(y^2/R)/\{1+(1-\kappa\times y^2/R^2)^{1/2}\}+A4\times y^4+A6\times y^6+A8\times y^8+A10\times y^{10}+A12\times y^{12} \quad (a)$$

In [Various Data] in tables, f indicates a focal length of an entire lens system, FNo indicates the F-number, ω indicates a half-angle of view (unit: °), Y indicates the maximum image height, TL indicates the distance from the frontmost lens surface to the last lens surface on the optical axis upon focusing on infinity, BF indicates the distance from the last lens surface to the image plane I on the optical axis upon focusing on infinity, and BF (air-conversion length) indicates the distance (an air-conversion length) from the last lens surface to the image plane I on the optical axis upon focusing on infinity.

In [Variable Distance Data] in tables, DO indicates an axial air distance between an object plane and a lens surface closest to an object, of the first lens group G1, Di indicates a surface distance (i=1, 2, 3, . . . ) between an i-th surface and an (i+1)th surface, and f indicates the focal length of an entire lens system.

In [Lens Group Data] in tables, a starting surface and a focal length of each lens group are illustrated.

In [Focusing Data] in tables, a lens moving distance and an imaging distance upon focusing are illustrated.

In [Conditional Expression Correspondence Values] in tables, values corresponding to Conditional Expressions (1) to (5) are illustrated.

Hereinafter, "mm" is generally used as the unit of the focal length f, the radius of curvature R, the surface distance D, and other lengths and the like described in all specification values unless particularly stated otherwise. However, the unit is not limited to this since an equivalent optical performance is obtained even when the optical system is proportionally expanded or reduced. Moreover, the unit is not limited to "mm" and other appropriate units may be used.

The above description of tables is common to all examples, and description thereof will not be provided below.

Example 1

Example 1 will be described with reference to FIGS. 1 to 3 and Table 1. As illustrated in FIG. 1, a variable magnification optical system ZL (ZL1) according to Example 1 is constituted by, in order from an object, a first lens group G1 having a negative refractive power, a second lens group G2 having a positive refractive power, a third lens group G3 having a negative refractive power, and a fourth lens group G4 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 is constituted by, in order from the object, a 21st lens group G21 (a focusing lens group) having a positive refractive power and a 22nd lens group G22 having a positive refractive power.

The 21st lens group G21 is constituted by, in order from the object, a biconvex lens L21, a positive meniscus lens L22 having a convex surface oriented toward the object side, a cemented lens including a biconvex lens L23 and a biconcave lens L24, and a biconvex lens L25. The 22nd lens group G22 is constituted by a biconvex lens L26.

The third lens group G3 is constituted by, in order from the object, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31, a negative meniscus lens L32 having a concave surface oriented toward the object side, and a biconvex lens L33. The 32nd lens group G32 is constituted by, in order from the object, a biconcave lens L34 and a positive meniscus lens L35 having a convex surface oriented toward the object side.

The fourth lens group G4 is constituted by, in order from the object, a biconvex lens L41, a cemented lens including a negative meniscus lens L42 having a concave surface oriented toward the image side and a biconvex lens L43, and a cemented lens including a biconvex lens L44, a biconcave lens L45, and a positive meniscus lens L46 having a convex surface oriented toward the object side. The biconvex lens L41 has an aspherical object-side surface. The positive meniscus lens L46 has an aspherical image-side surface.

A first flare-cut diaphragm FC1 and an aperture stop S arranged in that order from the object are disposed between the second lens group G2 and the third lens group G3. A second flare-cut diaphragm FC2 is disposed between the fourth lens group G4 and the image plane I.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the image side and then moving the same toward the object side, and moving the fourth lens group G4 toward the object side such that the distances between the respective lens groups are changed. The first flare-cut diaphragm FC1, the aperture stop S, and the second flare-cut diaphragm FC2 are immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is κ, in order to correct rotation blur of angle θ, the vibration-reduction lens group VR (a moving lens group) for image blur correction may be moved in the direction orthogonal to the optical axis by (f×tan θ)/K.

In Example 1, in the wide-angle end state, since the vibration reduction coefficient is −0.45 and the focal length is 24.80 mm, the moving distance of the vibration-reduction lens group VR for correcting the rotation blur of 0.30° is −0.29 mm. In the intermediate focal length state, since the vibration reduction coefficient is −0.51 and the focal length is 50.01 mm, the moving distance of the vibration-reduction lens group VR for correcting the rotation blur of 0.30° is −0.51 mm. In the telephoto end state, since the vibration reduction coefficient is −0.58 and the focal length is 67.85 mm, the moving distance of the vibration-reduction lens group VR for correcting the rotation blur of 0.30° is −0.61 mm.

Table 1 illustrates the values of respective specifications of Example 1. Surface numbers 1 to 40 in Table 1 correspond to optical surfaces of m1 to m40 illustrated in FIG. 1.

TABLE 1

[Lens Specification]

| Surface number | R | D | n(d) | vd |
|---|---|---|---|---|
| 1 | 121.85638 | 2.900 | 1.74389 | 49.5 |
| *2 | 29.63670 | 15.360 | 1.00000 | |
| *3 | −197.50816 | 0.200 | 1.56093 | 36.6 |
| 4 | −169.39125 | 2.100 | 1.80400 | 46.6 |
| 5 | 60.51496 | 0.150 | 1.00000 | |
| 6 | 52.85097 | 5.600 | 2.00100 | 29.1 |
| 7 | 146.47986 | D7 | 1.00000 | |
| 8 | 148.41161 | 3.000 | 1.59349 | 67.0 |
| 9 | −517.10678 | 0.100 | 1.00000 | |
| 10 | 49.87002 | 3.500 | 1.59349 | 67.0 |
| 11 | 157.35190 | 4.762 | 1.00000 | |
| 12 | 87.49334 | 4.800 | 1.59349 | 67.0 |
| 13 | −132.22400 | 1.500 | 1.90366 | 31.3 |
| 14 | 45.76622 | 1.640 | 1.00000 | |
| 15 | 78.93526 | 4.450 | 1.77250 | 49.6 |
| 16 | −176.75459 | D16 | 1.00000 | |
| 17 | 57.14809 | 5.300 | 1.81600 | 46.6 |
| 18 | −583.40702 | D18 | 1.00000 | |
| 19 | 0.00000 | 1.200 | 1.00000 | |
| 20 | (Aperture stop) | D20 | 1.00000 | |
| 21 | −141.85186 | 1.200 | 1.80400 | 46.6 |
| 22 | 33.20059 | 4.360 | 1.00000 | |
| 23 | −33.72704 | 1.200 | 1.60300 | 65.4 |
| 24 | −60.09530 | 0.100 | 1.00000 | |
| 25 | 65.48868 | 3.150 | 1.84666 | 23.8 |
| 26 | −127.25009 | D26 | 1.00000 | |
| 27 | −119.24441 | 1.100 | 1.59349 | 67.0 |
| 28 | 67.70394 | 1.150 | 1.00000 | |
| 29 | 62.36800 | 2.100 | 1.80518 | 25.5 |
| 30 | 107.42000 | D30 | 1.00000 | |
| *31 | 119.87584 | 4.700 | 1.55332 | 71.7 |
| 32 | −115.00129 | 0.100 | 1.00000 | |
| 33 | 71.95116 | 1.400 | 1.83481 | 42.7 |
| 34 | 38.48800 | 6.800 | 1.59319 | 67.9 |
| 35 | −237.01429 | 0.280 | 1.00000 | |
| 36 | 43.00799 | 9.500 | 1.49782 | 82.6 |
| 37 | −42.99900 | 1.400 | 1.80518 | 25.5 |
| 38 | 98.94100 | 4.600 | 1.69350 | 53.3 |
| *39 | 462.40647 | D39 | 1.00000 | |
| 40 | 0.00000 | D40 | 1.00000 | |

TABLE 1-continued

[Aspheric Data]

2nd surface

κ = 0.00000e+00
A4 = 2.21510e−06
A6 = 2.57690e−09
A8 = −6.01500e−12
A10 = 1.09200e−14
A12 = −7.29000e−18

3rd surface

κ = 1.00000e+00
A4 = −3.83430e−07
A6 = 7.93340e−10
A8 = −3.53630e−12
A10 = 5.08120e−15
A12 = −3.43370e−18

31st surface

κ = 1.00000e+00
A4 = 4.80890e−06
A6 = 5.06980e−10
A8 = −2.73140e−12
A10 = −7.78150e−16
A12 = 0.00000e+00

39th surface

κ = 1.00000e+00
A4 = 7.56540e−06
A6 = −9.88600e−10
A8 = 5.61740e−12
A10 = −8.07750e−15
A12 = 0.00000e+00

[Various Data]

| | W | M | T |
|---|---|---|---|
| f | 24.80 | 50.01 | 67.85 |
| FNo | 2.92 | 2.92 | 2.92 |
| ω | 42.5 | 22.7 | 17.2 |
| Y | 21.60 | 21.60 | 21.60 |
| TL | 220.251 | 198.419 | 200.827 |
| BF | 41.035 | 48.522 | 55.686 |
| BF (air-conversion length) | 41.035 | 48.522 | 55.686 |

[Variable Distance Data]

Focusing on infinity

| | W | M | T |
|---|---|---|---|
| D0 | ∞ | ∞ | ∞ |
| Magnification | — | — | — |
| f | 24.80 | 50.01 | 67.85 |
| D7 | 48.945 | 10.930 | 1.902 |
| D16 | 7.735 | 7.735 | 7.735 |
| D18 | 1.802 | 17.931 | 29.439 |
| D20 | 2.088 | 4.668 | 3.620 |
| D26 | 1.250 | 1.250 | 1.250 |
| D30 | 17.692 | 7.680 | 1.492 |
| D39 | 2.530 | 10.000 | 17.180 |
| D40 | 38.505 | 38.522 | 38.506 |

[Lens Group Data]

| Lens group | Starting surface | Focal length |
|---|---|---|
| 1st lens group | 1 | −38.47 |
| 2nd lens group | 8 | 42.49 |
| 21st lens group | 8 | 78.58 |
| 22nd lens group | 17 | 64.02 |
| 3rd lens group | 21 | −39.26 |
| 31st lens group | 21 | −65.76 |
| 32nd lens group | 27 | −121.07 |
| 4th lens group | 31 | 48.95 |

TABLE 1-continued

[Focusing Data]

|  | W | M | T |
|---|---|---|---|
| Lens moving distance | 6.735 | 6.735 | 6.735 |
| Imaging distance (m) | 0.4183 | 0.3810 | 0.3966 |

[Conditional Expression Correspondence Values]

| Conditional Expression (1) | f(1~Gn)t/ft = 10.118 |
|---|---|
| Conditional Expression (2) | −f(Gn~G(VR))w/fw = 1.583 |
| Conditional Expression (3) | f(RP)/f(FP) = 1.152 |
| Conditional Expression (4) | ωt = 17.2 |
| Conditional Expression (5) | ωw = 42.5 |

It can be understood from Table 1 that the variable magnification optical system ZL1 according to Example 1 satisfies Conditional Expressions (1) to (5).

Figure 2:
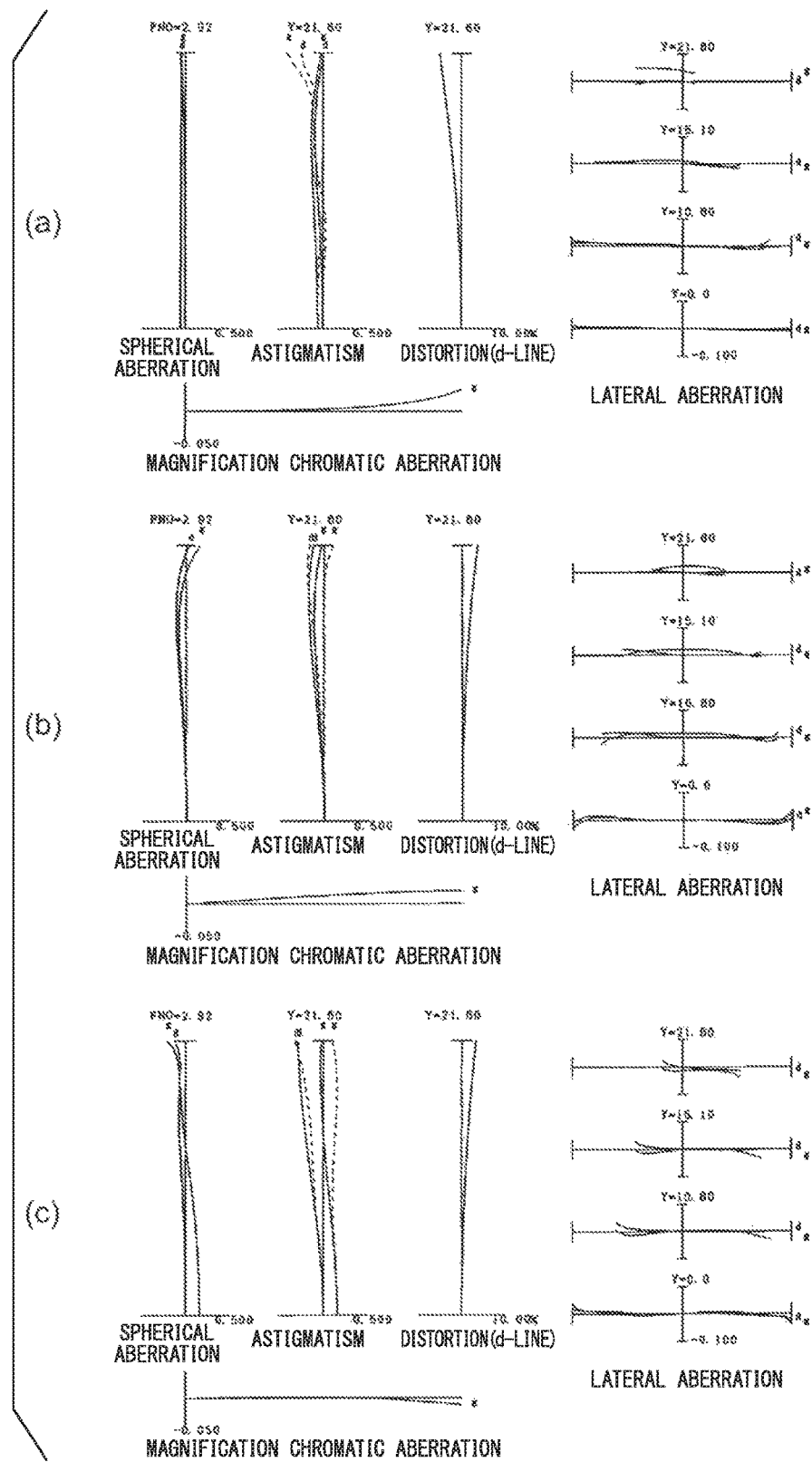
FIG. 2 shows graphs illustrating various aberrations of the variable magnification optical system according to Example 1 upon focusing on infinity, wherein parts (a), (b), and (c) are in the wide-angle end state, the intermediate focal length state, and the telephoto end state, respectively.
Figure 3:
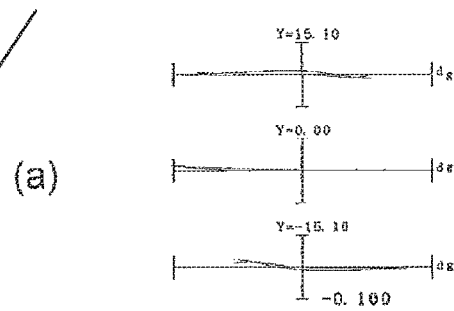
FIG. 3 shows graphs illustrating lateral aberrations of the variable magnification optical system according to Example 1 after image blur correction was performed upon focusing on infinity, wherein parts (a), (b), and (c) are in the wide-angle end state, the intermediate focal length state, and the telephoto end state, respectively.
Figure 3:
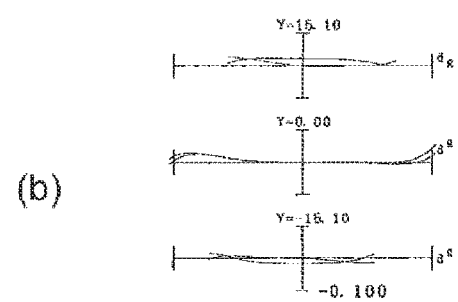
Figure 3:
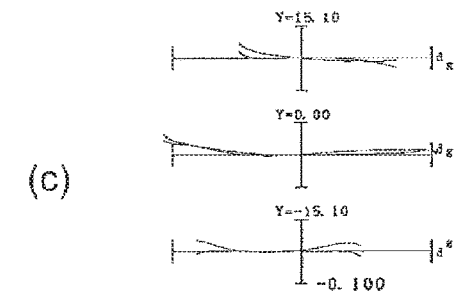

FIG. 2 shows graphs illustrating various aberrations (spherical aberration, astigmatism, distortion, magnification chromatic aberration (lateral chromatic aberration), and lateral aberration) upon focusing on infinity, of the variable magnification optical system ZL1 according to Example 1, in which part (a) illustrates the wide-angle end state, part (b) illustrates the intermediate focal length state, and part (c) illustrates the telephoto end state. FIG. 3 shows graphs illustrating lateral aberration of the variable magnification optical system ZL1 according to Example 1 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 3.

In the graphs illustrating respective aberrations, FNO indicates the F-number and Y indicates an image height. d indicates aberration at the d-line and g indicates aberration at the g-line. Moreover, aberrations without these characters indicate aberrations at the d-line. In the graphs illustrating the spherical aberration upon focusing on infinity, the F-number values corresponding to the maximum aperture are illustrated. In the graphs illustrating the astigmatism, a solid line indicates the sagittal image plane and a broken line indicates the meridional image plane. The same reference symbols as in this example are used in the aberration graphs of respective examples to be described later.

As is obvious from respective aberration graphs, it can be understood that the variable magnification optical system ZL1 according to Example 1 has a satisfactory optical performance such that aberrations are satisfactorily corrected in states ranging from the wide-angle end state to the telephoto end state. Moreover, it can be understood that the variable magnification optical system ZL1 has an excellent imaging performance upon image blur correction.

Example 2

Figure 4:
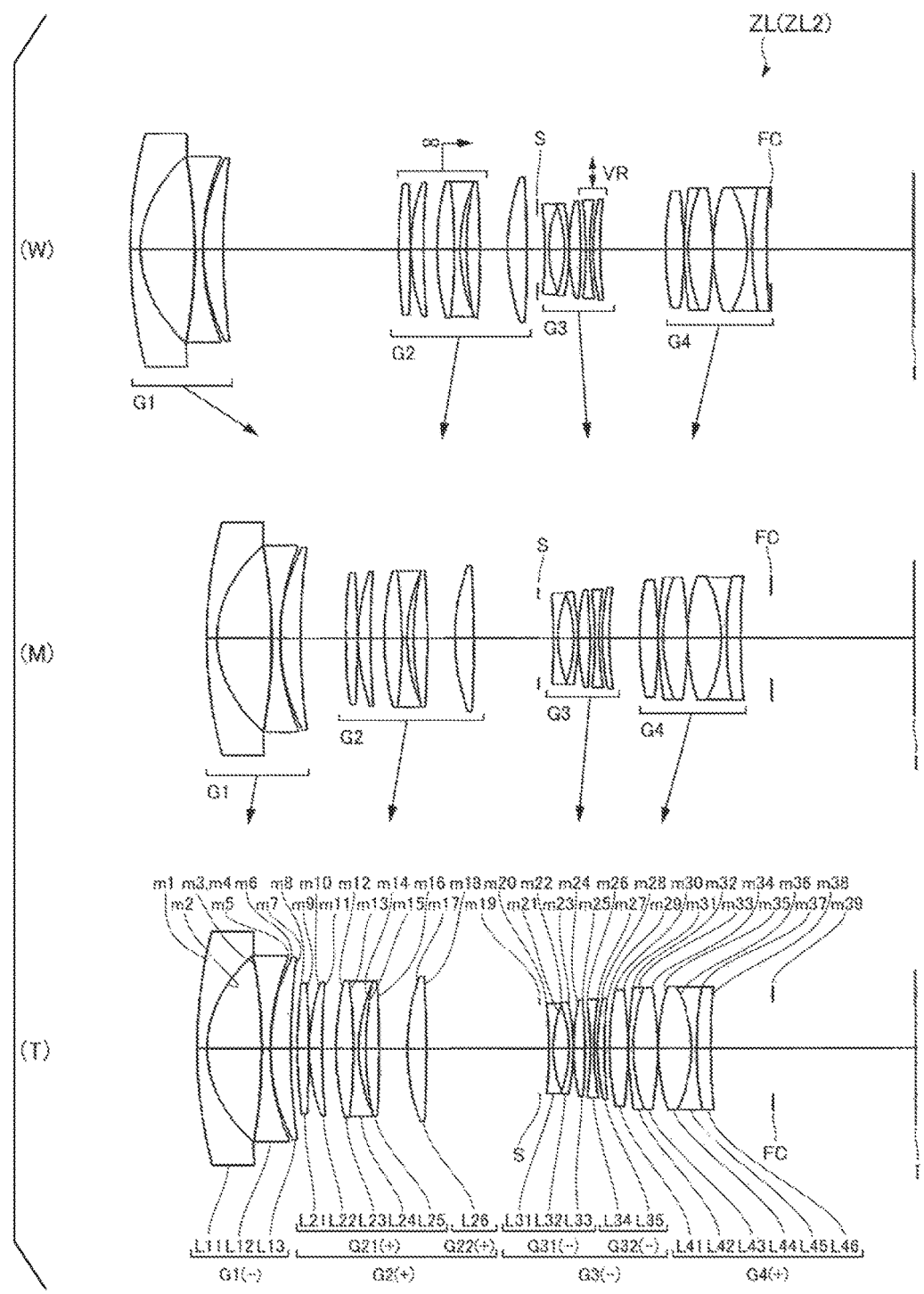
FIG. 4 is a cross-sectional view of a variable magnification optical system according to Example 2, wherein parts (W), (M), and (T) are in a wide-angle end state, an intermediate focal length state, and a telephoto end state, respectively.

Example 2 will be described with reference to FIGS. 4 to 6 and Table 2. As illustrated in FIG. 4, a variable magnification optical system ZL (ZL2) according to Example 2 is constituted by, in order from an object, a first lens group G1 having a negative refractive power, a second lens group G2 having a positive refractive power, a third lens group G3 having a negative refractive power, and a fourth lens group G4 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 is constituted by, in order from the object, a 21st lens group G21 (a focusing lens group) having a positive refractive power and a 22nd lens group G22 having a positive refractive power.

The 21st lens group G21 is constituted by, in order from the object, a biconvex lens L21, a positive meniscus lens L22 having a convex surface oriented toward the object side, a cemented lens including a biconvex lens L23 and a biconcave lens L24, and a biconvex lens L25. The 22nd lens group G22 is constituted by a biconvex lens L26.

The third lens group G3 is constituted by, in order from the object, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31, a negative meniscus lens L32 having a concave surface oriented toward the object side, and a biconvex lens L33. The 32nd lens group G32 is constituted by, in order from the object, a biconcave lens L34 and a positive meniscus lens L35 having a convex surface oriented toward the object side. The biconcave lens L34 has an aspherical object-side surface.

The fourth lens group G4 is constituted by, in order from the object, a biconvex lens L41, a cemented lens including a negative meniscus lens L42 having a concave surface oriented toward the image side and a biconvex lens L43, and a cemented lens including a biconvex lens L44, a biconcave lens L45, and a positive meniscus lens L46 having a convex surface oriented toward the object side. The biconvex lens L41 has an aspherical object-side surface. The positive meniscus lens L46 has an aspherical image-side surface.

An aperture stop S is disposed between the second lens group G2 and the third lens group G3. A flare-cut diaphragm FC is disposed between the fourth lens group G4 and the image plane I.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the image side and then moving the same toward the object side, and moving the fourth lens group G4 toward the object side such that the distances between the respective lens groups are changed. The aperture stop S and the flare-cut diaphragm FC are immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 2, in the wide-angle end state, since the vibration reduction coefficient is −0.44 and the focal length is 24.80 mm, the moving distance of the vibration-reduction lens group VR for correcting the rotation blur of 0.30° is −0.30 mm. In the intermediate focal length state, since the vibration reduction coefficient is −0.50 and the focal length is 47.76 mm, the moving distance of the vibration-reduction lens group VR for correcting the rotation blur of 0.30° is −0.50 mm. In the telephoto end state, since the vibration reduction coefficient is −0.58 and the focal length is 67.85 mm, the moving distance of the vibration-reduction lens group VR for correcting the rotation blur of 0.30° is −0.62 mm.

Table 2 illustrates the values of respective specifications of Example 2. Surface numbers 1 to 39 in Table 2 correspond to optical surfaces of m1 to m39 illustrated in FIG. 4.

TABLE 2

[Lens Specification]

| Surface number | R | D | n(d) | νd |
|---|---|---|---|---|
| 1 | 123.86834 | 2.900 | 1.74389 | 49.5 |
| *2 | 29.53373 | 15.066 | 1.00000 | |
| *3 | −163.51331 | 0.300 | 1.56093 | 36.6 |
| 4 | −139.86223 | 2.100 | 1.80400 | 46.6 |
| 5 | 65.45825 | 0.150 | 1.00000 | |
| 6 | 56.53091 | 5.625 | 2.00100 | 29.1 |
| 7 | 182.99126 | D7 | 1.00000 | |
| 8 | 143.07855 | 3.200 | 1.59349 | 67.0 |
| 9 | −394.38588 | 0.200 | 1.00000 | |
| 10 | 55.12400 | 3.500 | 1.59349 | 67.0 |
| 11 | 197.46867 | 3.900 | 1.00000 | |
| 12 | 77.75166 | 4.842 | 1.59349 | 67.0 |
| 13 | −158.02225 | 1.500 | 1.90366 | 31.3 |
| 14 | 46.02834 | 1.844 | 1.00000 | |
| 15 | 83.85157 | 3.848 | 1.77250 | 49.6 |
| 16 | −277.24360 | D16 | 1.00000 | |
| 17 | 59.19194 | 5.400 | 1.80400 | 46.6 |
| 18 | −354.91781 | D18 | 1.00000 | |
| 19 | (Aperture stop) | D19 | 1.00000 | |
| 20 | −140.00000 | 1.178 | 1.77250 | 49.6 |
| 21 | 33.57372 | 4.337 | 1.00000 | |
| 22 | −36.69329 | 1.200 | 1.59349 | 67.0 |
| 23 | −63.63544 | 0.100 | 1.00000 | |
| 24 | 61.90037 | 3.102 | 1.84666 | 23.8 |
| 25 | −187.23382 | D25 | 1.00000 | |
| *26 | −120.15188 | 1.100 | 1.61000 | 65.0 |
| 27 | 78.56667 | 0.966 | 1.00000 | |
| 28 | 66.22584 | 1.921 | 1.80518 | 25.5 |
| 29 | 108.00000 | D29 | 1.00000 | |
| *30 | 96.36461 | 5.000 | 1.55332 | 71.7 |
| 31 | −132.37171 | 0.200 | 1.00000 | |
| 32 | 103.35532 | 1.300 | 1.80518 | 25.5 |
| 33 | 49.66548 | 6.742 | 1.59319 | 67.9 |
| 34 | −101.36549 | 0.188 | 1.00000 | |
| 35 | 55.76221 | 9.450 | 1.49782 | 82.6 |
| 36 | −36.89155 | 1.400 | 1.75000 | 31.4 |
| 37 | 97.48202 | 4.003 | 1.69350 | 53.2 |
| *38 | 442.81061 | D38 | 1.00000 | |
| 39 | 0.00000 | D39 | 1.00000 | |

[Aspheric Data]

| Surface | κ | A4 | A6 | A8 | A10 |
|---|---|---|---|---|---|
| 2 | 1.48700e−01 | 1.33488e−06 | 1.45328e−09 | −6.97898e−13 | 5.22062e−16 |
| 3 | 4.31460e+00 | −4.66997e−07 | 4.80176e−10 | −1.05569e−12 | 3.62706e−16 |
| 26 | −2.40000e+01 | −1.76198e−06 | 1.30497e−09 | 0.00000e+00 | 0.00000e+00 |
| 30 | 3.97310e+00 | 3.04836e−06 | −6.62447e−10 | 0.00000e+00 | 0.00000e+00 |
| 38 | 3.71000e+02 | 4.89412e−06 | 1.67774e−10 | 0.00000e+00 | 0.00000e+00 |

[Various Data]

| | W | M | T |
|---|---|---|---|
| f | 24.80 | 47.76 | 67.85 |
| FNo | 2.92 | 2.92 | 2.92 |
| ω | 42.5 | 23.7 | 17.2 |
| Y | 21.60 | 21.60 | 21.60 |
| TL | 219.362 | 198.056 | 201.131 |

TABLE 2-continued

| BF | 41.459 | 48.894 | 57.632 |
|---|---|---|---|
| BF (air-conversion length) | 41.459 | 48.894 | 57.632 |

[Variable Distance Data]

Focusing on infinity

| | W | M | T |
|---|---|---|---|
| D0 | ∞ | ∞ | ∞ |
| Magnification | — | — | — |
| f | 24.80 | 47.76 | 67.85 |
| D7 | 48.978 | 12.578 | 1.835 |
| D16 | 7.750 | 7.750 | 7.750 |
| D18 | 3.000 | 18.144 | 31.911 |
| D19 | 2.000 | 4.200 | 2.500 |
| D25 | 1.440 | 1.440 | 1.440 |
| D29 | 18.172 | 8.487 | 1.500 |
| D38 | 1.139 | 8.574 | 17.251 |
| D39 | 40.319 | 40.320 | 40.381 |

[Lens Group Data]

| Lens group | Starting surface | Focal length |
|---|---|---|
| 1st lens group | 1 | −38.77 |
| 2nd lens group | 8 | 42.97 |
| 21st lens group | 8 | 81.61 |
| 22nd lens group | 17 | 63.47 |
| 3rd lens group | 20 | −40.68 |
| 31st lens group | 20 | −68.40 |
| 32nd lens group | 26 | −123.54 |
| 4th lens group | 30 | 49.36 |

[Focusing Data]

| | W | M | T |
|---|---|---|---|
| Lens moving distance | 6.75 | 6.75 | 6.75 |
| Imaging distance (m) | 0.4124 | 0.3853 | 0.4059 |

[Conditional Expression Correspondence Values]

| | |
|---|---|
| Conditional Expression (1) | f(1~Gn)t/ft = 12.007 |
| Conditional Expression (2) | −f(Gn~G(VR))w/fw = 1.640 |
| Conditional Expression (3) | f(RP)/f(FP) = 1.149 |
| Conditional Expression (4) | ωt = 17.2 |
| Conditional Expression (5) | ωw = 42.5 |

It is understood from Table 2 that the variable magnification optical system ZL2 according to Example 2 satisfies Conditional Expressions (1) to (5).

Figure 5:
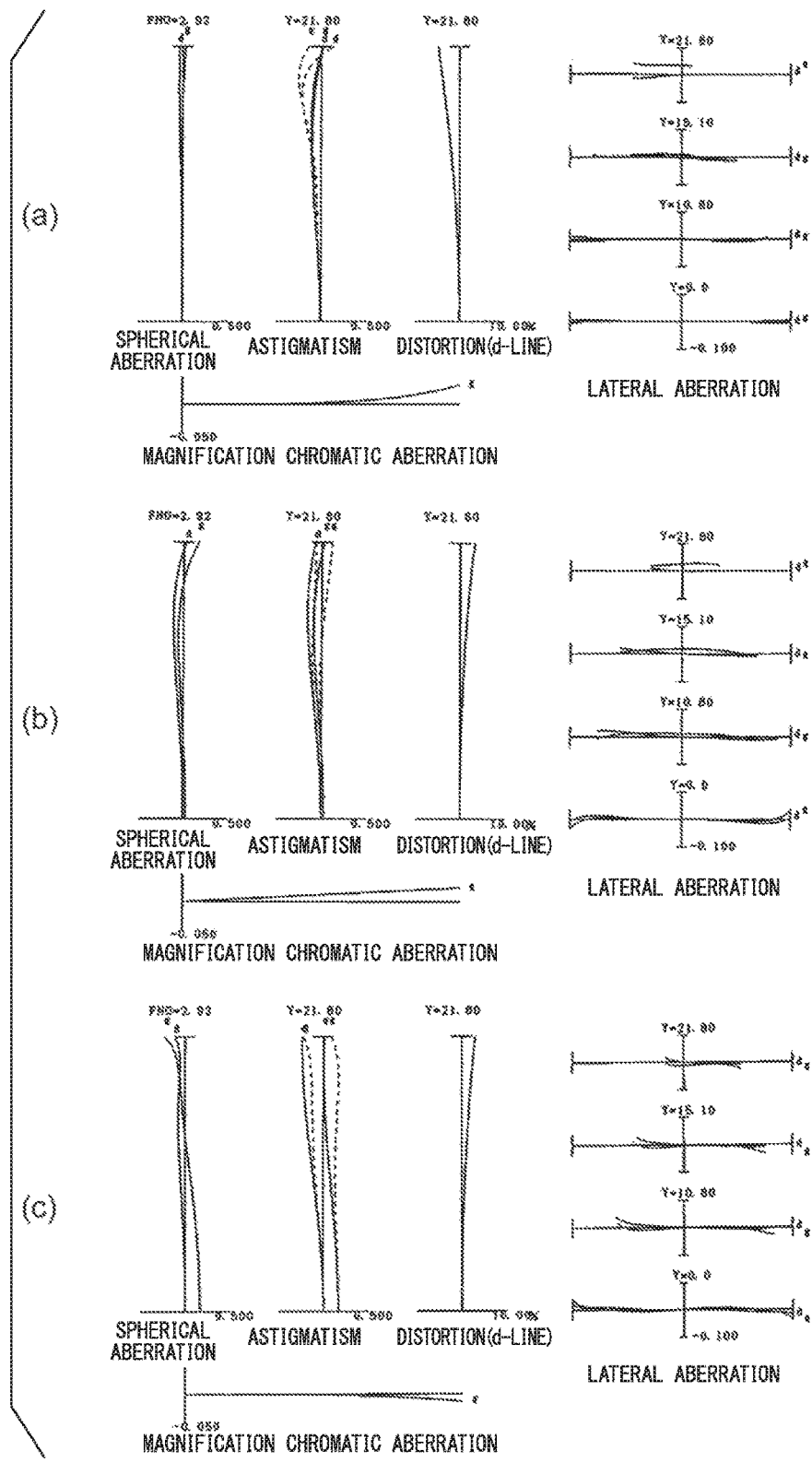
FIG. 5 shows graphs illustrating various aberrations of the variable magnification optical system according to Example 2 upon focusing on infinity, wherein parts (a), (b), and (c) are in the wide-angle end state, the intermediate focal length state, and the telephoto end state, respectively.
Figure 6:
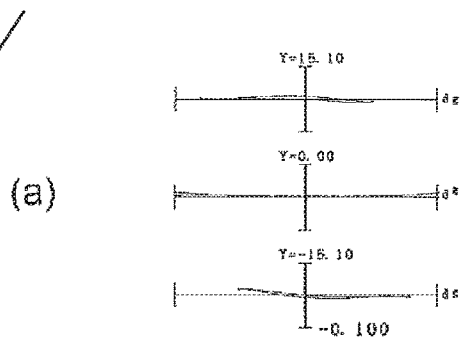
FIG. 6 shows graphs illustrating lateral aberrations of the variable magnification optical system according to Example 2 after image blur correction was performed upon focusing on infinity, wherein parts (a), (b), and (c) are in the wide-angle end state, the intermediate focal length state, and the telephoto end state, respectively.
Figure 6:
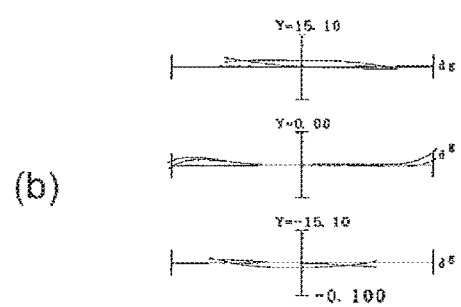
Figure 6:
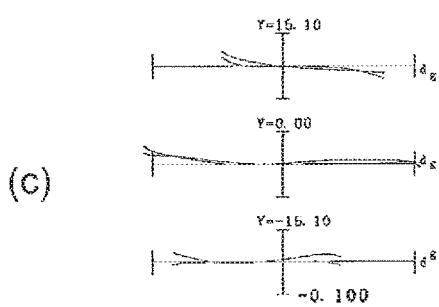

FIG. 5 shows graphs illustrating various aberrations (spherical aberration, astigmatism, distortion, magnification chromatic aberration, and lateral aberration) upon focusing on infinity, of the variable magnification optical system ZL2 according to Example 2, in which part (a) illustrates the wide-angle end state, part (b) illustrates the intermediate focal length state, and part (c) illustrates the telephoto end state. FIG. 6 shows graphs illustrating lateral aberration of the variable magnification optical system ZL2 according to Example 2 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 6.

As is obvious from respective aberration graphs, it is understood that the variable magnification optical system ZL2 according to Example 2 has a satisfactory optical performance such that aberrations are satisfactorily corrected in states ranging from the wide-angle end state to the telephoto end state. Moreover, it is understood that the variable magnification optical system ZL2 has an excellent imaging performance upon image blur correction.

Example 3

Figure 7:
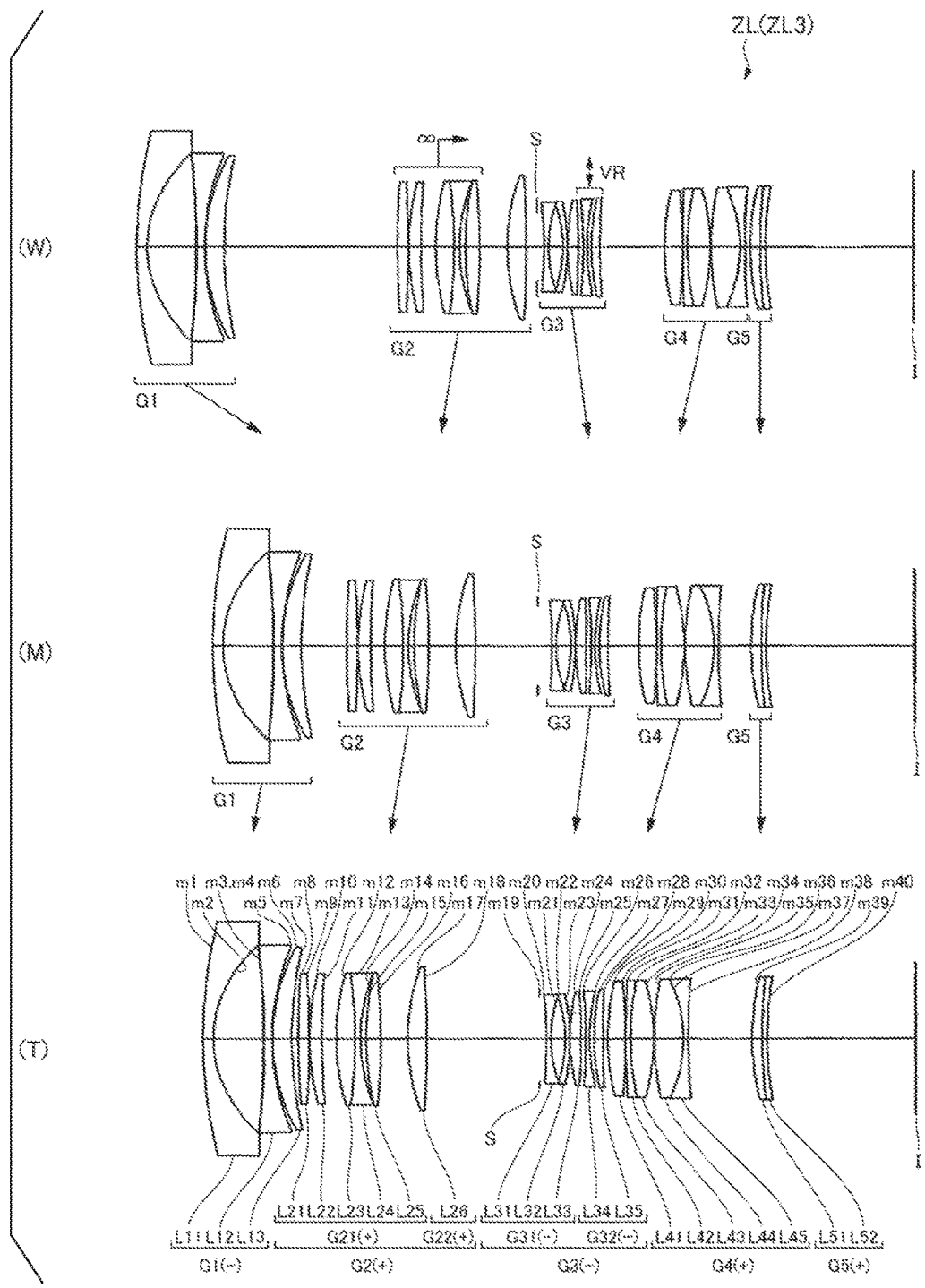
FIG. 7 is a cross-sectional view of a variable magnification optical system according to Example 3, wherein parts (W), (M), and (T) are in a wide-angle end state, an intermediate focal length state, and a telephoto end state, respectively.

Example 3 will be described with reference to FIGS. 7 to 9 and Table 3. As illustrated in FIG. 7, a variable magnification optical system ZL (ZL3) according to Example 3 is constituted by, in order from an object, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 is constituted by, in order from the object, a 21st lens group G21 (a focusing lens group) having a positive refractive power and a 22nd lens group G22 having a positive refractive power.

The 21st lens group G21 is constituted by, in order from the object, a biconvex lens L21, a positive meniscus lens L22 having a convex surface oriented toward the object side, a cemented lens including a biconvex lens L23 and a biconcave lens L24, and a biconvex lens L25. The 22nd lens group G22 is constituted by a biconvex lens L26.

The third lens group G3 is constituted by, in order from the object, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31, a negative meniscus lens L32 having a concave surface oriented toward the object side, and a biconvex lens L33. The 32nd lens group G32 is constituted by, in order from the object, a biconcave lens L34 and a positive meniscus lens L35 having a convex surface oriented toward the object side. The biconcave lens L34 has an aspherical object-side surface.

The fourth lens group G4 is constituted by, in order from the object, a biconvex lens L41, a cemented lens including a negative meniscus lens L42 having a concave surface oriented toward the image side and a biconvex lens L43, and a cemented lens including a biconvex lens L44 and a biconcave lens L45. The biconvex lens L41 has an aspherical object-side surface. The biconcave lens L45 has an aspherical image-side surface.

The fifth lens group G5 is constituted by a cemented lens including, in order from an object, a positive meniscus lens L51 having a convex surface oriented toward the object side and a negative meniscus lens L52 having a concave surface oriented toward the image side.

An aperture stop S is disposed between the second lens group G2 and the third lens group G3.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the image side and then moving the same toward the object side, and moving the fourth lens group G4 toward the object side such that the distances between the respective lens groups are changed. The fifth lens group G5 and the aperture stop S are immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 3, in the wide-angle end state, since the vibration reduction coefficient is −0.45 and the focal length is 24.82 mm, the moving distance of the vibration-reduction lens group VR for correcting the rotation blur of 0.30° is −0.29 mm. In the intermediate focal length state, since the vibration reduction coefficient is −0.50 and the focal length is 47.49 mm, the moving distance of the vibration-reduction lens group VR for correcting the rotation blur of 0.30° is −0.49 mm. In the telephoto end state, since the vibration reduction coefficient is −0.58 and the focal length is 67.84 mm, the moving distance of the vibration-reduction lens group VR for correcting the rotation blur of 0.30° is −0.62 mm.

Table 3 illustrates the values of respective specifications of Example 3. Surface numbers 1 to 40 in Table 3 correspond to optical surfaces of m1 to m40 illustrated in FIG. 7.

TABLE 3

[Lens Specification]

| Surface number | R | D | n(d) | νd |
|---|---|---|---|---|
| 1 | 134.61434 | 2.900 | 1.74389 | 49.5 |
| *2 | 30.98121 | 14.105 | 1.00000 | |
| *3 | −271.55507 | 0.300 | 1.56093 | 36.6 |
| 4 | −224.01871 | 2.100 | 1.80400 | 46.6 |
| 5 | 65.07720 | 0.200 | 1.00000 | |
| 6 | 53.84066 | 5.401 | 2.00100 | 29.1 |
| 7 | 113.70514 | D7 | 1.00000 | |
| 8 | 259.91458 | 3.000 | 1.59349 | 67.0 |
| 9 | −443.80327 | 0.243 | 1.00000 | |
| 10 | 71.84029 | 3.500 | 1.69680 | 55.5 |
| 11 | 238.64880 | 4.057 | 1.00000 | |
| 12 | 66.72188 | 5.288 | 1.59349 | 67.0 |
| 13 | −145.97738 | 1.500 | 1.90366 | 31.3 |
| 14 | 49.38387 | 1.625 | 1.00000 | |
| 15 | 83.91292 | 4.117 | 1.77250 | 49.6 |
| 16 | −207.54373 | D16 | 1.00000 | |
| 17 | 59.58569 | 5.400 | 1.80400 | 46.6 |
| 18 | −338.02309 | D18 | 1.00000 | |
| 19 | (Aperture stop) | D19 | 1.00000 | |
| 20 | −140.00000 | 1.178 | 1.77250 | 49.6 |
| 21 | 34.70000 | 4.110 | 1.00000 | |
| 22 | −37.39824 | 1.200 | 1.59349 | 67.0 |
| 23 | −64.12090 | 0.100 | 1.00000 | |

TABLE 3-continued

| | | | | |
|---|---|---|---|---|
| 24 | 62.46432 | 2.941 | 1.90200 | 25.3 |
| 25 | −277.86426 | D25 | 1.00000 | |
| *26 | −157.84803 | 1.100 | 1.77250 | 49.6 |
| 27 | 61.66083 | 1.232 | 1.00000 | |
| 28 | 63.26230 | 2.386 | 1.84666 | 23.8 |
| 29 | 198.11149 | D29 | 1.00000 | |
| *30 | 74.15506 | 5.000 | 1.55332 | 71.7 |
| 31 | −190.85228 | 0.100 | 1.00000 | |
| 32 | 414.99863 | 1.300 | 1.84666 | 23.8 |
| 33 | 79.29491 | 6.640 | 1.59319 | 67.9 |
| 34 | −59.47223 | 0.188 | 1.00000 | |
| 35 | 77.14715 | 8.284 | 1.49700 | 81.6 |
| 36 | −39.12349 | 1.400 | 1.70600 | 30.9 |
| *37 | 467.32553 | D37 | 1.00000 | |
| 38 | 74.86867 | 2.769 | 1.49700 | 81.6 |
| 39 | 177.01793 | 1.400 | 1.79504 | 28.7 |
| 40 | 100.00000 | D40 | 1.00000 | |

[Aspheric Data]

| Surface | κ | A4 | A6 | A8 | A10 |
|---|---|---|---|---|---|
| 2 | −8.40000e−03 | 1.76676e−06 | 1.42633e−09 | −6.16355e−13 | 3.36393e−16 |
| 3 | 5.89560e+00 | −4.29758e−07 | 9.43230e−10 | −1.79782e−12 | 8.72339e−16 |
| 26 | −2.40000e+01 | −5.18855e−07 | 4.69601e−10 | 0.00000e+00 | 0.00000e+00 |
| 30 | 7.93900e−01 | 2.20229e−06 | −7.31449e−10 | 0.00000e+00 | 0.00000e+00 |
| 37 | 4.51000e+02 | 4.05983e−06 | 9.42292e−10 | 0.00000e+00 | 0.00000e+00 |

[Various Data]

| | W | M | T |
|---|---|---|---|
| f | 24.82 | 47.49 | 67.84 |
| FNo | 2.91 | 2.91 | 2.92 |
| ω | 42.3 | 23.8 | 17.2 |
| Y | 21.60 | 21.60 | 21.60 |
| TL | 220.442 | 198.936 | 201.965 |
| BF | 42.289 | 42.290 | 42.353 |
| BF (air-conversion length) | 42.289 | 42.290 | 42.353 |

[Variable Distance Data]

Focusing on infinity

| | W | M | T |
|---|---|---|---|
| D0 | ∞ | ∞ | ∞ |
| Magnification | — | — | — |
| f | 24.82 | 47.49 | 67.84 |
| D7 | 49.018 | 12.832 | 1.835 |
| D16 | 7.750 | 7.750 | 7.750 |
| D18 | 3.000 | 17.679 | 31.753 |
| D19 | 2.000 | 3.989 | 2.000 |
| D25 | 1.412 | 1.412 | 1.412 |
| D29 | 18.411 | 8.690 | 1.500 |
| D37 | 1.500 | 9.233 | 18.301 |
| D40 | 42.289 | 42.290 | 42.353 |

[Lens Group Data]

| Lens group | Starting surface | Focal length |
|---|---|---|
| 1st lens group | 1 | −38.85 |
| 2nd lens group | 8 | 42.32 |
| 21st lens group | 8 | 82.21 |
| 22nd lens group | 17 | 63.39 |
| 3rd lens group | 20 | −41.39 |
| 31st lens group | 20 | −69.44 |
| 32nd lens group | 26 | −122.74 |
| 4th lens group | 30 | 52.58 |
| 5th lens group | 38 | 2000.09 |

[Focusing Data]

| | W | M | T |
|---|---|---|---|
| Lens moving distance | 6.75 | 6.75 | 6.75 |
| Imaging distance (m) | 0.4144 | 0.3857 | 0.4059 |

TABLE 3-continued

[Conditional Expression Correspondence Values]

| | |
|---|---|
| Conditional Expression (1) | $f(1\sim Gn)t/ft = 8.425$ |
| Conditional Expression (2) | $-f(Gn\sim G(VR))w/fw = 1.668$ |
| Conditional Expression (3) | $f(RP)/f(FP) = 1.242$ |
| Conditional Expression (4) | $\omega t = 17.2$ |
| Conditional Expression (5) | $\omega w = 42.3$ |

It is understood from Table 3 that the variable magnification optical system ZL3 according to Example 3 satisfies Conditional Expressions (1) to (5).

Figure 8:
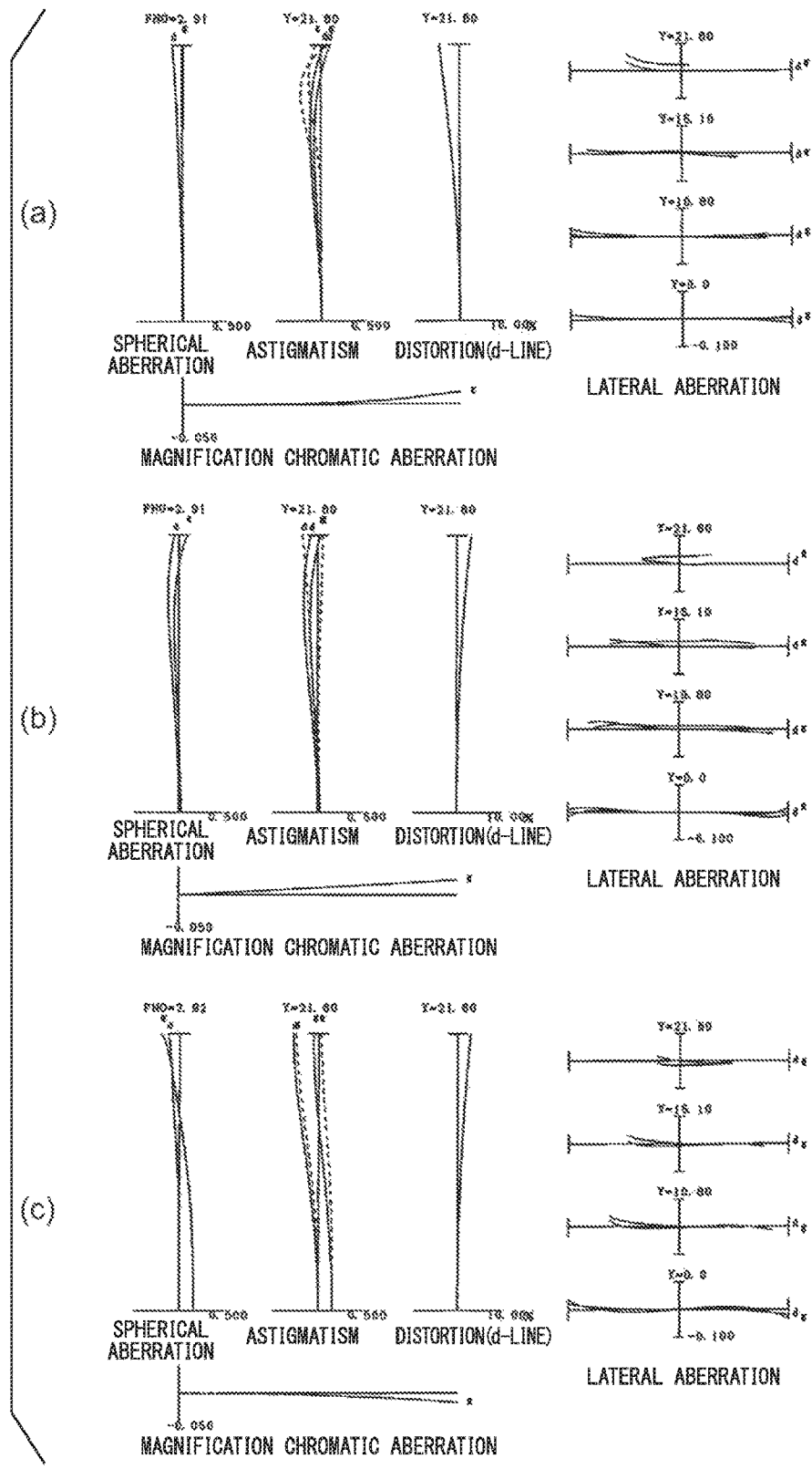
FIG. 8 shows graphs illustrating various aberrations of the variable magnification optical system according to Example 3 upon focusing on infinity, wherein parts (a), (b), and (c) are in the wide-angle end state, the intermediate focal length state, and the telephoto end state, respectively.
Figure 9:
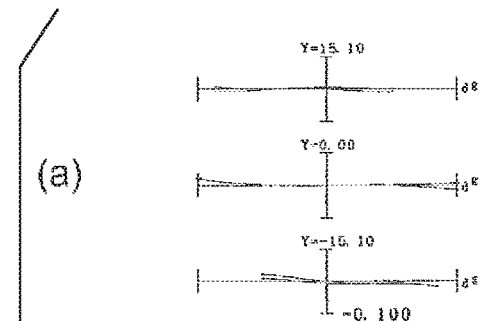
FIG. 9 shows graphs illustrating lateral aberrations of the variable magnification optical system according to Example 3 after image blur correction was performed upon focusing on infinity, wherein parts (a), (b), and (c) are in the wide-angle end state, the intermediate focal length state, and the telephoto end state, respectively.
Figure 9:
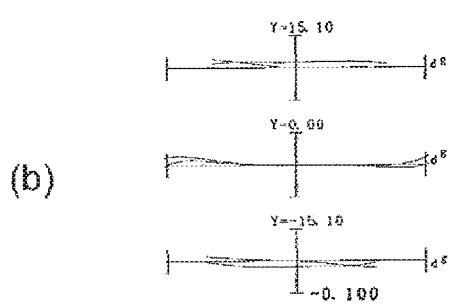
Figure 9:
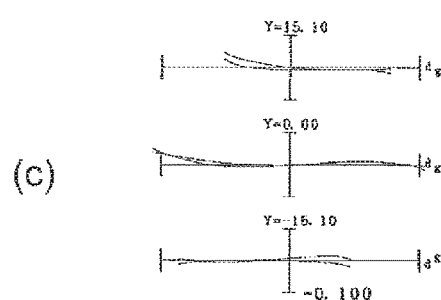

FIG. 8 shows graphs illustrating various aberrations (spherical aberration, astigmatism, distortion, magnification chromatic aberration, and lateral aberration) upon focusing on infinity, of the variable magnification optical system ZL3 according to Example 3, in which part (a) illustrates the wide-angle end state, part (b) illustrates the intermediate focal length state, and part (c) illustrates the telephoto end state. FIG. 9 shows graphs illustrating lateral aberration of the variable magnification optical system ZL3 according to Example 3 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 9.

As is obvious from respective aberration graphs, it is understood that the variable magnification optical system ZL3 according to Example 3 has a satisfactory optical performance such that aberrations are satisfactorily corrected in states ranging from the wide-angle end state to the telephoto end state. Moreover, it is understood that the variable magnification optical system ZL3 has an excellent imaging performance upon image blur correction.

Example 4

Figure 10:
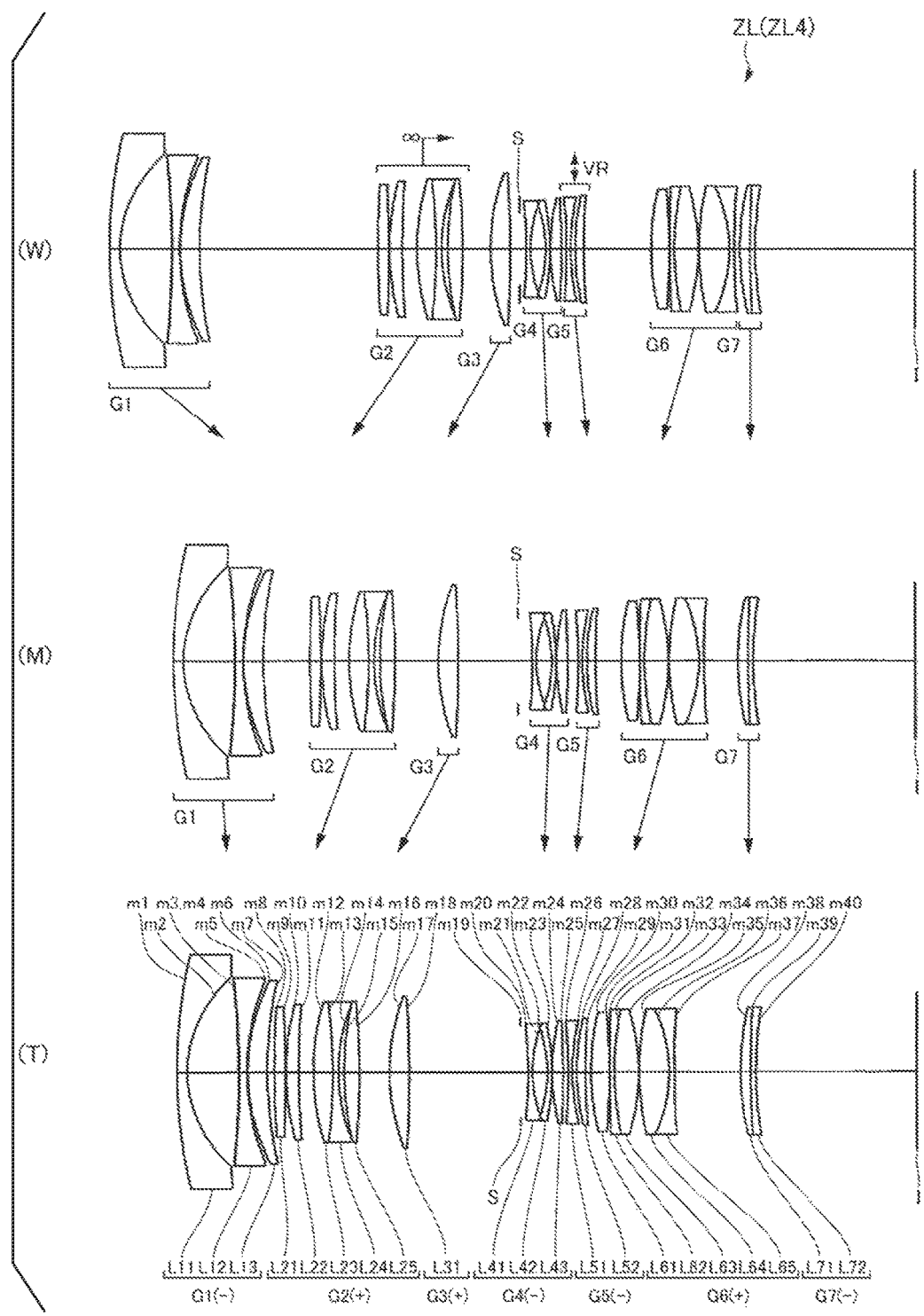
FIG. 10 is a cross-sectional view of a variable magnification optical system according to Example 4, wherein parts (W), (M), and (T) are in a wide-angle end state, an intermediate focal length state, and a telephoto end state, respectively.

Example 4 will be described with reference to FIGS. 10 to 12 and Table 4. As illustrated in FIG. 10, a variable magnification optical system ZL (ZL4) according to Example 4 is constituted by, in order from an object, a first lens group G1 having a negative refractive power, a second lens group G2 having a positive refractive power, a third lens group G3 having a positive refractive power, a fourth lens group G4 having a negative refractive power, a fifth lens group G5 having a negative refractive power, a sixth lens group G6 having a positive refractive power, and a seventh lens group G7 having a negative refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 (a focusing lens group) is constituted by a biconvex lens L21, a positive meniscus lens L22 having a convex surface oriented toward the object side, a cemented lens including a biconvex lens L23 and a biconcave lens L24, and a biconvex lens L25.

The third lens group G3 is constituted by a biconvex lens L31.

The fourth lens group G4 (an intermediate group) is constituted by, in order from the object, a biconcave lens L41, a negative meniscus lens L42 having a concave surface oriented toward the object side, and a biconvex lens L43, of which the positions in the direction orthogonal to the optical axis are immovable.

The fifth lens group G5 (a vibration-reduction lens group) is constituted by, in order from the object, a biconcave lens L51 and a positive meniscus lens L52 having a convex surface oriented toward the object side. The biconcave lens L51 has an aspherical object-side surface.

The sixth lens group G6 is constituted by, in order from the object, a biconvex lens L61, a cemented lens including a negative meniscus lens L62 having a concave surface oriented toward the image side and a biconvex lens L63, and a cemented lens including a biconvex lens L64 and a biconcave lens L65. The biconvex lens L61 has an aspherical object-side surface. The biconcave lens L65 has an aspherical image-side surface.

The seventh lens group G7 is constituted by a cemented lens including, in order from an object, a positive meniscus lens L71 having a convex surface oriented toward the object side and a negative meniscus lens L72 having a concave surface oriented toward the image side.

An aperture stop S is disposed between the third lens group G3 and the fourth lens group G4.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the object side, moving the fourth lens group G4 toward the image side and then moving the same toward the object side, moving the fifth lens group G5 toward the image side and then moving the same toward the object side, and moving the sixth lens group G6 toward the object side such that the distances between the respective lens groups are changed. The seventh lens group G7 and the aperture stop S are immovable upon varying magnification.

Focusing from an object at infinity to an object at a close distance is performed by moving the second lens group G2 as a focusing lens group toward the image side.

When image blur occurs, image blur correction (vibration reduction) on the image plane I is performed by moving the fifth lens group G5 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 4, in the wide-angle end state, since the vibration reduction coefficient is −0.46 and the focal length is 25.49 mm, the moving distance of the vibration-reduction lens group VR for correcting the rotation blur of 0.30° is −0.29 mm. In the intermediate focal length state, since the vibration reduction coefficient is −0.53 and the focal length is 48.81 mm, the moving distance of the vibration-reduction lens group VR for correcting the rotation blur of 0.30° is −0.49 mm. In the telephoto end state, since the vibration reduction coefficient is −0.61 and the focal length is 69.45 mm, the moving distance of the vibration-reduction lens group VR for correcting the rotation blur of 0.30° is −0.59 mm.

Table 4 illustrates the values of respective specifications of Example 4. Surface numbers 1 to 40 in Table 4 correspond to optical surfaces of m1 to m40 illustrated in FIG. 10.

TABLE 4

| [Lens Specification] | | | | |
|---|---|---|---|---|
| Surface number | R | D | n(d) | νd |
| 1 | 134.61434 | 2.900 | 1.74389 | 49.5 |
| *2 | 30.98121 | 14.105 | 1.00000 | |
| *3 | −271.55507 | 0.300 | 1.56093 | 36.6 |
| 4 | −224.01871 | 2.100 | 1.80400 | 46.6 |
| 5 | 65.07720 | 0.200 | 1.00000 | |
| 6 | 53.84066 | 5.401 | 2.00100 | 29.1 |
| 7 | 113.70514 | D7 | 1.00000 | |
| 8 | 259.91458 | 3.000 | 1.59349 | 67.0 |
| 9 | −443.80327 | 0.243 | 1.00000 | |
| 10 | 71.84029 | 3.500 | 1.69680 | 55.5 |
| 11 | 238.64880 | 4.057 | 1.00000 | |
| 12 | 66.72188 | 5.288 | 1.59349 | 67.0 |
| 13 | −145.97738 | 1.500 | 1.90366 | 31.3 |
| 14 | 49.38387 | 1.625 | 1.00000 | |
| 15 | 83.91292 | 4.117 | 1.77250 | 49.6 |
| 16 | −207.54373 | D16 | 1.00000 | |
| 17 | 59.58569 | 5.400 | 1.80400 | 46.6 |
| 18 | −338.02309 | D18 | 1.00000 | |
| 19 | (Aperture stop) | D19 | 1.00000 | |
| 20 | −140.00000 | 1.178 | 1.77250 | 49.6 |
| 21 | 34.70000 | 4.110 | 1.00000 | |
| 22 | −37.39824 | 1.200 | 1.59349 | 67.0 |
| 23 | −64.12090 | 0.100 | 1.00000 | |
| 24 | 62.46432 | 2.941 | 1.90200 | 25.3 |
| 25 | −277.86426 | D25 | 1.00000 | |
| *26 | −157.84803 | 1.100 | 1.77250 | 49.6 |
| 27 | 61.66083 | 1.232 | 1.00000 | |
| 28 | 63.26230 | 2.386 | 1.84666 | 23.8 |
| 29 | 198.11149 | D29 | 1.00000 | |
| *30 | 74.15506 | 5.000 | 1.55332 | 71.7 |
| 31 | −190.85228 | 0.100 | 1.00000 | |
| 32 | 414.99863 | 1.300 | 1.84666 | 23.8 |
| 33 | 79.29491 | 6.640 | 1.59319 | 67.9 |
| 34 | −59.47223 | 0.188 | 1.00000 | |
| 35 | 77.14715 | 8.284 | 1.49700 | 81.6 |
| 36 | −39.50000 | 1.400 | 1.70600 | 30.9 |
| *37 | 467.32553 | D37 | 1.00000 | |
| 38 | 74.86867 | 2.769 | 1.48749 | 70.3 |
| 39 | 300.00000 | 1.400 | 1.79504 | 28.7 |
| 40 | 100.00000 | D40 | 1.00000 | |

| [Aspheric Data] | | | | | |
|---|---|---|---|---|---|
| Surface | κ | A4 | A6 | A8 | A10 |
| 2 | −8.40000e−03 | 1.76676e−06 | 1.42633e−09 | −6.16355e−13 | 3.36393e−16 |
| 3 | 5.89560e+00 | −4.29758e−07 | 9.43230e−10 | −1.79782e−12 | 8.72339e−16 |
| 26 | −2.40000e+01 | −5.18855e−07 | 4.69601e−10 | 0.00000e+00 | 0.00000e+00 |
| 30 | 7.93900e−01 | 2.20229e−06 | −7.31449e−10 | 0.00000e+00 | 0.00000e+00 |
| 37 | 4.51000e+02 | 4.05983e−06 | 9.42292e−10 | 0.00000e+00 | 0.00000e+00 |

| [Various Data] | | | |
|---|---|---|---|
| | W | M | T |
| f | 25.49 | 48.81 | 69.45 |
| FNo | 2.92 | 2.92 | 2.92 |
| ω | 41.6 | 23.3 | 16.8 |
| Y | 21.60 | 21.60 | 21.60 |
| TL | 222.079 | 204.772 | 203.978 |
| BF | 44.388 | 45.157 | 44.803 |
| BF (air-conversion length) | 44.388 | 45.157 | 44.803 |

TABLE 4-continued

[Variable Distance Data]

| | Focusing on infinity | | |
|---|---|---|---|
| | W | M | T |
| D0 | ∞ | ∞ | ∞ |
| Magnification | — | — | — |
| f | 25.49 | 48.81 | 69.45 |
| D7 | 49.018 | 12.832 | 1.900 |
| D16 | 7.750 | 12.000 | 8.300 |
| D18 | 2.500 | 16.500 | 30.700 |
| D19 | 2.000 | 3.989 | 2.000 |
| D25 | 1.412 | 3.000 | 1.412 |
| D29 | 18.450 | 7.000 | 1.500 |
| D37 | 1.500 | 9.233 | 18.301 |
| D40 | 44.388 | 45.157 | 44.803 |

[Lens Group Data]

| Lens group | Starting surface | Focal length |
|---|---|---|
| 1st lens group | 1 | −38.85 |
| 2nd lens group | 8 | 82.21 |
| 3rd lens group | 17 | 63.39 |
| 4th lens group | 20 | −69.44 |
| 5th lens group | 26 | −122.74 |
| 6th lens group | 30 | 52.47 |
| 7th lens group | 38 | −3528.86 |

[Focusing Data]

| | W | M | T |
|---|---|---|---|
| Lens moving distance | 6.75 | 11.00 | 7.30 |
| Imaging distance (m) | 0.4160 | 0.3019 | 0.3889 |

[Conditional Expression Correspondence Values]

| | |
|---|---|
| Conditional Expression (1) | f(1~Gn)t/ft = 9.194 |
| Conditional Expression (2) | −f(Gn~G(VR))w/fw = 1.624 |
| Conditional Expression (3) | f(RP)/f(FP) = 1.240 |
| Conditional Expression (4) | ωt = 16.8 |
| Conditional Expression (5) | ωw = 41.6 |

It is understood from Table 4 that the variable magnification optical system ZL4 according to Example 4 satisfies Conditional Expressions (1) to (5).

Figure 11:
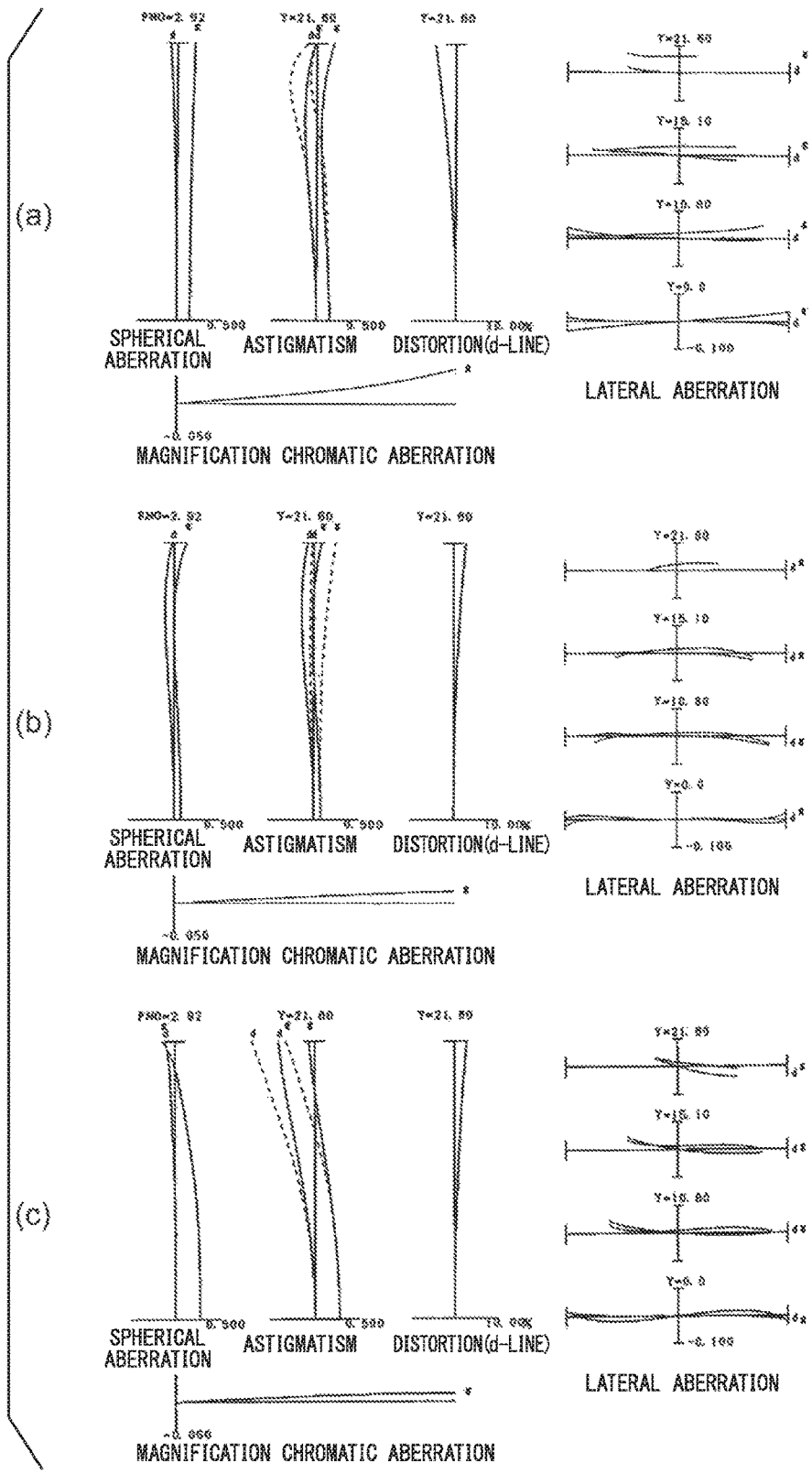
FIG. 11 shows graphs illustrating various aberrations of the variable magnification optical system according to Example 4 upon focusing on infinity, wherein parts (a), (b), and (c) are in the wide-angle end state, the intermediate focal length state, and the telephoto end state, respectively.
Figure 12:
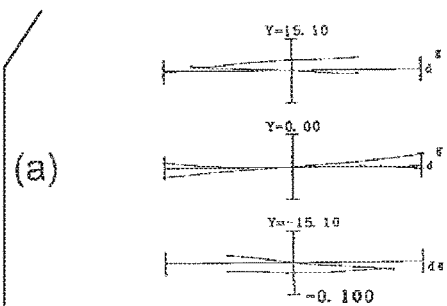
FIG. 12 shows graphs illustrating lateral aberrations of the variable magnification optical system according to Example 4 after image blur correction was performed upon focusing on infinity, wherein parts (a), (b), and (c) are in the wide-angle end state, the intermediate focal length state, and the telephoto end state, respectively.
Figure 12:
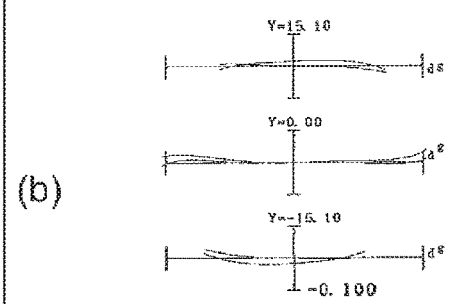
Figure 12:
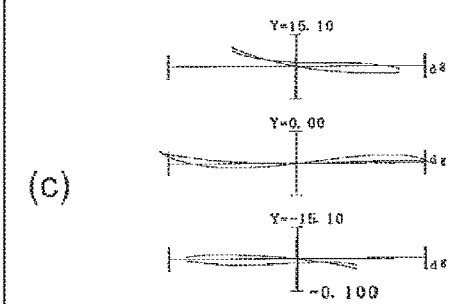

FIG. 11 shows graphs illustrating various aberrations (spherical aberration, astigmatism, distortion, magnification chromatic aberration, and lateral aberration) upon focusing on infinity, of the variable magnification optical system ZL4 according to Example 4, in which part (a) illustrates the wide-angle end state, part (b) illustrates the intermediate focal length state, and part (c) illustrates the telephoto end state. FIG. 12 shows graphs illustrating lateral aberration of the variable magnification optical system ZL4 according to Example 4 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 12.

As is obvious from respective aberration graphs, it is understood that the variable magnification optical system ZL4 according to Example 4 has a satisfactory optical performance such that aberrations are satisfactorily corrected in states ranging from the wide-angle end state to the telephoto end state. Moreover, it is understood that the variable magnification optical system ZL4 has an excellent imaging performance upon image blur correction.

Example 5

Figure 13:
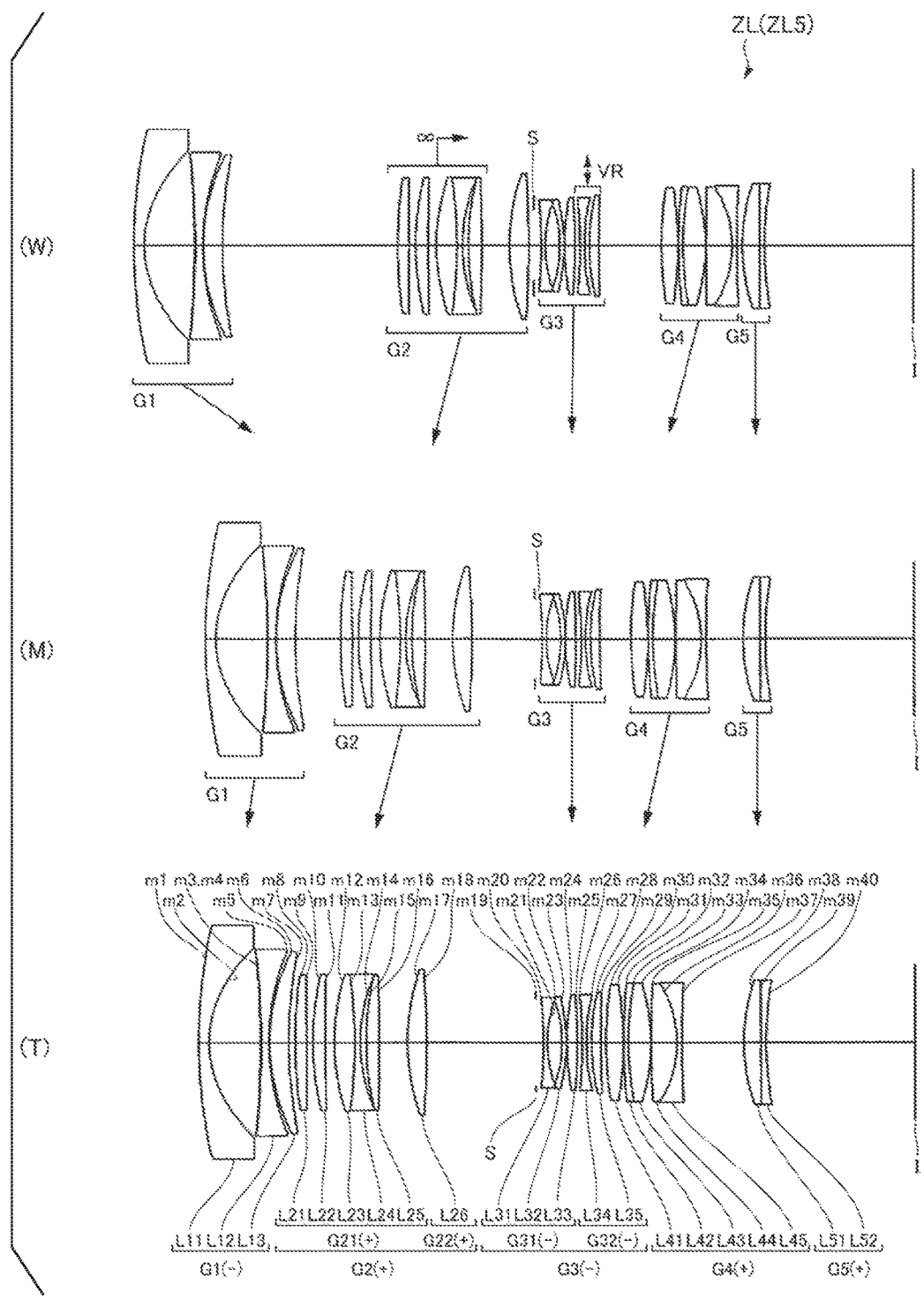
FIG. 13 is a cross-sectional view of a variable magnification optical system according to Example 5, wherein parts (W), (M), and (T) are in a wide-angle end state, an intermediate focal length state, and a telephoto end state, respectively.

Example 5 will be described with reference to FIGS. 13 to 15 and Table 5. As illustrated in FIG. 13, a variable magnification optical system ZL (ZL5) according to Example 5 is constituted by, in order from an object, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 is constituted by, in order from the object, a 21st lens group G21 (a focusing lens group)

having a positive refractive power and a 22nd lens group G22 having a positive refractive power.

The 21st lens group G21 is constituted by, in order from the object, a biconvex lens L21, a positive meniscus lens L22 having a convex surface oriented toward the object side, a cemented lens including a biconvex lens L23 and a biconcave lens L24, and a biconvex lens L25. The 22nd lens group G22 is constituted by a biconvex lens L26.

The third lens group G3 is constituted by, in order from the object, an aperture stop S, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31, a negative meniscus lens L32 having a concave surface oriented toward the object side, and a biconvex lens L33. The 32nd lens group G32 is constituted by, in order from the object, a biconcave lens L34 and a positive meniscus lens L35 having a convex surface oriented toward the object side. The biconcave lens L34 has an aspherical object-side surface.

The fourth lens group G4 is constituted by, in order from the object, a biconvex lens L41, a cemented lens including a negative meniscus lens L42 having a concave surface oriented toward the image side and a biconvex lens L43, and a cemented lens including a biconvex lens L44 and a biconcave lens L45. The biconvex lens L41 has an aspherical object-side surface. The biconcave lens L45 has an aspherical image-side surface.

The fifth lens group G5 is constituted by a cemented lens including a biconvex lens L51 and a biconcave lens L52 arranged in that order from the object.

Varying magnification from the wide-angle end state to the telephoto end state is performed by moving the first lens group G1 toward the image side and then moving the first lens group G1 toward the object side, moving the second lens group G2 toward the object side, and moving the fourth lens group G4 toward the object side such that the distances between the respective lens groups are changed. The third lens group G3 and the fifth lens group G5 are immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 5, in the wide-angle end state, since the vibration reduction coefficient is −0.46 and the focal length is 24.77 mm, the moving distance of the vibration-reduction lens group VR for correcting the rotation blur of 0.30° is −0.28 mm. In the intermediate focal length state, since the vibration reduction coefficient is −0.52 and the focal length is 47.50 mm, the moving distance of the vibration-reduction lens group VR for correcting the rotation blur of 0.30° is −0.48 mm. In the telephoto end state, since the vibration reduction coefficient is −0.58 and the focal length is 67.85 mm, the moving distance of the vibration-reduction lens group VR for correcting the rotation blur of 0.30° is −0.62 mm.

Table 5 illustrates the values of respective specifications of Example 5. Surface numbers 1 to 40 in Table 5 correspond to optical surfaces of m1 to m40 illustrated in FIG. 13.

TABLE 5

[Lens Specification]

| Surface number | R | D | n(d) | vd |
|---|---|---|---|---|
| 1 | 144.94817 | 2.900 | 1.74389 | 49.5 |
| *2 | 29.83529 | 14.301 | 1.00000 | |
| *3 | −322.90228 | 0.300 | 1.56093 | 36.6 |
| 4 | −228.59270 | 2.100 | 1.80400 | 46.6 |
| 5 | 65.19707 | 0.200 | 1.00000 | |
| 6 | 54.96083 | 5.379 | 2.00100 | 29.1 |
| 7 | 130.46571 | D7 | 1.00000 | |
| 8 | 127.91888 | 3.200 | 1.59349 | 67.0 |
| 9 | −2245.90430 | 1.780 | 1.00000 | |
| 10 | 81.17716 | 3.500 | 1.69680 | 55.5 |
| 11 | 679.72724 | 2.453 | 1.00000 | |
| 12 | 61.05134 | 5.724 | 1.59349 | 67.0 |
| 13 | −130.20006 | 1.500 | 1.90366 | 31.3 |
| 14 | 46.24112 | 1.694 | 1.00000 | |
| 15 | 77.95470 | 3.722 | 1.77250 | 49.6 |
| 16 | −564.05655 | D16 | 1.00000 | |
| 17 | 60.46759 | 5.400 | 1.80400 | 46.6 |
| 18 | −263.45861 | D18 | 1.00000 | |
| 19 | (Aperture stop) | 2.000 | 1.00000 | |
| 20 | −140.00000 | 1.178 | 1.77250 | 49.6 |
| 21 | 35.60000 | 4.059 | 1.00000 | |
| 22 | −35.16240 | 1.200 | 1.72916 | 54.6 |
| 23 | −51.36153 | 0.100 | 1.00000 | |
| 24 | 69.55169 | 2.879 | 1.90200 | 25.3 |
| 25 | −209.71368 | D25 | 1.00000 | |
| *26 | −118.85935 | 1.100 | 1.77250 | 49.6 |
| 27 | 54.49135 | 1.415 | 1.00000 | |
| 28 | 60.78441 | 2.635 | 1.90200 | 25.3 |
| 29 | 331.09581 | D29 | 1.00000 | |

TABLE 5-continued

| | | | | | |
|---|---|---|---|---|---|
| *30 | 118.81221 | 4.686 | 1.55332 | 71.7 | |
| 31 | −102.83315 | 0.100 | 1.00000 | | |
| 32 | 152.27830 | 1.300 | 1.72000 | 28.0 | |
| 33 | 85.35751 | 6.402 | 1.59319 | 67.9 | |
| 34 | −54.69093 | 0.188 | 1.00000 | | |
| 35 | 959.47501 | 7.222 | 1.49700 | 81.6 | |
| 36 | −30.23774 | 1.400 | 1.70600 | 29.0 | |
| *37 | 1029.85760 | D37 | 1.00000 | | |
| 38 | 53.49812 | 4.770 | 1.55332 | 71.7 | |
| 39 | −6970.92580 | 1.400 | 1.90366 | 31.3 | |
| 40 | 100.00000 | D40 | 1.00000 | | |

[Aspheric Data]

| Surface | κ | A4 | A6 | A8 | A10 |
|---|---|---|---|---|---|
| 2 | −1.01100e−01 | 1.43852e−06 | 1.71179e−09 | −1.42870e−12 | 1.05723e−15 |
| 3 | 2.81381e+01 | −7.54473e−07 | 4.14335e−10 | −5.77466e−13 | 3.16668e−16 |
| 26 | −1.90000e+01 | −9.14707e−07 | 9.49568e−10 | 0.00000e+00 | 0.00000e+00 |
| 30 | −1.43460e+00 | 2.27762e−06 | −5.51593e−10 | 0.00000e+00 | 0.00000e+00 |
| 37 | 2.44600e+03 | 4.05698e−06 | 0.00000e+00 | 0.00000e+00 | 0.00000e+00 |

[Various Data]

| | W | M | T |
|---|---|---|---|
| f | 24.77 | 47.50 | 67.85 |
| FNo | 2.90 | 2.90 | 2.91 |
| ω | 42.4 | 23.8 | 17.2 |
| Y | 21.60 | 21.60 | 21.60 |
| TL | 218.725 | 198.522 | 200.695 |
| BF | 41.843 | 41.843 | 41.903 |
| BF (air-conversion length) | 41.843 | 41.843 | 41.903 |

[Variable Distance Data]

Focusing on infinity

| | W | M | T |
|---|---|---|---|
| D0 | ∞ | ∞ | ∞ |
| Magnification | — | — | — |
| f | 24.77 | 47.50 | 67.85 |
| D7 | 49.003 | 12.690 | 1.835 |
| D16 | 7.750 | 7.750 | 7.750 |
| D18 | 1.450 | 17.610 | 30.588 |
| D25 | 1.473 | 1.473 | 1.473 |
| D29 | 17.519 | 8.681 | 1.500 |
| D37 | 1.500 | 10.288 | 17.459 |
| D40 | 41.843 | 41.843 | 41.903 |

[Lens Group Data]

| Lens group | Starting surface | Focal length |
|---|---|---|
| 1st lens group | 1 | −38.88 |
| 2nd lens group | 8 | 42.16 |
| 21st lens group | 8 | 80.98 |
| 22nd lens group | 17 | 61.63 |
| 3rd lens group | 19 | −42.05 |
| 31st lens group | 19 | −71.15 |
| 32nd lens group | 26 | −121.45 |
| 4th lens group | 30 | 56.98 |
| 5th lens group | 38 | 619.99 |

[Focusing Data]

| | W | M | T |
|---|---|---|---|
| Lens moving distance | 6.75 | 6.75 | 6.75 |
| Imaging distance (m) | 0.4148 | 0.3865 | 0.4059 |

[Conditional Expression Correspondence Values]

| Conditional Expression (1) | f(1~Gn)t/ft = 5.464 |
| Conditional Expression (2) | −f(Gn~G(VR))w/fw = 1.698 |
| Conditional Expression (3) | f(RP)/f(FP) = 1.352 |

TABLE 5-continued

| Conditional Expression (4) | ωt = 17.2 |
| Conditional Expression (5) | ωw = 42.4 |

It is understood from Table 5 that the variable magnification optical system ZL5 according to Example 5 satisfies Conditional Expressions (1) to (5).

Figure 14:
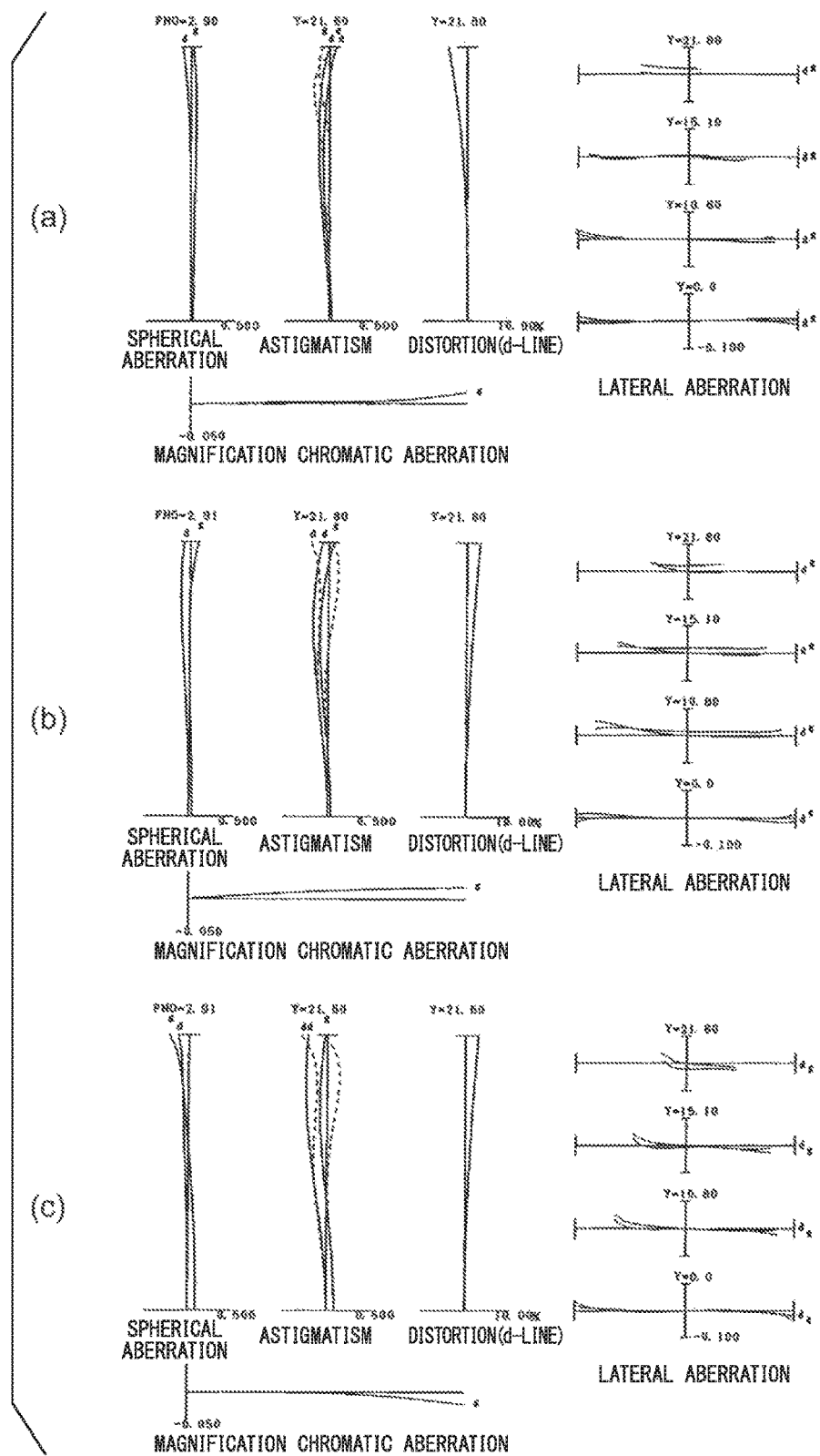
FIG. 14 shows graphs illustrating various aberrations of the variable magnification optical system according to Example 5 upon focusing on infinity, wherein parts (a), (b), and (c) are in the wide-angle end state, the intermediate focal length state, and the telephoto end state, respectively.
Figure 15:
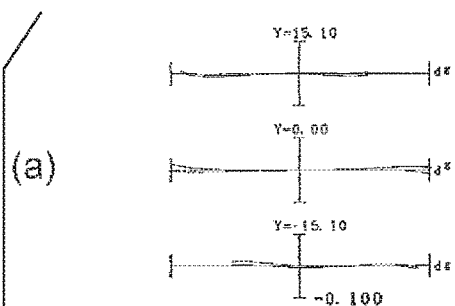
FIG. 15 shows graphs illustrating lateral aberrations of the variable magnification optical system according to Example 5 after image blur correction was performed upon focusing on infinity, wherein parts (a), (b), and (c) are in the wide-angle end state, the intermediate focal length state, and the telephoto end state, respectively.
Figure 15:
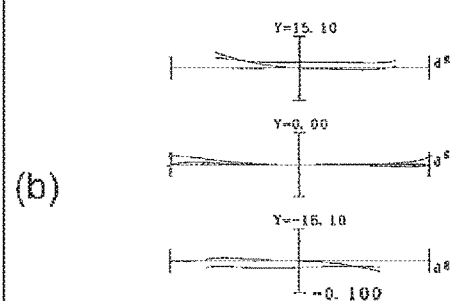
Figure 15:
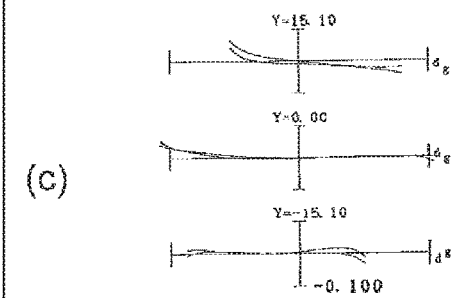

FIG. 14 shows graphs illustrating various aberrations (spherical aberration, astigmatism, distortion, magnification chromatic aberration, and lateral aberration) upon focusing on infinity, of the variable magnification optical system ZL5 according to Example 5, in which part (a) illustrates the wide-angle end state, part (b) illustrates the intermediate focal length state, and part (c) illustrates the telephoto end state. FIG. 15 shows graphs illustrating lateral aberration of the variable magnification optical system ZL5 according to Example 5 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 15.

As is obvious from respective aberration graphs, it is understood that the variable magnification optical system ZL5 according to Example 5 has a satisfactory optical performance such that aberrations are satisfactorily corrected in states ranging from the wide-angle end state to the telephoto end state. Moreover, it is understood that the variable magnification optical system ZL5 has an excellent imaging performance upon image blur correction.

Example 6

Figure 16:
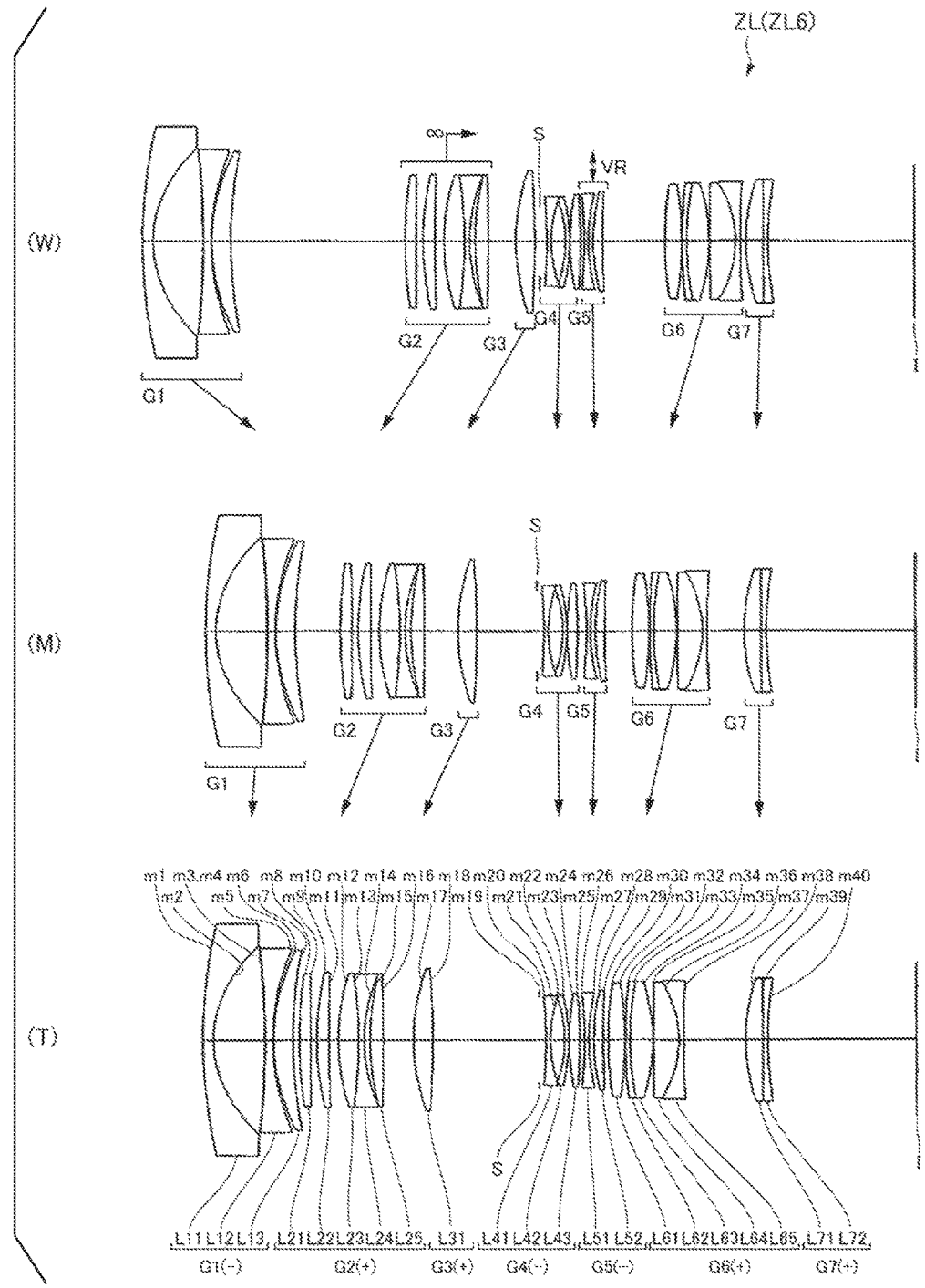
FIG. 16 is a cross-sectional view of a variable magnification optical system according to Example 6, wherein parts (W), (M), and (T) are in a wide-angle end state, an intermediate focal length state, and a telephoto end state, respectively.

Example 6 will be described with reference to FIGS. 16 to 18 and Table 6. As illustrated in FIG. 16, a variable magnification optical system ZL (ZL6) according to Example 6 is constituted by, in order from an object, a first lens group G1 having a negative refractive power, a second lens group G2 having a positive refractive power, a third lens group G3 having a positive refractive power, a fourth lens group G4 having a negative refractive power, a fifth lens group G5 having a negative refractive power, a sixth lens group G6 having a positive refractive power, and a seventh lens group G7 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 (a focusing lens group) is constituted by a biconvex lens L21, a positive meniscus lens L22 having a convex surface oriented toward the object side, a cemented lens including a biconvex lens L23 and a biconcave lens L24, and a biconvex lens L25.

The third lens group G3 is constituted by a biconvex lens L31.

The fourth lens group G4 (an intermediate group) is constituted by, in order from the object, an aperture stop S, a biconcave lens L41, a negative meniscus lens L42 having a concave surface oriented toward the object side, and a biconvex lens L43, of which the positions in the direction orthogonal to the optical axis are immovable.

The fifth lens group G5 (a vibration-reduction lens group) is constituted by, in order from the object, a biconcave lens L51 and a positive meniscus lens L52 having a convex surface oriented toward the object side. The biconcave lens L51 has an aspherical object-side surface.

The sixth lens group G6 is constituted by, in order from the object, a biconvex lens L61, a cemented lens including a negative meniscus lens L62 having a concave surface oriented toward the image side and a biconvex lens L63, and a cemented lens including a biconvex lens L64 and a biconcave lens L65. The biconvex lens L61 has an aspherical object-side surface. The biconcave lens L65 has an aspherical image-side surface.

The seventh lens group G7 is constituted by a cemented lens including a biconvex lens L71 and a biconcave lens L72 arranged in that order from the object.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the object side, moving the fourth lens group G4 toward the image side, moving the fifth lens group G5 toward the image side and then moving the same toward the object side, and moving the sixth lens group G6 toward the object side such that the distances between the respective lens groups are changed. The seventh lens group G7 is immovable upon varying magnification.

Focusing from an object at infinity to an object at a close distance is performed by moving the second lens group G2 as a focusing lens group toward the image side.

When image blur occurs, image blur correction (vibration reduction) on the image plane I is performed by moving the fifth lens group G5 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 6, in the wide-angle end state, since the vibration reduction coefficient is −0.46 and the focal length is 24.73 mm, the moving distance of the vibration-reduction lens group VR for correcting the rotation blur of 0.30° is −0.28 mm. In the intermediate focal length state, since the vibration reduction coefficient is −0.53 and the focal length is 47.48 mm, the moving distance of the vibration-reduction lens group VR for correcting the rotation blur of 0.30° is −0.48 mm. In the telephoto end state, since the vibration reduction coefficient is −0.58 and the focal length is 67.41 mm, the moving distance of the vibration-reduction lens group VR for correcting the rotation blur of 0.30° is −0.61 mm.

Table 6 illustrates the values of respective specifications of Example 6. Surface numbers 1 to 40 in Table 6 correspond to optical surfaces of m1 to m40 illustrated in FIG. 16.

TABLE 6

[Lens Specification]

| Surface number | R | D | n(d) | νd |
|---|---|---|---|---|
| 1 | 144.94817 | 2.900 | 1.74389 | 49.5 |
| *2 | 29.83529 | 14.301 | 1.00000 | |
| *3 | −322.90228 | 0.300 | 1.56093 | 36.6 |
| 4 | −228.59270 | 2.100 | 1.80400 | 46.6 |
| 5 | 65.19707 | 0.200 | 1.00000 | |
| 6 | 54.96083 | 5.379 | 2.00100 | 29.1 |
| 7 | 130.46571 | D7 | 1.00000 | |
| 8 | 127.91888 | 3.200 | 1.59349 | 67.0 |
| 9 | −2245.90430 | 1.780 | 1.00000 | |
| 10 | 81.17716 | 3.500 | 1.69680 | 55.5 |
| 11 | 679.72724 | 2.453 | 1.00000 | |
| 12 | 61.05134 | 5.724 | 1.59349 | 67.0 |
| 13 | −130.20006 | 1.500 | 1.90366 | 31.3 |
| 14 | 46.24112 | 1.694 | 1.00000 | |
| 15 | 77.95470 | 3.722 | 1.77250 | 49.6 |
| 16 | −564.05655 | D16 | 1.00000 | |
| 17 | 60.46759 | 5.400 | 1.80400 | 46.6 |
| 18 | −263.45861 | D18 | 1.00000 | |
| 19 | (Aperture stop) | 2.000 | 1.00000 | |
| 20 | −140.00000 | 1.178 | 1.77250 | 49.6 |
| 21 | 35.60000 | 4.059 | 1.00000 | |
| 22 | −35.16240 | 1.200 | 1.72916 | 54.6 |
| 23 | −51.36153 | 0.100 | 1.00000 | |
| 24 | 69.55169 | 2.879 | 1.90200 | 25.3 |
| 25 | −209.71368 | D25 | 1.00000 | |
| *26 | −118.85935 | 1.100 | 1.77250 | 49.6 |
| 27 | 54.49135 | 1.415 | 1.00000 | |
| 28 | 60.78441 | 2.635 | 1.90200 | 25.3 |
| 29 | 331.09581 | D29 | 1.00000 | |
| *30 | 118.81221 | 4.686 | 1.55332 | 71.7 |
| 31 | −102.83315 | 0.100 | 1.00000 | |
| 32 | 152.27830 | 1.300 | 1.72000 | 28.0 |
| 33 | 85.35751 | 6.402 | 1.59319 | 67.9 |
| 34 | −54.69093 | 0.188 | 1.00000 | |
| 35 | 959.47501 | 7.222 | 1.49700 | 81.6 |
| 36 | −30.23774 | 1.400 | 1.70600 | 29.0 |
| *37 | 1029.85760 | D37 | 1.00000 | |
| 38 | 53.49812 | 4.770 | 1.55332 | 71.7 |
| 39 | −6970.92580 | 1.400 | 1.90366 | 31.3 |
| 40 | 100.00000 | D40 | 1.00000 | |

[Aspheric Data]

| Surface | κ | A4 | A6 | A8 | A10 |
|---|---|---|---|---|---|
| 2 | −1.01100e−01 | 1.43852e−06 | 1.71179e−09 | −1.42870e−12 | 1.05723e−15 |
| 3 | 2.81381e+01 | −7.54473e−07 | 4.14335e−10 | −5.77466e−13 | 3.16668e−16 |
| 26 | −1.90000e+01 | −9.14707e−07 | 9.49568e−10 | 0.00000e+00 | 0.00000e+00 |
| 30 | −1.43460e+00 | 2.27762e−06 | −5.51593e−10 | 0.00000e+00 | 0.00000e+00 |
| 37 | 2.44600e+03 | 4.05698e−06 | 0.00000e+00 | 0.00000e+00 | 0.00000e+00 |

[Various Data]

| | W | M | T |
|---|---|---|---|
| f | 24.73 | 47.48 | 67.41 |
| FNo | 2.90 | 2.90 | 2.93 |
| ω | 42.5 | 23.9 | 17.3 |
| Y | 21.60 | 21.60 | 21.60 |
| TL | 218.388 | 200.467 | 201.434 |
| BF | 41.880 | 42.603 | 42.530 |
| BF (air-conversion length) | 41.880 | 42.603 | 42.530 |

[Variable Distance Data]

Focusing on infinity

| | W | M | T |
|---|---|---|---|
| D0 | ∞ | ∞ | ∞ |
| Magnification | — | — | — |
| f | 24.73 | 47.48 | 67.41 |
| D7 | 49.003 | 12.690 | 1.835 |
| D16 | 7.750 | 9.500 | 8.500 |
| D18 | 1.450 | 17.000 | 30.000 |

TABLE 6-continued

| | | | |
|---|---|---|---|
| D25 | 1.100 | 2.500 | 1.473 |
| D29 | 17.519 | 7.700 | 1.450 |
| D37 | 1.500 | 10.288 | 17.459 |
| D40 | 41.880 | 42.603 | 42.530 |

[Lens Group Data]

| Lens group | Starting surface | Focal length |
|---|---|---|
| 1st lens group | 1 | −38.88 |
| 2nd lens group | 8 | 80.98 |
| 3rd lens group | 17 | 61.63 |
| 4th lens group | 19 | −71.15 |
| 5th lens group | 26 | −121.45 |
| 6th lens group | 30 | 56.98 |
| 7th lens group | 38 | 619.99 |

[Focusing Data]

| | W | M | T |
|---|---|---|---|
| Lens moving distance | 6.75 | 8.50 | 7.50 |
| Imaging distance (m) | 0.4145 | 0.3406 | 0.3816 |

[Conditional Expression Correspondence Values]

Conditional Expression (1)   f(1~Gn)t/ft = 5.692
Conditional Expression (2)   −f(Gn~G(VR))w/fw = 1.704
Conditional Expression (3)   f(RP)/f(FP) = 1.352
Conditional Expression (4)   ωt = 17.3
Conditional Expression (5)   ωw = 42.5

It is understood from Table 6 that the variable magnification optical system ZL6 according to Example 6 satisfies Conditional Expressions (1) to (5).

Figure 17:
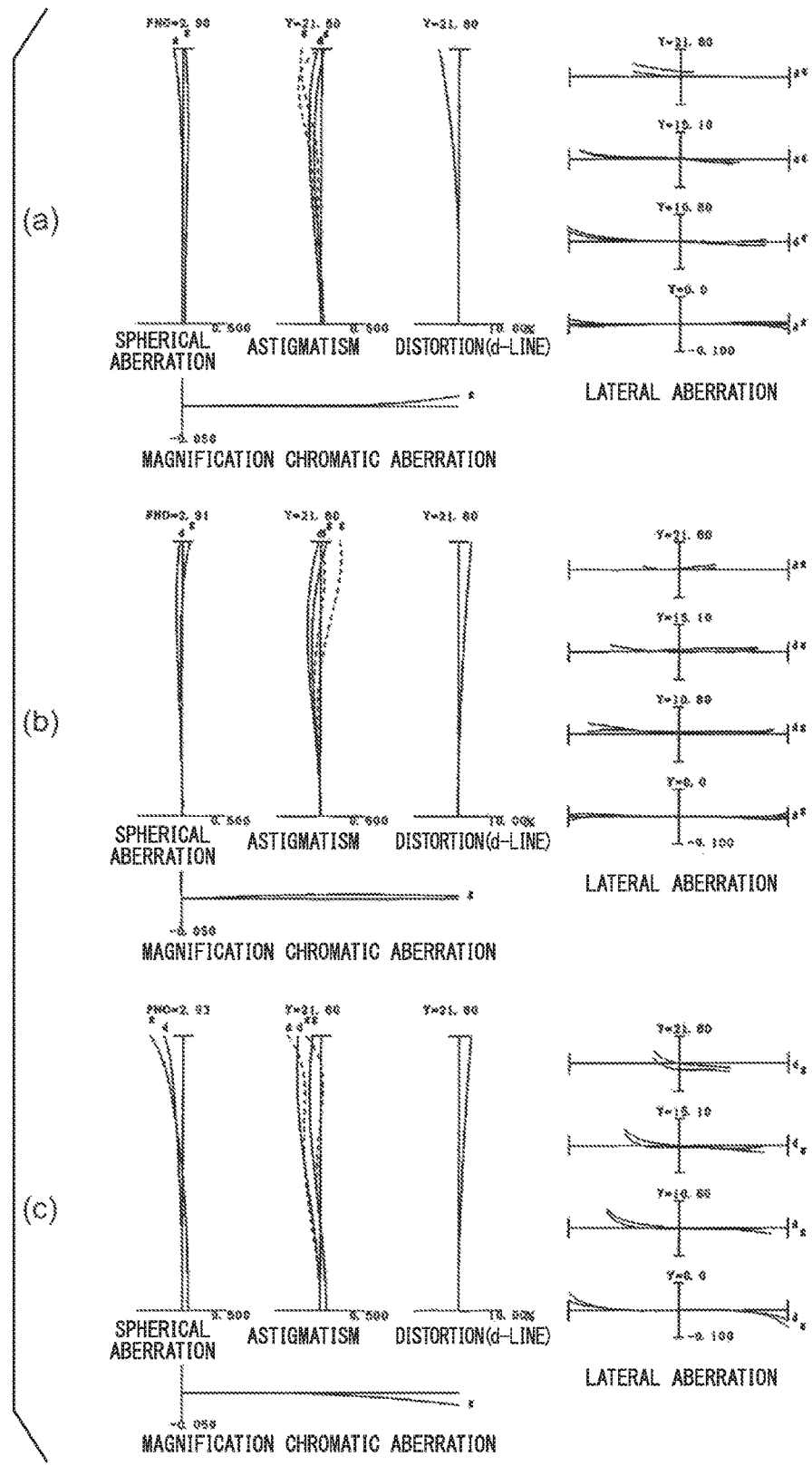
FIG. 17 shows graphs illustrating various aberrations of the variable magnification optical system according to Example 6 upon focusing on infinity, wherein parts (a), (b), and (c) are in the wide-angle end state, the intermediate focal length state, and the telephoto end state, respectively.
Figure 18:
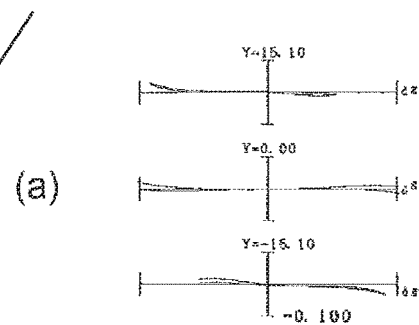
FIG. 18 shows graphs illustrating lateral aberrations of the variable magnification optical system according to Example 6 after image blur correction was performed upon focusing on infinity, wherein parts (a), (b), and (c) are in the wide-angle end state, the intermediate focal length state, and the telephoto end state, respectively.
Figure 18:
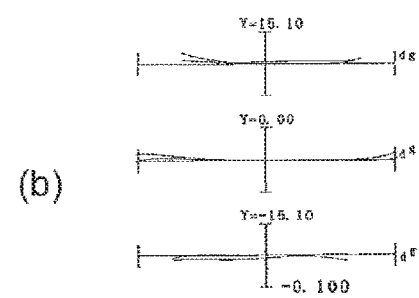
Figure 18:
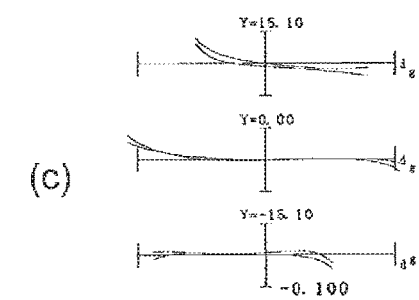

FIG. 17 shows graphs illustrating various aberrations (spherical aberration, astigmatism, distortion, magnification chromatic aberration, and lateral aberration) upon focusing on infinity, of the variable magnification optical system ZL6 according to Example 6, in which part (a) illustrates the wide-angle end state, part (b) illustrates the intermediate focal length state, and part (c) illustrates the telephoto end state. FIG. 18 shows graphs illustrating lateral aberration of the variable magnification optical system ZL6 according to Example 6 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 18.

As is obvious from respective aberration graphs, it is understood that the variable magnification optical system ZL6 according to Example 6 has a satisfactory optical performance such that aberrations are satisfactorily corrected in states ranging from the wide-angle end state to the telephoto end state. Moreover, it is understood that the variable magnification optical system ZL6 has an excellent imaging performance upon image blur correction.

Example 7

Figure 19:
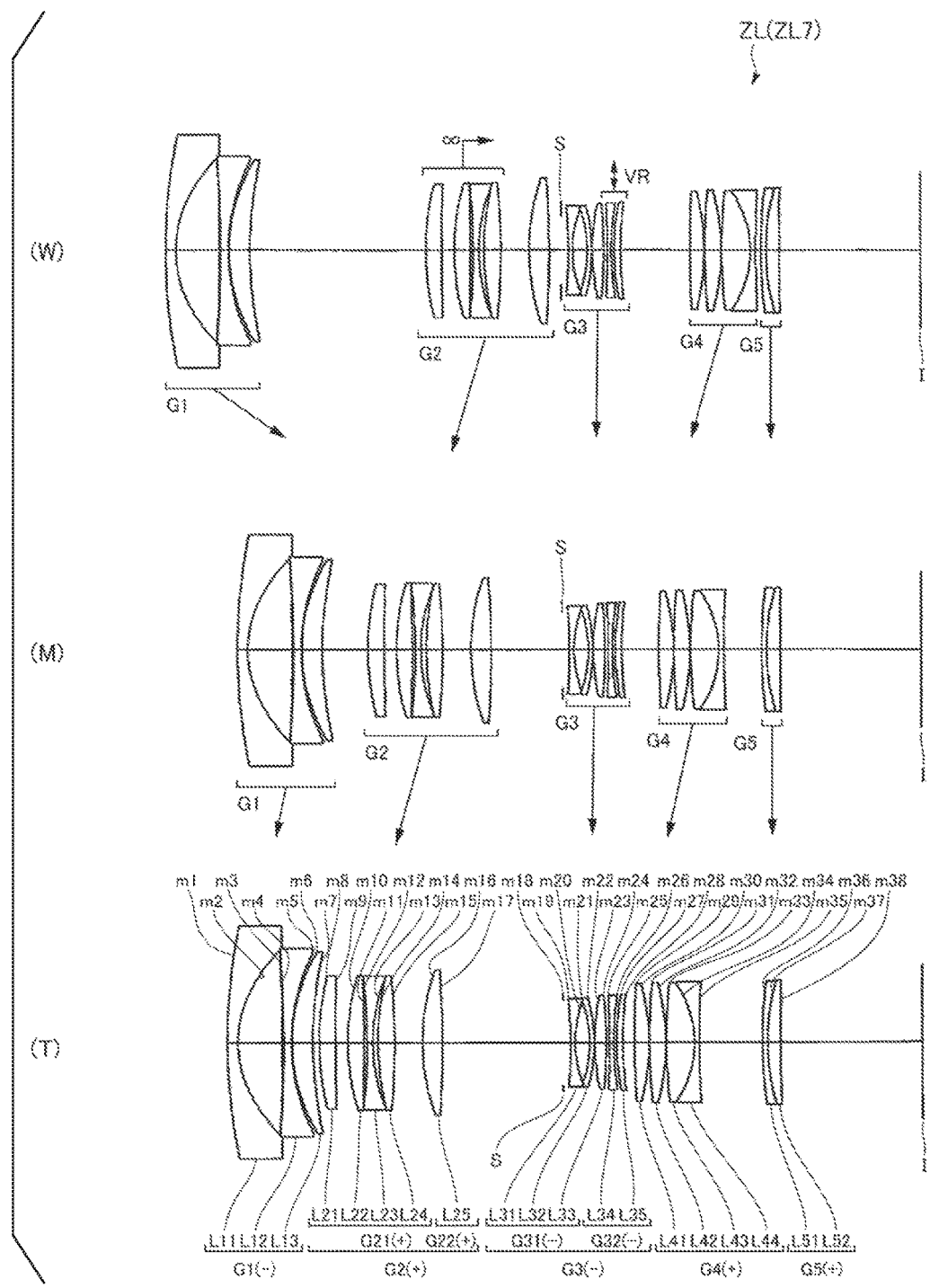
FIG. 19 is a cross-sectional view of a variable magnification optical system according to Example 7, wherein parts (W), (M), and (T) are in a wide-angle end state, an intermediate focal length state, and a telephoto end state, respectively.

Example 7 will be described with reference to FIGS. 19 to 21 and Table 7. As illustrated in FIG. 19, a variable magnification optical system ZL (ZL7) according to Example 7 is constituted by, in order from an object, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 is constituted by, in order from the object, a 21st lens group G21 (a focusing lens group) having a positive refractive power and a 22nd lens group G22 having a positive refractive power.

The 21st lens group G21 is constituted by, in order from the object, a positive meniscus lens L21 having a convex surface oriented toward the object side, a biconvex lens L22, a biconcave lens L23, and a biconvex lens L24. The 22nd lens group G22 is constituted by a biconvex lens L25.

The third lens group G3 is constituted by, in order from the object, an aperture stop S, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31, a negative meniscus lens L32 having a concave surface oriented toward the object side, and a biconvex lens L33. The 32nd lens group G32 is constituted by, in order from the object, a biconcave lens L34 and a positive meniscus lens L35 having a convex surface oriented toward the object side. The biconcave lens L34 has an aspherical object-side surface.

The fourth lens group G4 is constituted by, in order from the object, a biconvex lens L41, a biconvex lens L42, and a cemented lens including a biconvex lens L43 and a biconcave lens L44. The biconvex lens L41 has an aspherical object-side surface.

The fifth lens group G5 is constituted by a cemented lens including, in order from an object, a negative meniscus lens L51 having a concave surface oriented toward the image side and a positive meniscus lens L52 having a convex surface oriented toward the object side.

Varying magnification from the wide-angle end state to the telephoto end state is performed by moving the first lens group G1 toward the image side and then moving the first lens group G1 toward the object side, moving the second lens group G2 toward the object side, and moving the fourth lens group G4 toward the object side such that the distances between the respective lens groups are changed. The third lens group G3 and the fifth lens group G5 are immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 7, in the wide-angle end state, since the vibration reduction coefficient is −0.46 and the focal length is 24.77 mm, the moving distance of the vibration-reduction lens group VR for correcting the rotation blur of 0.30° is −0.29 mm. In the intermediate focal length state, since the vibration reduction coefficient is −0.52 and the focal length is 47.50 mm, the moving distance of the vibration-reduction lens group VR for correcting the rotation blur of 0.30° is −0.48 mm. In the telephoto end state, since the vibration reduction coefficient is −0.58 and the focal length is 67.86 mm, the moving distance of the vibration-reduction lens group VR for correcting the rotation blur of 0.30° is −0.62 mm.

Table 7 illustrates the values of respective specifications of Example 7. Surface numbers 1 to 38 in Table 7 correspond to optical surfaces of m1 to m38 illustrated in FIG. 19.

TABLE 7

[Lens Specification]

| Surface number | R | D | n(d) | νd |
|---|---|---|---|---|
| 1 | 155.89691 | 2.900 | 1.74389 | 49.5 |
| *2 | 29.88191 | 12.307 | 1.00000 | |
| *3 | −998.95016 | 0.380 | 1.56093 | 36.6 |
| 4 | −380.00000 | 2.100 | 1.75500 | 52.3 |
| 5 | 54.41504 | 0.200 | 1.00000 | |
| 6 | 48.25639 | 5.777 | 1.90200 | 25.3 |
| 7 | 111.71017 | D7 | 1.00000 | |
| 8 | 75.52522 | 4.500 | 1.75000 | 53.0 |
| 9 | 599.23665 | 3.427 | 1.00000 | |
| 10 | 65.44832 | 4.500 | 1.75500 | 52.3 |
| 11 | −536.13486 | 0.864 | 1.00000 | |
| 12 | −161.64034 | 1.550 | 1.90200 | 25.3 |
| 13 | 48.60000 | 1.455 | 1.00000 | |
| 14 | 77.92408 | 4.650 | 1.77250 | 49.6 |
| 15 | −199.82321 | D15 | 1.00000 | |
| 16 | 59.54554 | 5.676 | 1.81600 | 46.6 |
| 17 | −305.53264 | D17 | 1.00000 | |
| 18 | (Aperture stop) | 2.000 | 1.00000 | |
| 19 | −140.00000 | 1.200 | 1.77250 | 49.6 |
| 20 | 34.07853 | 4.022 | 1.00000 | |
| 21 | −34.00000 | 1.200 | 1.72916 | 54.6 |
| 22 | −47.36695 | 0.100 | 1.00000 | |
| 23 | 60.05931 | 3.182 | 1.84666 | 23.8 |
| 24 | −160.47286 | D24 | 1.00000 | |
| *25 | −266.90180 | 1.100 | 1.77250 | 49.6 |
| 26 | 80.68524 | 0.780 | 1.00000 | |
| 27 | 68.16544 | 1.736 | 1.84666 | 23.8 |
| 28 | 100.00000 | D28 | 1.00000 | |
| *29 | 300.52804 | 4.082 | 1.55332 | 71.7 |
| 30 | −61.39111 | 0.100 | 1.00000 | |
| 31 | 178.14990 | 4.513 | 1.60300 | 65.4 |
| 32 | −65.35343 | 0.200 | 1.00000 | |
| 33 | 142.59265 | 7.934 | 1.65160 | 58.6 |
| 34 | −28.88978 | 1.400 | 1.90200 | 29.1 |
| 35 | 300.00000 | D35 | 1.00000 | |
| 36 | 137.03160 | 1.400 | 1.83000 | 37.0 |
| 37 | 64.66324 | 3.650 | 1.59319 | 67.9 |
| 38 | 735.00000 | D38 | 1.00000 | |

TABLE 7-continued

[Aspheric Data]

| Surface | κ | A4 | A6 | A8 | A10 |
|---|---|---|---|---|---|
| 2 | −9.54700e−01 | 5.69885e−06 | −1.82979e−09 | 8.49633e−13 | 0.00000e+00 |
| 3 | −1.40000e+01 | −6.77491e−07 | −2.49807e−10 | 0.00000e+00 | 0.00000e+00 |
| 25 | −1.90000e+01 | 3.06942e−07 | −6.70956e−10 | 0.00000e+00 | 0.00000e+00 |
| 29 | 5.86950e+00 | −6.89526e−07 | 2.25877e−09 | 0.00000e+00 | 0.00000e+00 |

[Various Data]

| | W | M | T |
|---|---|---|---|
| f | 24.77 | 47.50 | 67.86 |
| FNo | 2.90 | 2.90 | 2.90 |
| ω | 42.4 | 23.9 | 17.2 |
| Y | 21.60 | 21.60 | 21.60 |
| TL | 210.992 | 190.994 | 193.977 |
| BF | 39.982 | 39.983 | 40.044 |
| BF (air-conversion length) | 39.982 | 39.983 | 40.044 |

[Variable Distance Data]

Focusing on infinity

| | W | M | T |
|---|---|---|---|
| D0 | ∞ | ∞ | ∞ |
| Magnification | — | — | — |
| f | 24.77 | 47.50 | 67.86 |
| D7 | 49.068 | 12.647 | 1.800 |
| D15 | 7.785 | 7.785 | 7.785 |
| D17 | 3.346 | 19.816 | 33.635 |
| D24 | 0.999 | 0.999 | 0.999 |
| D28 | 19.428 | 10.413 | 3.291 |
| D35 | 1.500 | 10.465 | 17.538 |
| D38 | 39.982 | 39.983 | 40.044 |

[Lens Group Data]

| Lens group | Starting surface | Focal length |
|---|---|---|
| 1st lens group | 1 | −38.96 |
| 2nd lens group | 8 | 42.92 |
| 21st lens group | 8 | 85.00 |
| 22nd lens group | 16 | 61.50 |
| 3rd lens group | 18 | −45.09 |
| 31st lens group | 18 | −84.08 |
| 32nd lens group | 25 | −117.85 |
| 4th lens group | 29 | 56.15 |
| 5th lens group | 36 | 620.00 |

[Focusing Data]

| | W | M | T |
|---|---|---|---|
| Lens moving distance | 6.785 | 6.785 | 6.785 |
| Imaging distance (m) | 0.3997 | 0.3832 | 0.4060 |

[Conditional Expression Correspondence Values]

| | |
|---|---|
| Conditional Expression (1) | f(1~Gn)t/ft = 3.792 |
| Conditional Expression (2) | −f(Gn~G(VR))w/fw = 1.820 |
| Conditional Expression (3) | f(RP)/f(FP) = 1.308 |
| Conditional Expression (4) | ωt = 17.2 |
| Conditional Expression (5) | ωw = 42.4 |

It is understood from Table 7 that the variable magnification optical system ZL7 according to Example 7 satisfies Conditional Expressions (1) to (5).

Figure 20:
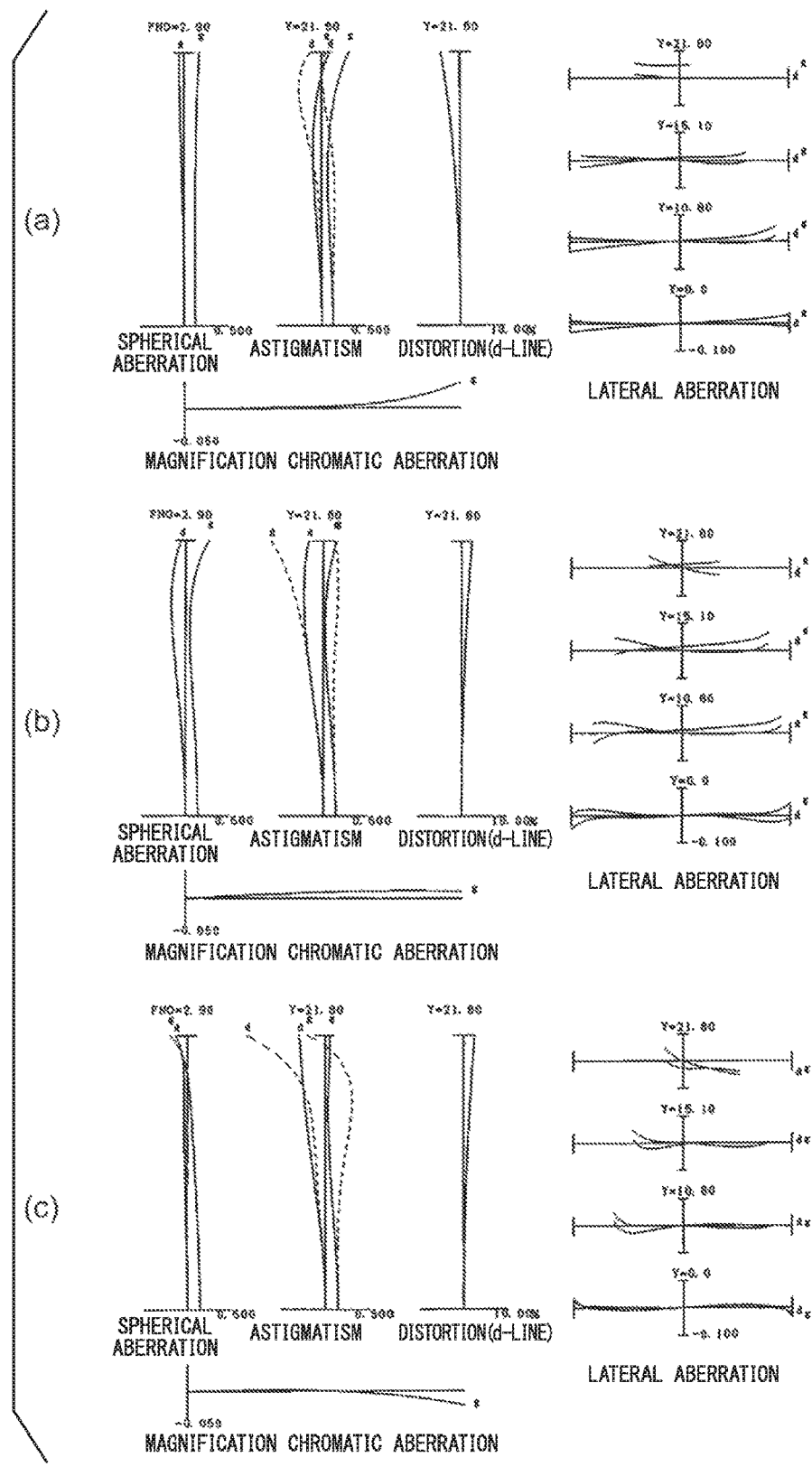
FIG. 20 shows graphs illustrating various aberrations of the variable magnification optical system according to Example 7 upon focusing on infinity, wherein parts (a), (b), and (c) are in the wide-angle end state, the intermediate focal length state, and the telephoto end state, respectively.
Figure 21:
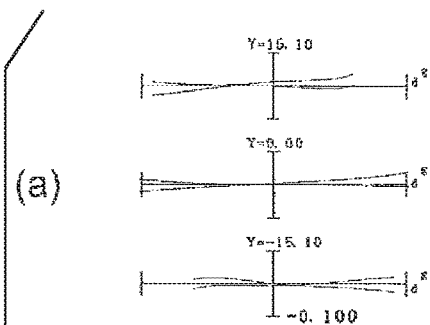
FIG. 21 shows graphs illustrating lateral aberrations of the variable magnification optical system according to Example 7 after image blur correction was performed upon focusing on infinity, wherein parts (a), (b), and (c) are in the wide-angle end state, the intermediate focal length state, and the telephoto end state, respectively.
Figure 21:
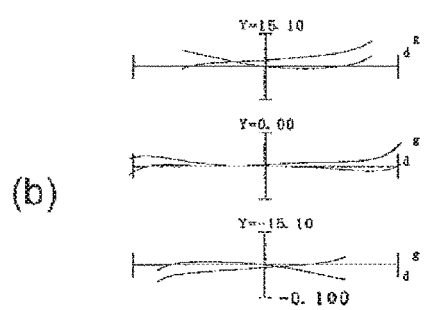
Figure 21:
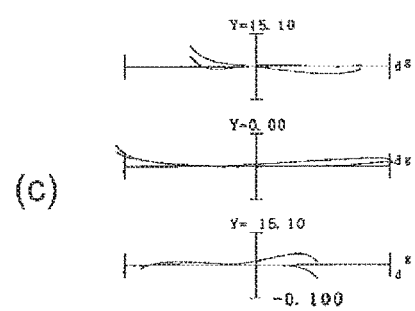

FIG. 20 shows graphs illustrating various aberrations (spherical aberration, astigmatism, distortion, magnification chromatic aberration, and lateral aberration) upon focusing on infinity, of the variable magnification optical system ZL7 according to Example 7, in which part (a) illustrates the wide-angle end state, part (b) illustrates the intermediate focal length state, and part (c) illustrates the telephoto end state. FIG. 21 shows graphs illustrating lateral aberration of the variable magnification optical system ZL7 according to Example 7 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 21.

As is obvious from respective aberration graphs, it is understood that the variable magnification optical system ZL7 according to Example 7 has a satisfactory optical performance such that aberrations are satisfactorily corrected in states ranging from the wide-angle end state to the telephoto end state. Moreover, it is understood that the variable magnification optical system ZL7 has an excellent imaging performance upon image blur correction.

Example 8

Figure 22:
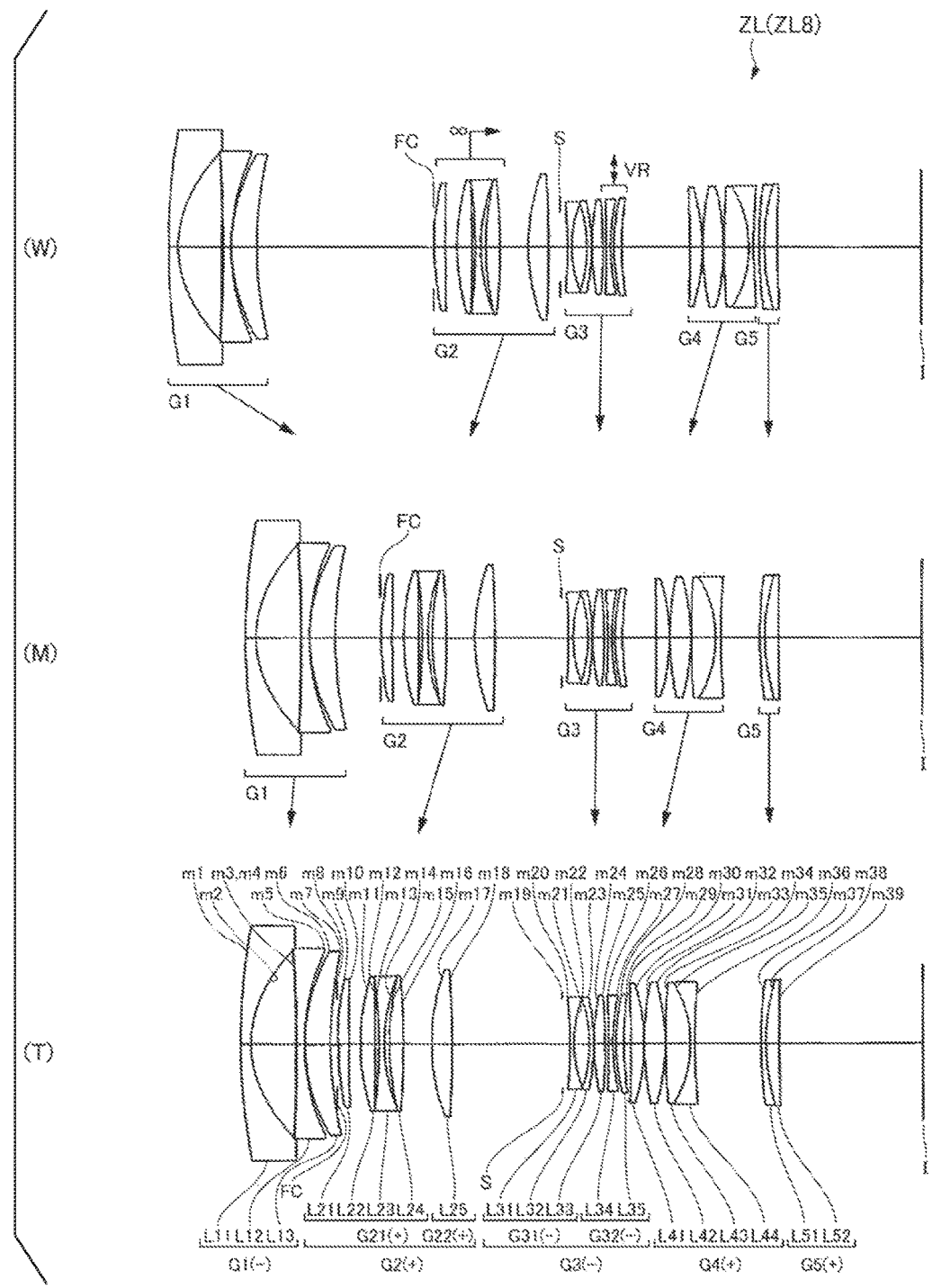
FIG. 22 is a cross-sectional view of a variable magnification optical system according to Example 8, wherein parts (W), (M), and (T) are in a wide-angle end state, an intermediate focal length state, and a telephoto end state, respectively.

Example 8 will be described with reference to FIGS. 22 to 24 and Table 8. As illustrated in FIG. 22, a variable magnification optical system ZL (ZL8) according to Example 8 is constituted by, in order from an object, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface. The biconcave lens L12 is a composite aspherical lens obtained by forming a resin layer formed on a glass surface on the object side into an aspherical surface.

The second lens group G2 is constituted by, in order from the object, a flare-cut diaphragm FC, a 21st lens group G21 (a focusing lens group) having a positive refractive power and a 22nd lens group G22 having a positive refractive power.

The 21st lens group G21 is constituted by, in order from the object, a positive meniscus lens L21 having a convex surface oriented toward the object side, a biconvex lens L22, a biconcave lens L23, and a biconvex lens L24. The 22nd lens group G22 is constituted by a biconvex lens L25.

The third lens group G3 is constituted by, in order from the object, an aperture stop S, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31, a negative meniscus lens L32 having a concave surface oriented toward the object side, and a biconvex lens L33. The 32nd lens group G32 is constituted by, in order from the object, a biconcave lens L34 and a positive meniscus lens L35 having a convex surface oriented toward the object side. The biconcave lens L34 has an aspherical object-side surface.

The fourth lens group G4 is constituted by, in order from the object, a positive meniscus lens L41 having a convex surface oriented toward the image side, a biconvex lens L42, and a cemented lens including a biconvex lens L43 and a biconcave lens L44. The positive meniscus lens L41 has an aspherical object-side surface.

The fifth lens group G5 is constituted by a cemented lens including, in order from an object, a negative meniscus lens L51 having a concave surface oriented toward the image side and a positive meniscus lens L52 having a convex surface oriented toward the object side.

Varying magnification from the wide-angle end state to the telephoto end state is performed by moving the first lens group G1 toward the image side and then moving the first lens group G1 toward the object side, moving the second lens group G2 toward the object side, and moving the fourth lens group G4 toward the object side such that the distances between the respective lens groups are changed. The third lens group G3 and the fifth lens group G5 are immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 8, in the wide-angle end state, since the vibration reduction coefficient is −0.50 and the focal length is 24.77 mm, the moving distance of the vibration-reduction lens group VR for correcting the rotation blur of 0.30° is −0.26 mm. In the intermediate focal length state, since the vibration reduction coefficient is −0.58 and the focal length is 47.50 mm, the moving distance of the vibration-reduction lens group VR for correcting the rotation blur of 0.30° is −0.43 mm. In the telephoto end state, since the vibration reduction coefficient is −0.66 and the focal length is 67.85 mm, the moving distance of the vibration-reduction lens group VR for correcting the rotation blur of 0.30° is −0.54 mm.

Table 8 illustrates the values of respective specifications of Example 8. Surface numbers 1 to 39 in Table 8 correspond to optical surfaces of m1 to m39 illustrated in FIG. 22.

TABLE 8

| [Lens Specification] | | | | |
| --- | --- | --- | --- | --- |
| Surface number | R | D | n(d) | νd |
| 1 | 171.22378 | 2.900 | 1.74389 | 49.5 |
| *2 | 29.77139 | 12.208 | 1.00000 | |
| *3 | −2272.73400 | 0.380 | 1.56093 | 36.6 |
| 4 | −400.00000 | 2.100 | 1.75500 | 52.3 |
| 5 | 59.96509 | 0.200 | 1.00000 | |

TABLE 8-continued

|  |  |  |  |  |
|---|---|---|---|---|
| 6 | 50.35816 | 7.000 | 1.90200 | 25.3 |
| 7 | 111.56759 | D7 | 1.00000 |  |
| 8 | 0.00000 | 0.200 | 1.00000 |  |
| 9 | 82.35931 | 3.100 | 1.75000 | 51.0 |
| 10 | 869.55661 | 3.243 | 1.00000 |  |
| 11 | 65.70660 | 4.150 | 1.77250 | 49.6 |
| 12 | −400.15117 | 0.889 | 1.00000 |  |
| 13 | −142.76803 | 1.550 | 1.90200 | 25.3 |
| 14 | 49.72103 | 1.379 | 1.00000 |  |
| 15 | 78.21406 | 4.000 | 1.77250 | 49.6 |
| 16 | −195.63433 | D16 | 1.00000 |  |
| 17 | 58.26284 | 5.676 | 1.81600 | 46.6 |
| 18 | −346.07444 | D18 | 1.00000 |  |
| 19 | (Aperture stop) | 2.000 | 1.00000 |  |
| 20 | −140.00000 | 1.200 | 1.77250 | 49.6 |
| 21 | 36.40792 | 4.110 | 1.00000 |  |
| 22 | −39.80791 | 1.200 | 1.72916 | 54.7 |
| 23 | −59.45079 | 0.100 | 1.00000 |  |
| 24 | 69.32659 | 3.085 | 1.84666 | 23.8 |
| 25 | −134.48153 | D25 | 1.00000 |  |
| *26 | −251.99331 | 1.100 | 1.77250 | 49.6 |
| 27 | 63.18500 | 0.868 | 1.00000 |  |
| 28 | 59.71324 | 2.131 | 1.86000 | 24.2 |
| 29 | 100.00000 | D29 | 1.00000 |  |
| *30 | −900.00000 | 3.663 | 1.55332 | 71.7 |
| 31 | −54.18440 | 0.100 | 1.00000 |  |
| 32 | 84.94639 | 5.806 | 1.60300 | 65.5 |
| 33 | −60.43832 | 0.200 | 1.00000 |  |
| 34 | 278.20778 | 6.810 | 1.65160 | 58.5 |
| 35 | −32.56689 | 1.400 | 1.90200 | 28.5 |
| 36 | 191.68646 | D36 | 1.00000 |  |
| 37 | 132.64391 | 1.400 | 1.83000 | 34.0 |
| 38 | 61.28313 | 3.734 | 1.59319 | 67.9 |
| 39 | 735.00000 | D39 | 1.00000 |  |

[Aspheric Data]

| Surface | κ | A4 | A6 | A8 | A10 |
|---|---|---|---|---|---|
| 2 | −3.84000e−01 | 2.66465e−06 | −1.34312e−10 | −5.72743e−14 | 0.00000e+00 |
| 3 | 3.50000e+00 | −9.48227e−07 | −3.38888e−10 | 0.00000e+00 | 0.00000e+00 |
| 26 | −2.80000e+01 | 3.11252e−07 | −7.78416e−10 | 0.00000e+00 | 0.00000e+00 |
| 30 | −6.00000e+00 | −1.99894e−06 | 1.27933e−09 | 0.00000e+00 | 0.00000e+00 |

[Various Data]

|  | W | M | T |
|---|---|---|---|
| f | 24.77 | 47.50 | 67.85 |
| FNo | 2.90 | 2.90 | 2.90 |
| ω | 42.4 | 24.0 | 17.2 |
| Y | 21.60 | 21.60 | 21.60 |
| TL | 209.253 | 187.862 | 189.544 |
| BF | 40.016 | 40.020 | 40.085 |
| BF (air-conversion length) | 40.016 | 40.020 | 40.085 |

[Variable Distance Data]

Focusing on infinity

|  | W | M | T |
|---|---|---|---|
| D0 | ∞ | ∞ | ∞ |
| Magnification | — | — | — |
| f | 24.77 | 47.50 | 67.85 |
| D7 | 49.018 | 12.518 | 1.800 |
| D16 | 7.835 | 7.835 | 7.835 |
| D18 | 3.200 | 18.355 | 30.700 |
| D25 | 0.930 | 0.930 | 0.930 |
| D29 | 18.873 | 9.373 | 1.900 |
| D36 | 1.500 | 10.950 | 18.413 |
| D39 | 40.016 | 40.020 | 40.085 |

[Lens Group Data]

| Lens group | Starting surface | Focal length |
|---|---|---|
| 1st lens group | 1 | −39.60 |
| 2nd lens group | 8 | 41.35 |
| 21st lens group | 8 | 84.99 |

TABLE 8-continued

| 22nd lens group | 17 | 61.50 |
|---|---|---|
| 3rd lens group | 19 | −43.44 |
| 31st lens group | 19 | −85.70 |
| 32nd lens group | 26 | −106.03 |
| 4th lens group | 30 | 54.89 |
| 5th lens group | 37 | 619.95 |

[Focusing Data]

| | W | M | T |
|---|---|---|---|
| Lens moving distance | 6.835 | 6.835 | 6.835 |
| Imaging distance (m) | 0.4055 | 0.3839 | 0.4040 |

[Conditional Expression Correspondence Values]

| Conditional Expression (1) | f(1~Gn)t/ft = 3.390 |
|---|---|
| Conditional Expression (2) | −f(Gn~G(VR))w/fw = 1.754 |
| Conditional Expression (3) | f(RP)/f(FP) = 1.327 |
| Conditional Expression (4) | ωt = 17.2 |
| Conditional Expression (5) | ωw = 42.4 |

It is understood from Table 8 that the variable magnification optical system ZL8 according to Example 8 satisfies Conditional Expressions (1) to (5).

Figure 23:
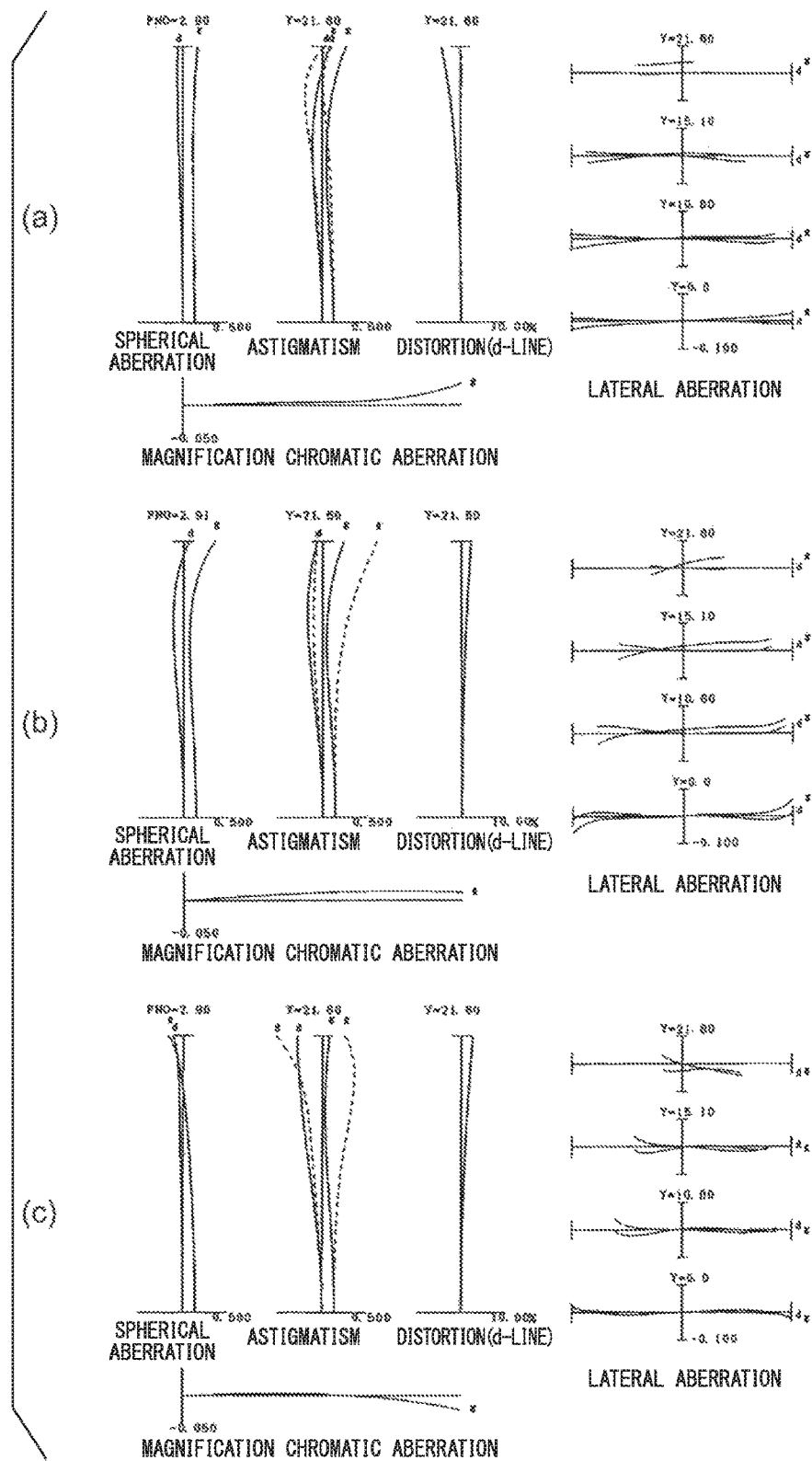
FIG. 23 shows graphs illustrating various aberrations of the variable magnification optical system according to Example 8 upon focusing on infinity, wherein parts (a), (b), and (c) are in the wide-angle end state, the intermediate focal length state, and the telephoto end state, respectively.
Figure 24:
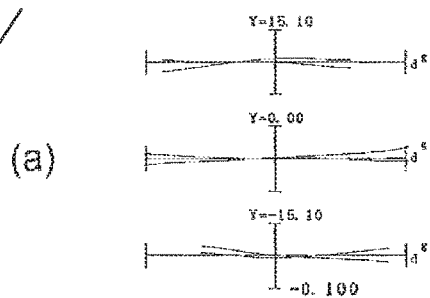
FIG. 24 shows graphs illustrating lateral aberrations of the variable magnification optical system according to Example 8 after image blur correction was performed upon focusing on infinity, wherein parts (a), (b), and (c) are in the wide-angle end state, the intermediate focal length state, and the telephoto end state, respectively.
Figure 24:
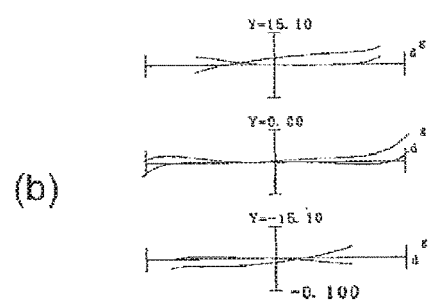
Figure 24:
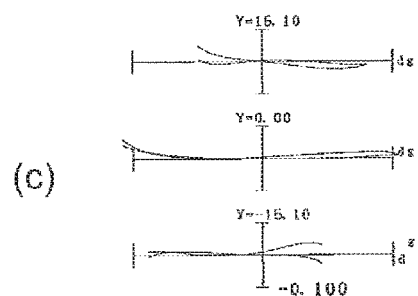

FIG. 23 shows graphs illustrating various aberrations (spherical aberration, astigmatism, distortion, magnification chromatic aberration, and lateral aberration) upon focusing on infinity, of the variable magnification optical system ZL8 according to Example 8, in which part (a) illustrates the wide-angle end state, part (b) illustrates the intermediate focal length state, and part (c) illustrates the telephoto end state. FIG. 24 shows graphs illustrating lateral aberration of the variable magnification optical system ZL8 according to Example 8 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 24.

As is obvious from respective aberration graphs, it is understood that the variable magnification optical system ZL8 according to Example 8 has a satisfactory optical performance such that aberrations are satisfactorily corrected in states ranging from the wide-angle end state to the telephoto end state. Moreover, it is understood that the variable magnification optical system ZL8 has an excellent imaging performance upon image blur correction.

Example 9

Figure 25:
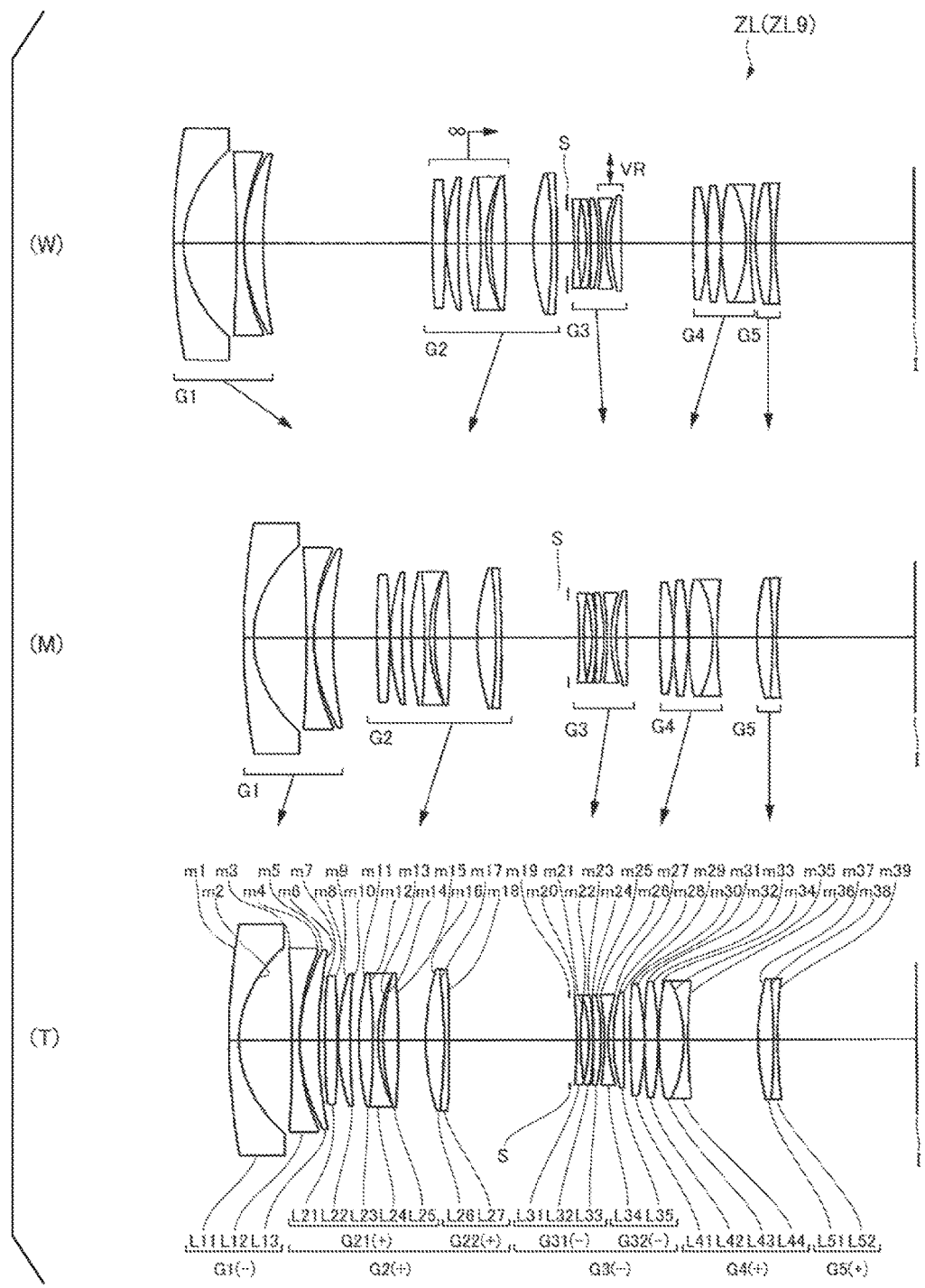
FIG. 25 is a cross-sectional view of a variable magnification optical system according to Example 9, wherein parts (W), (M), and (T) are in a wide-angle end state, an intermediate focal length state, and a telephoto end state, respectively.

Example 9 will be described with reference to FIGS. 25 to 27 and Table 9. As illustrated in FIG. 25, a variable magnification optical system ZL (ZL9) according to Example 9 is constituted by, in order from an object, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object, a negative meniscus lens L11 having a concave surface oriented toward the image side, a biconcave lens L12, and a positive meniscus lens L13 having a convex surface oriented toward the object side. The negative meniscus lens L11 has an aspherical image-side surface.

The second lens group G2 is constituted by, in order from the object, a 21st lens group G21 (a focusing lens group) having a positive refractive power and a 22nd lens group G22 having a positive refractive power.

The 21st lens group G21 is constituted by, in order from the object, a biconvex lens L21, a positive meniscus lens L22 having a convex surface oriented toward the object side, a cemented lens including a biconvex lens L23 and a biconcave lens L24, and a biconvex lens L25. The 22nd lens group G22 is constituted by a cemented lens including, in order from an object, a biconvex lens L26 and a negative meniscus lens L27 having a concave surface oriented toward the object side.

The third lens group G3 is constituted by, in order from the object, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31, a negative meniscus lens L32 having a concave surface oriented toward the object side, and a positive meniscus lens L33 having a convex surface oriented toward the image side. The 32nd lens group G32 is constituted by, in order from the object, a biconcave lens L34 and a biconvex lens L35. The biconcave lens L34 has an aspherical surface on both sides thereof.

The fourth lens group G4 is constituted by, in order from the object, a biconvex lens L41, a biconvex lens L42, and a cemented lens including a biconvex lens L43 and a biconcave lens L44. The biconvex lens L41 has an aspherical object-side surface. The biconcave lens L44 has an aspherical image-side surface.

The fifth lens group G5 is constituted by a cemented lens including a biconvex lens L51 and a biconcave lens L52 arranged in that order from the object.

An aperture stop S is disposed between the second lens group G2 and the third lens group G3.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the image side and then moving the same toward the object side, and moving the fourth lens group G4 toward the object side such that the distances between the respective lens groups are changed. The fifth lens group G5 and the aperture stop S are immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 9, in the wide-angle end state, since the vibration reduction coefficient is −0.51 and the focal length is 24.77 mm, the moving distance of the vibration-reduction lens group VR for correcting the rotation blur of 0.30° is −0.25 mm. In the intermediate focal length state, since the vibration reduction coefficient is −0.57 and the focal length is 47.50 mm, the moving distance of the vibration-reduction lens group VR for correcting the rotation blur of 0.30° is −0.43 mm. In the telephoto end state, since the vibration reduction coefficient is −0.66 and the focal length is 67.85 mm, the moving distance of the vibration-reduction lens group VR for correcting the rotation blur of 0.30° is −0.54 mm.

Table 9 illustrates the values of respective specifications of Example 9. Surface numbers 1 to 39 in Table 9 correspond to optical surfaces of m1 to m39 illustrated in FIG. 25.

TABLE 9

[Lens Specification]

| Surface number | R | D | n(d) | νd |
|---|---|---|---|---|
| 1 | 180.28031 | 2.900 | 1.74389 | 49.5 |
| *2 | 30.43353 | 15.281 | 1.00000 | |
| 3 | −400.00000 | 2.100 | 1.80400 | 46.6 |
| 4 | 61.64102 | 0.200 | 1.00000 | |
| 5 | 52.74108 | 5.413 | 2.00100 | 29.1 |
| 6 | 127.21255 | D6 | 1.00000 | |
| 7 | 250.61095 | 3.650 | 1.48749 | 70.3 |
| 8 | −249.39202 | 0.258 | 1.00000 | |
| 9 | 60.71776 | 3.347 | 1.69680 | 55.5 |
| 10 | 223.73133 | 2.543 | 1.00000 | |
| 11 | 88.72642 | 4.052 | 1.59349 | 67.0 |
| 12 | −200.28776 | 1.450 | 1.90366 | 31.3 |
| 13 | 46.94856 | 1.456 | 1.00000 | |
| 14 | 71.21863 | 4.324 | 1.77250 | 49.6 |
| 15 | −259.88006 | D15 | 1.00000 | |
| 16 | 64.61643 | 5.373 | 1.80400 | 46.6 |
| 17 | −171.33576 | 1.500 | 1.85026 | 32.4 |
| 18 | −427.99181 | D18 | 1.00000 | |
| 19 | (Aperture stop) | D19 | 1.00000 | |
| 20 | −140.00000 | 1.200 | 1.77250 | 49.6 |
| 21 | 98.73269 | 2.349 | 1.00000 | |
| 22 | −46.53449 | 1.200 | 1.76000 | 50.0 |
| 23 | −88.62573 | 0.100 | 1.00000 | |
| 24 | −227.14142 | 2.169 | 1.90200 | 25.3 |
| 25 | −65.70168 | D25 | 1.00000 | |
| *26 | −82.31022 | 1.100 | 1.77250 | 49.6 |
| *27 | 41.14809 | 1.433 | 1.00000 | |
| 28 | 50.51593 | 3.020 | 1.90200 | 25.3 |
| 29 | −7587.28970 | D29 | 1.00000 | |
| *30 | 445.83969 | 3.966 | 1.55332 | 71.7 |
| 31 | −73.29859 | 0.100 | 1.00000 | |
| 32 | 153.51046 | 3.949 | 1.60300 | 65.4 |
| 33 | −101.27922 | 0.200 | 1.00000 | |
| 34 | 86.09865 | 7.212 | 1.59319 | 67.9 |
| 35 | −40.79305 | 1.200 | 1.79000 | 26.0 |
| *36 | 180.00000 | D36 | 1.00000 | |
| 37 | 69.32616 | 4.432 | 1.61800 | 63.3 |
| 38 | −225.96343 | 1.200 | 1.90366 | 31.3 |
| 39 | 140.29946 | D39 | 1.00000 | |

[Aspheric Data]

| Surface | κ | A4 | A6 | A8 | A10 |
|---|---|---|---|---|---|
| 2 | −1.14500e−01 | 2.30934e−06 | 4.18972e−10 | 6.24631e−13 | 0.00000e+00 |
| 26 | −4.22870e+00 | 4.95698e−23 | 1.31315e−09 | 0.00000e+00 | 0.00000e+00 |
| 27 | 5.80700e−01 | 3.38518e−07 | 0.00000e+00 | 0.00000e+00 | 0.00000e+00 |
| 30 | 1.94200e−01 | 3.81661e−06 | −2.35375e−09 | 0.00000e+00 | 0.00000e+00 |
| 36 | 1.00000e+00 | 4.12000e−06 | 0.00000e+00 | 0.00000e+00 | 0.00000e+00 |

TABLE 9-continued

[Various Data]

|   | W | M | T |
|---|---|---|---|
| f | 24.77 | 47.50 | 67.85 |
| FNo | 2.90 | 2.90 | 2.92 |
| ω | 42.3 | 23.9 | 17.2 |
| Y | 21.60 | 21.60 | 21.60 |
| TL | 214.110 | 194.068 | 198.548 |
| BF | 40.318 | 40.318 | 40.378 |
| BF (air-conversion length) | 40.318 | 40.318 | 40.378 |

[Variable Distance Data]

Focusing on infinity

|   | W | M | T |
|---|---|---|---|
| D0 | ∞ | ∞ | ∞ |
| Magnification | — | — | — |
| f | 24.77 | 47.50 | 67.85 |
| D6 | 49.013 | 12.596 | 1.845 |
| D15 | 7.840 | 7.840 | 7.840 |
| D18 | 3.000 | 19.375 | 34.606 |
| D19 | 2.000 | 3.243 | 2.000 |
| D25 | 0.930 | 0.930 | 0.930 |
| D29 | 20.833 | 9.633 | 1.900 |
| D36 | 1.500 | 11.458 | 20.373 |
| D39 | 40.318 | 40.318 | 40.378 |

[Lens Group Data]

| Lens group | Starting surface | Focal length |
|---|---|---|
| 1st lens group | 1 | −39.13 |
| 2nd lens group | 7 | 43.78 |
| 21st lens group | 7 | 80.97 |
| 22nd lens group | 16 | 71.04 |
| 3rd lens group | 20 | −48.53 |
| 31st lens group | 20 | −95.21 |
| 32nd lens group | 26 | −105.72 |
| 4th lens group | 30 | 57.82 |
| 5th lens group | 37 | 700.00 |

[Focusing Data]

|   | W | M | T |
|---|---|---|---|
| Lens moving distance | 6.840 | 6.840 | 6.840 |
| Imaging distance (m) | 0.4165 | 0.3788 | 0.3972 |

[Conditional Expression Correspondence Values]

| Conditional Expression (1) | f(1~Gn)t/ft = 3.127 |
| Conditional Expression (2) | −f(Gn~G(VR))w/fw = 1.959 |
| Conditional Expression (3) | f(RP)/f(FP) = 1.321 |
| Conditional Expression (4) | ωt = 17.2 |
| Conditional Expression (5) | ωw = 42.3 |

It is understood from Table 9 that the variable magnification optical system ZL9 according to Example 9 satisfies Conditional Expressions (1) to (5).

Figure 26:
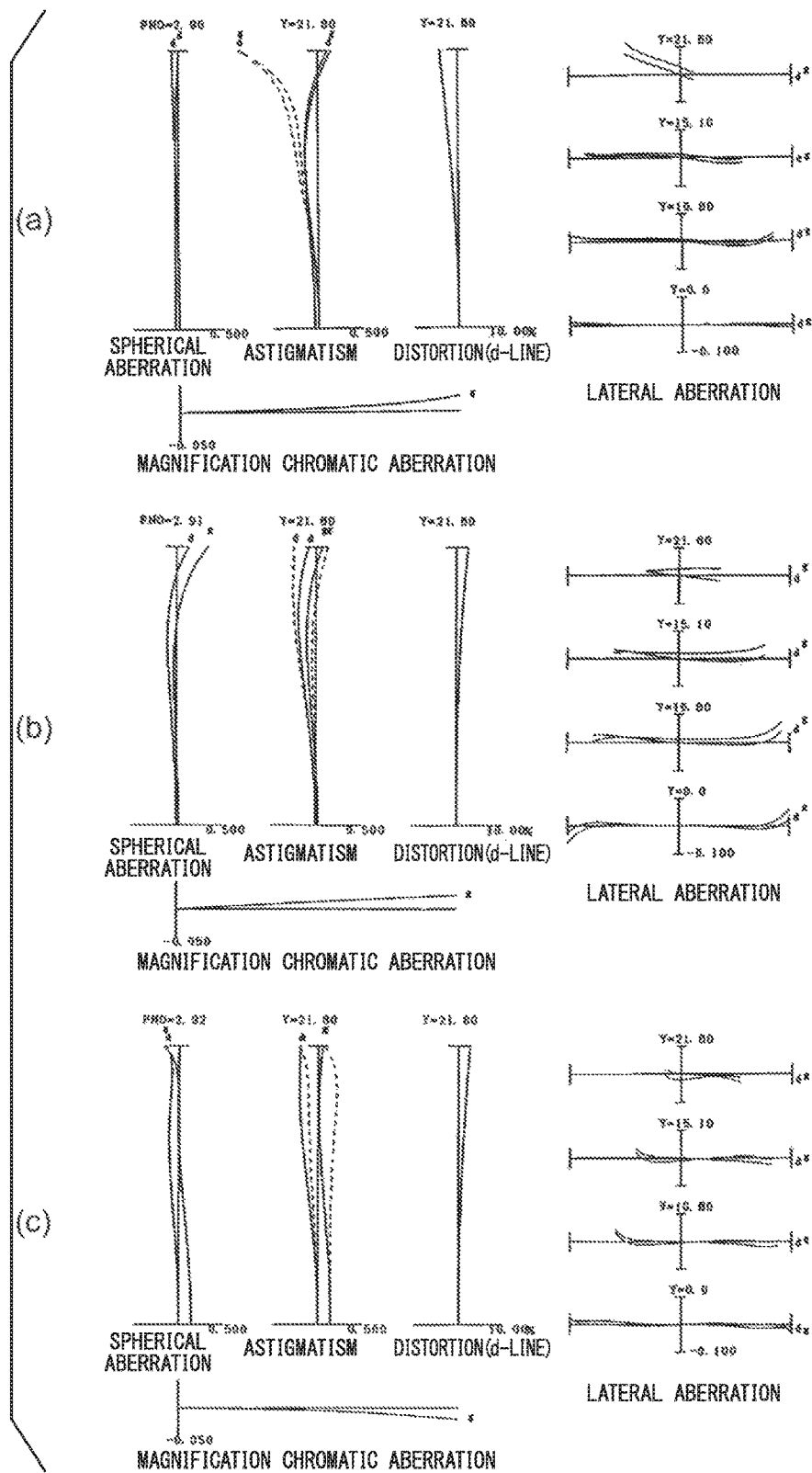
FIG. 26 shows graphs illustrating various aberrations of the variable magnification optical system according to Example 9 upon focusing on infinity, wherein parts (a), (b), and (c) are in the wide-angle end state, the intermediate focal length state, and the telephoto end state, respectively.
Figure 27:
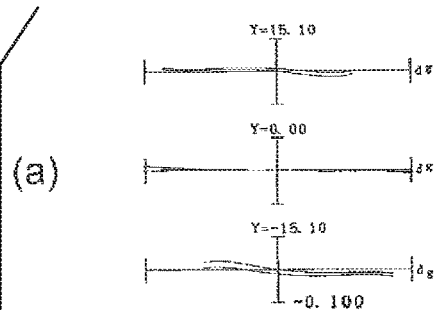
FIG. 27 shows graphs illustrating lateral aberrations of the variable magnification optical system according to Example 9 after image blur correction was performed upon focusing on infinity, wherein parts (a), (b), and (c) are in the wide-angle end state, the intermediate focal length state, and the telephoto end state, respectively.
Figure 27:
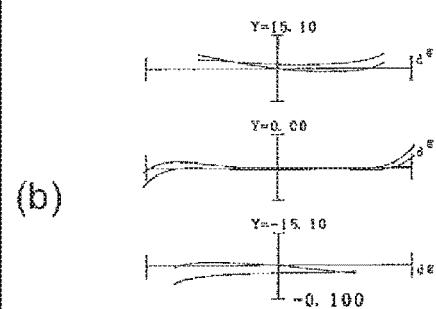
Figure 27:
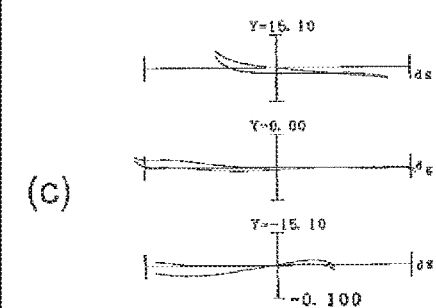

FIG. 26 shows graphs illustrating various aberrations (spherical aberration, astigmatism, distortion, magnification chromatic aberration, and lateral aberration) upon focusing on infinity, of the variable magnification optical system ZL9 according to Example 9, in which part (a) illustrates the wide-angle end state, part (b) illustrates the intermediate focal length state, and part (c) illustrates the telephoto end state. FIG. 27 shows graphs illustrating lateral aberration of the variable magnification optical system ZL9 according to Example 9 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 27.

As is obvious from respective aberration graphs, it is understood that the variable magnification optical system ZL9 according to Example 9 has a satisfactory optical performance such that aberrations are satisfactorily corrected in states ranging from the wide-angle end state to the telephoto end state. Moreover, it is understood that the variable magnification optical system ZL9 has an excellent imaging performance upon image blur correction.

Example 10

Figure 28:
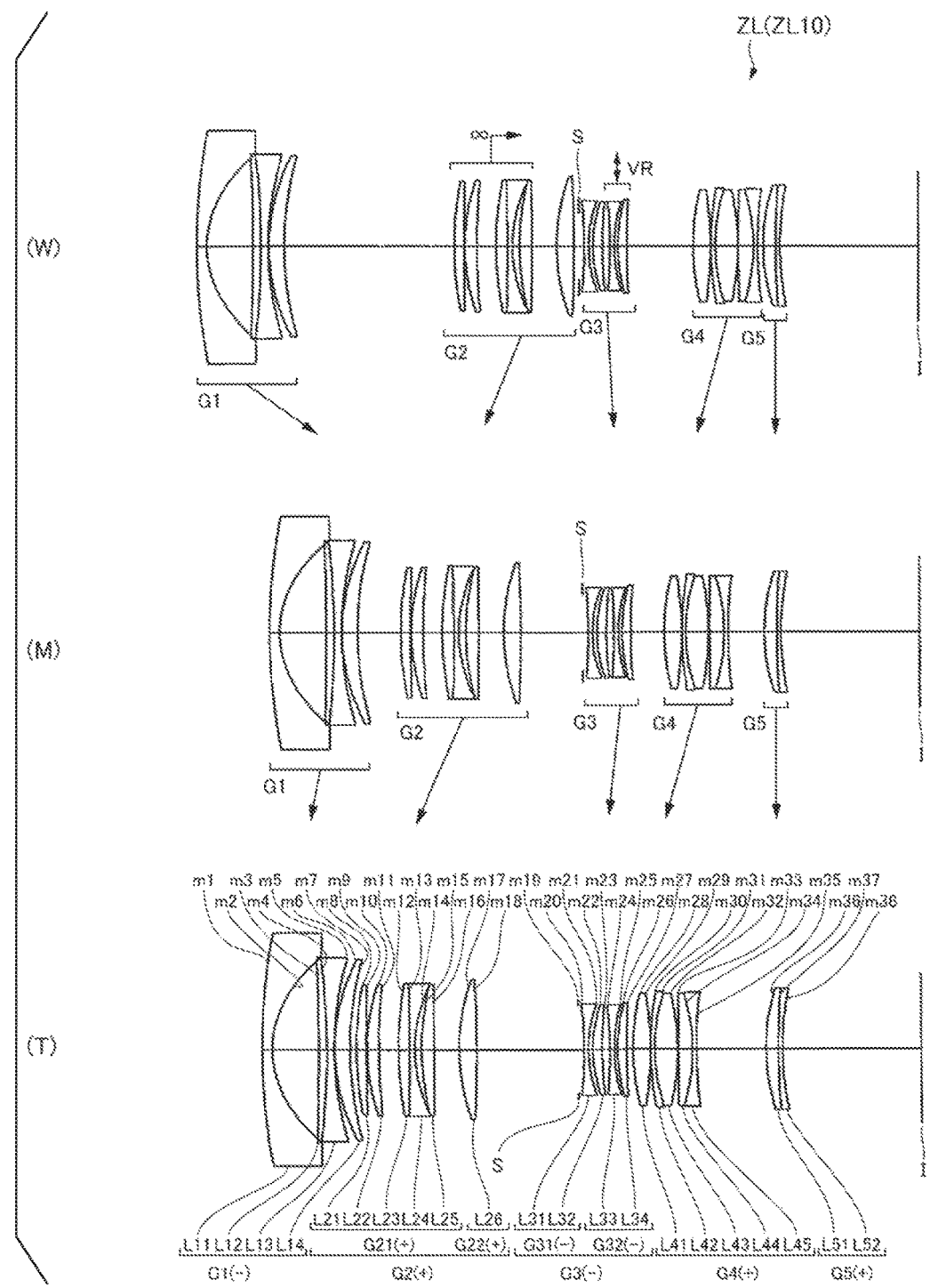
FIG. 28 is a cross-sectional view of a variable magnification optical system according to Example 10, wherein parts (W), (M), and (T) are in a wide-angle end state, an intermediate focal length state, and a telephoto end state, respectively.

Example 10 will be described with reference to FIGS. 28 to 30 and Table 10. As illustrated in FIG. 28, a variable magnification optical system ZL (ZL10) according to Example 10 is constituted by, in order from an object, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object, a negative meniscus lens L11 having a concave surface oriented toward the image side, a cemented lens including a positive meniscus lens L12 having a convex surface oriented toward the object side and a biconcave lens L13, and a positive meniscus lens L14 having a convex surface oriented toward the object side. The negative meniscus lens L11 has an aspherical image-side surface.

The second lens group G2 is constituted by, in order from the object, a 21st lens group G21 (a focusing lens group) having a positive refractive power and a 22nd lens group G22 having a positive refractive power.

The 21st lens group G21 is constituted by, in order from the object, a positive meniscus lens L21 having a convex surface oriented toward the object side, a positive meniscus lens L22 having a convex surface oriented toward the object side, a cemented lens including a biconvex lens L23 and a biconcave lens L24, and a biconvex lens L25. The 22nd lens group G22 is constituted by a biconvex lens L26. The positive meniscus lens L22 has an aspherical object-side surface.

The third lens group G3 is constituted by, in order from the object, an aperture stop S, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31 and a positive meniscus lens L32 having a convex surface oriented toward the object side. The 32nd lens group G32 is constituted by, in order from the object, a biconcave lens L33 and a positive meniscus lens L34 having a convex surface oriented toward the object side. The biconcave lens L33 has an aspherical object-side surface.

The fourth lens group G4 is constituted by, in order from the object, a biconvex lens L41, a cemented lens including a negative meniscus lens L42 having a concave surface oriented toward the image side and a biconvex lens L43, and a cemented lens including a biconvex lens L44 and a biconcave lens L45. The biconvex lens L41 has an aspherical object-side surface. The biconcave lens L45 has an aspherical image-side surface.

The fifth lens group G5 is constituted by a cemented lens including, in order from an object, a positive meniscus lens L51 having a convex surface oriented toward the object side and a negative meniscus lens L52 having a concave surface oriented toward the image side arranged.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the image side and then moving the same toward the object side, and moving the fourth lens group G4 toward the object side such that the distances between the respective lens groups are changed. The fifth lens group G5 is immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 10, in the wide-angle end state, since the vibration reduction coefficient is −0.50 and the focal length is 24.77 mm, the moving distance of the vibration-reduction lens group VR for correcting the rotation blur of 0.30° is −0.26 mm. In the intermediate focal length state, since the vibration reduction coefficient is −0.57 and the focal length is 47.50 mm, the moving distance of the vibration-reduction lens group VR for correcting the rotation blur of 0.30° is −0.44 mm. In the telephoto end state, since the vibration reduction coefficient is −0.66 and the focal length is 67.84 mm, the moving distance of the vibration-reduction lens group VR for correcting the rotation blur of 0.30° is −0.54 mm.

Table 10 illustrates the values of respective specifications of Example 10. Surface numbers 1 to 38 in Table 10 correspond to optical surfaces of m1 to m38 illustrated in FIG. 28.

TABLE 10

| [Lens Specification] | | | | |
|---|---|---|---|---|
| Surface number | R | D | n(d) | vd |
| 1 | 179.73529 | 2.880 | 1.74389 | 49.5 |
| *2 | 28.00000 | 13.314 | 1.00000 | |
| 3 | −709.59863 | 2.295 | 1.80518 | 25.4 |
| 4 | −228.05154 | 2.100 | 1.76500 | 49.5 |
| 5 | 90.21469 | 0.200 | 1.00000 | |
| 6 | 56.00020 | 4.396 | 2.00100 | 29.1 |
| 7 | 96.29881 | D7 | 1.00000 | |
| 8 | 96.54068 | 2.840 | 1.60300 | 65.4 |
| 9 | 715.47283 | 0.200 | 1.00000 | |
| *10 | 57.08059 | 3.395 | 1.69680 | 55.5 |
| 11 | 181.18928 | 5.604 | 1.00000 | |

TABLE 10-continued

|  | | | | |
|---|---|---|---|---|
| 12 | 98.04986 | 3.261 | 1.59319 | 67.9 |
| 13 | −796.91447 | 1.450 | 1.76182 | 26.6 |
| 14 | 41.75300 | 1.983 | 1.00000 | |
| 15 | 73.03256 | 3.630 | 1.74100 | 52.8 |
| 16 | −3863.66610 | D16 | 1.00000 | |
| 17 | 58.79270 | 5.010 | 1.80400 | 46.6 |
| 18 | −393.67543 | D18 | 1.00000 | |
| 19 | (Aperture stop) | 1.540 | 1.00000 | |
| 20 | −142.34068 | 1.200 | 1.81600 | 46.6 |
| 21 | 35.05467 | 1.301 | 1.00000 | |
| 22 | 38.87328 | 2.715 | 1.90200 | 25.3 |
| 23 | 117.88926 | D23 | 1.00000 | |
| *24 | −118.17706 | 1.200 | 1.73231 | 53.2 |
| 25 | 44.69744 | 1.030 | 1.00000 | |
| 26 | 52.10387 | 2.485 | 1.90200 | 25.3 |
| 27 | 195.76461 | D27 | 1.00000 | |
| *28 | 71.27465 | 4.998 | 1.49782 | 82.6 |
| 29 | −102.88416 | 0.100 | 1.00000 | |
| 30 | 91.68269 | 1.200 | 1.90366 | 31.3 |
| 31 | 52.62629 | 6.605 | 1.60300 | 65.4 |
| 32 | −69.88439 | 0.200 | 1.00000 | |
| 33 | 3314.77510 | 4.235 | 1.59319 | 67.9 |
| 34 | −54.08421 | 1.200 | 1.78500 | 26.2 |
| *35 | 216.08233 | D35 | 1.00000 | |
| 36 | 56.19817 | 3.548 | 1.61800 | 63.3 |
| 37 | 210.95097 | 1.200 | 1.83400 | 37.2 |
| 38 | 84.00000 | D38 | 1.00000 | |

[Aspheric Data]

| Surface | κ | A4 | A6 | A8 | A10 |
|---|---|---|---|---|---|
| 2 | −6.73000e−02 | 2.59588e−06 | 7.45638e−10 | −2.10470e−14 | 3.51745e−16 |
| 10 | 1.00000e+00 | −4.00000e−07 | 0.00000e+00 | 0.00000e+00 | 0.00000e+00 |
| 24 | −4.10880e+00 | 5.35515e−07 | 2.05353e−09 | 0.00000e+00 | 0.00000e+00 |
| 28 | −1.10460e+00 | 3.84373e−06 | −4.29919e−09 | 3.81283e−12 | 0.00000e+00 |
| 35 | 1.00000e+00 | 5.16409e−06 | 2.00000e−09 | 0.00000e+00 | 0.00000e+00 |

[Various Data]

|  | W | M | T |
|---|---|---|---|
| f | 24.77 | 47.50 | 67.84 |
| FNo | 2.90 | 2.90 | 2.90 |
| ω | 42.2 | 23.9 | 17.2 |
| Y | 21.60 | 21.60 | 21.60 |
| TL | 208.124 | 187.432 | 190.017 |
| BF | 40.315 | 40.322 | 40.381 |
| BF (air-conversion length) | 40.315 | 40.322 | 40.381 |

[Variable Distance Data]

Focusing on infinity

|  | W | M | T |
|---|---|---|---|
| D0 | ∞ | ∞ | ∞ |
| Magnification | — | — | — |
| f | 24.77 | 47.50 | 67.84 |
| D7 | 48.968 | 12.510 | 1.800 |
| D16 | 7.185 | 7.185 | 7.185 |
| D18 | 1.300 | 17.853 | 29.355 |
| D23 | 2.232 | 2.232 | 2.232 |
| D27 | 19.311 | 9.731 | 1.900 |
| D35 | 1.500 | 10.287 | 19.851 |
| D38 | 40.315 | 40.322 | 40.381 |

[Lens Group Data]

| Lens group | Starting surface | Focal length |
|---|---|---|
| 1st lens group | 1 | −39.97 |
| 2nd lens group | 8 | 43.09 |
| 21st lens group | 8 | 80.97 |
| 22nd lens group | 17 | 63.94 |
| 3rd lens group | 19 | −42.99 |
| 31st lens group | 19 | −77.20 |
| 32nd lens group | 24 | −103.89 |

TABLE 10-continued

| 4th lens group | 28 | 56.10 |
|---|---|---|
| 5th lens group | 36 | 419.32 |

| [Focusing Data] | | | |
|---|---|---|---|
| | W | M | T |
| Lens moving distance | 6.185 | 6.185 | 6.185 |
| Imaging distance (m) | 0.4444 | 0.4101 | 0.4308 |

| [Conditional Expression Correspondence Values] | |
|---|---|
| Conditional Expression (1) | f(1~Gn)t/ft = 3.727 |
| Conditional Expression (2) | −f(Gn~G(VR))w/fw = 1.736 |
| Conditional Expression (3) | f(RP)/f(FP) = 1.302 |
| Conditional Expression (4) | ωt = 17.2 |
| Conditional Expression (5) | ωw = 42.2 |

It is understood from Table 10 that the variable magnification optical system ZL10 according to Example 10 satisfies Conditional Expressions (1) to (5).

Figure 29:
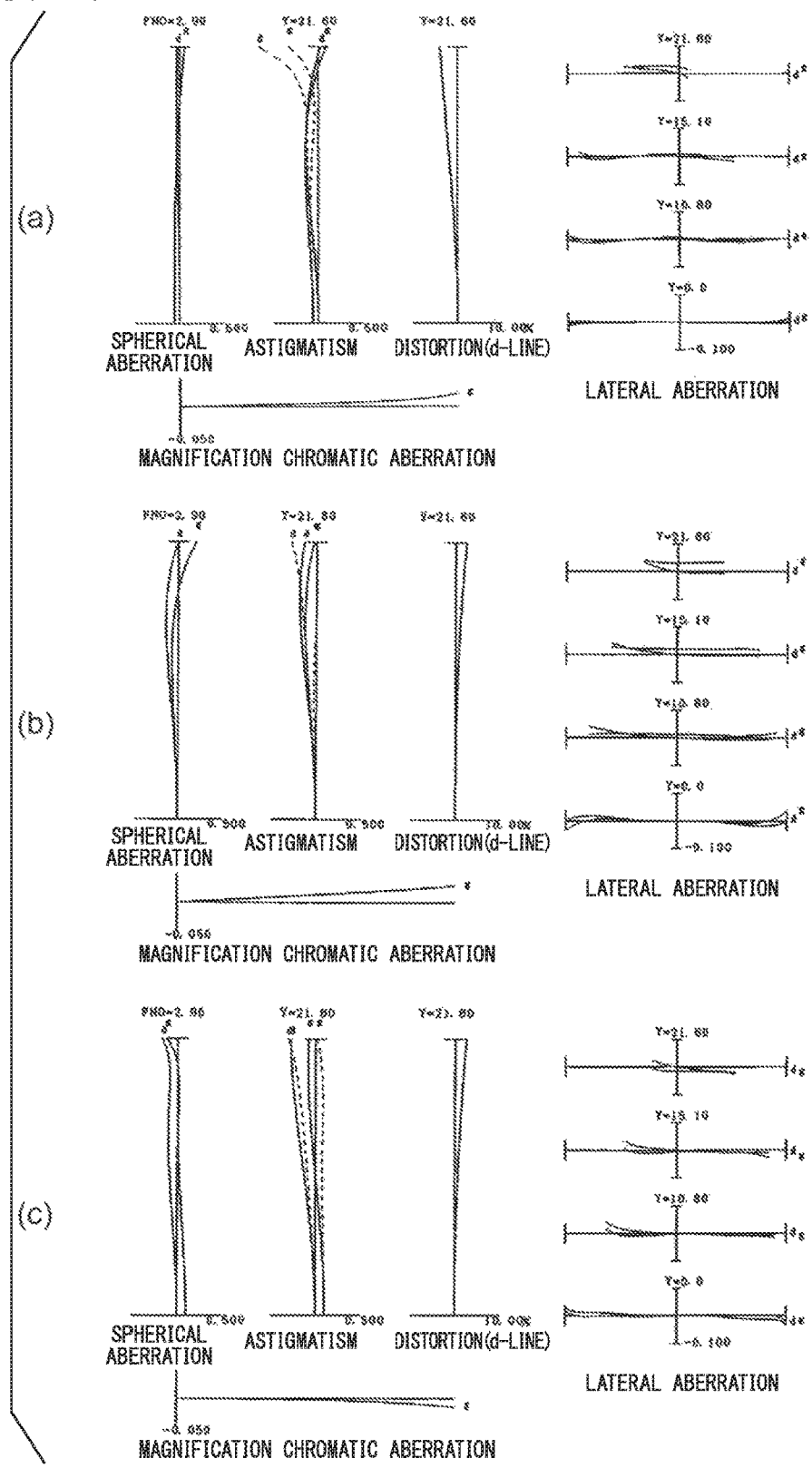
FIG. 29 shows graphs illustrating various aberrations of the variable magnification optical system according to Example 10 upon focusing on infinity, wherein parts (a), (b), and (c) are in the wide-angle end state, the intermediate focal length state, and the telephoto end state, respectively.
Figure 30:
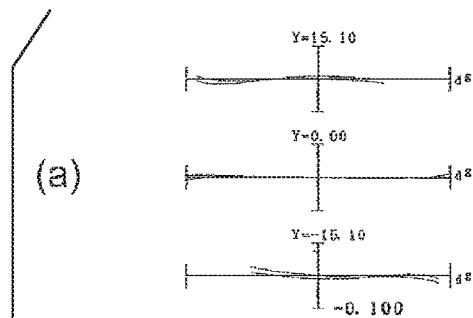
FIG. 30 shows graphs illustrating lateral aberrations of the variable magnification optical system according to Example 10 after image blur correction was performed upon focusing on infinity, wherein parts (a), (b), and (c) are in the wide-angle end state, the intermediate focal length state, and the telephoto end state, respectively.
Figure 30:
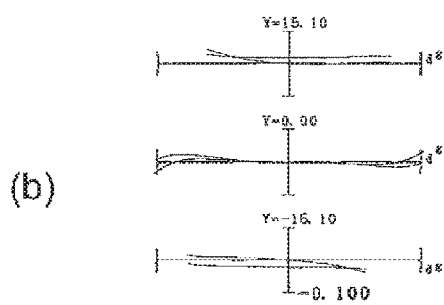
Figure 30:
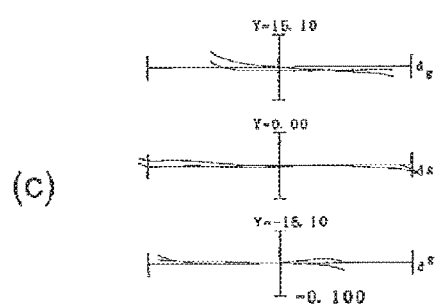

FIG. 29 shows graphs illustrating various aberrations (spherical aberration, astigmatism, distortion, magnification chromatic aberration, and lateral aberration) upon focusing on infinity, of the variable magnification optical system ZL10 according to Example 10, in which part (a) illustrates the wide-angle end state, part (b) illustrates the intermediate focal length state, and part (c) illustrates the telephoto end state. FIG. 30 shows graphs illustrating lateral aberration of the variable magnification optical system ZL10 according to Example 10 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 30.

As is obvious from respective aberration graphs, it is understood that the variable magnification optical system ZL10 according to Example 10 has a satisfactory optical performance such that aberrations are satisfactorily corrected in states ranging from the wide-angle end state to the telephoto end state. Moreover, it is understood that the variable magnification optical system ZL10 has an excellent imaging performance upon image blur correction.

Example 11

Figure 31:
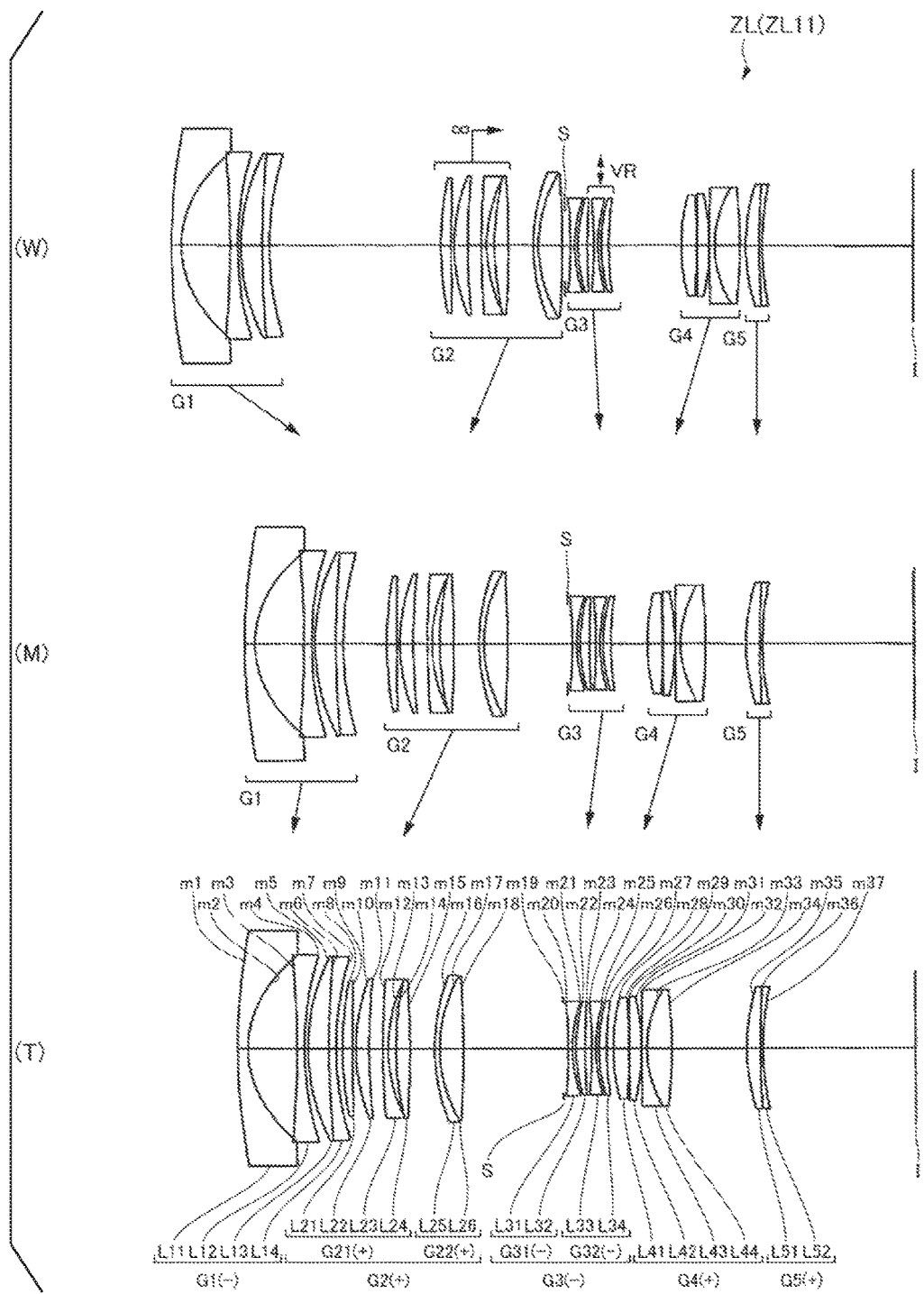
FIG. 31 is a cross-sectional views of a variable magnification optical system according to Example 11, wherein parts (W), (M), and (T) are in a wide-angle end state, an intermediate focal length state, and a telephoto end state, respectively.

Example 11 will be described with reference to FIGS. 31 to 33 and Table 11. As illustrated in FIG. 31, a variable magnification optical system ZL (ZL11) according to Example 11 is constituted by, in order from an object, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power.

The first lens group G1 is constituted by, in order from the object, a negative meniscus lens L11 having a concave surface oriented toward the image side, a biconcave lens L12, and a cemented lens including a positive meniscus lens L13 having a convex surface oriented toward the object side and a negative meniscus lens L14 having a concave surface oriented toward the image side. The negative meniscus lens L11 has an aspherical image-side surface.

The second lens group G2 is constituted by, in order from the object, a 21st lens group G21 (a focusing lens group) having a positive refractive power and a 22nd lens group G22 having a positive refractive power.

The 21st lens group G21 is constituted by, in order from the object, a positive meniscus lens L21 having a convex surface oriented toward the object side, a positive meniscus lens L22 having a convex surface oriented toward the object side, a negative meniscus lens L23 having a concave surface oriented toward the image side, and a biconvex lens L24. The 22nd lens group G22 is constituted by a cemented lens including, in order from an object, a negative meniscus lens L25 having a concave surface oriented toward the image side and a biconvex lens L26. The positive meniscus lens L22 has an aspherical object-side surface.

The third lens group G3 is constituted by, in order from the object, an aperture stop S, a 31st lens group G31 (an intermediate group) of which the position in the direction orthogonal to the optical axis is immovable and which has negative refractive power and a 32nd lens group G32 (a vibration-reduction lens group) having a negative refractive power.

The 31st lens group G31 is constituted by, in order from the object, a biconcave lens L31 and a positive meniscus lens L32 having a convex surface oriented toward the object side. The 32nd lens group G32 is constituted by, in order from the object, a biconcave lens L33 and a positive meniscus lens L34 having a convex surface oriented toward the object side. The biconcave lens L33 has an aspherical object-side surface.

The fourth lens group G4 is constituted by, in order from the object, a biconvex lens L41, a positive meniscus lens L42 having a convex surface oriented toward the image side, and a cemented lens including a negative meniscus lens L43 having a concave surface oriented toward the image side and a biconvex lens L44. The biconvex lens L44 has an aspherical image-side surface.

The fifth lens group G5 is constituted by a cemented lens including, in order from an object, a positive meniscus lens L51 having a convex surface oriented toward the object side and a negative meniscus lens L52 having a concave surface oriented toward the image side.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the image side and then moving the same toward the object side, and moving the fourth lens group G4 toward the object side such that the distances between the respective lens groups are changed. The fifth lens group G5 is immovable upon varying magnification.

Focusing from an object at infinity to an object at a close distance is performed by moving the 21st lens group G21 as a focusing lens group toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 11, in the wide-angle end state, since the vibration reduction coefficient is −0.54 and the focal length is 24.77 mm, the moving distance of the vibration-reduction lens group VR for correcting the rotation blur of 0.30° is −0.24 mm. In the intermediate focal length state, since the vibration reduction coefficient is −0.61 and the focal length is 47.53 mm, the moving distance of the vibration-reduction lens group VR for correcting the rotation blur of 0.30° is −0.41 mm. In the telephoto end state, since the vibration reduction coefficient is −0.70 and the focal length is 67.85 mm, the moving distance of the vibration-reduction lens group VR for correcting the rotation blur of 0.30° is −0.51 mm.

Table 11 illustrates the values of respective specifications of Example 11. Surface numbers 1 to 37 in Table 11 correspond to optical surfaces of m1 to m37 illustrated in FIG. 31.

TABLE 11

[Lens Specification]

| Surface number | R | D | n(d) | vd |
|---|---|---|---|---|
| 1 | 169.82392 | 2.880 | 1.74389 | 49.5 |
| *2 | 28.00000 | 13.823 | 1.00000 | |
| 3 | −277.92141 | 2.100 | 1.69680 | 55.5 |
| 4 | 89.48130 | 0.972 | 1.00000 | |
| 5 | 57.53130 | 5.977 | 1.90366 | 31.3 |
| 6 | 288.24720 | 2.000 | 1.60311 | 60.7 |
| 7 | 89.16103 | D7 | 1.00000 | |
| 8 | 97.98839 | 2.906 | 1.62041 | 60.3 |
| 9 | 988.16122 | 0.870 | 1.00000 | |
| *10 | 52.75776 | 3.799 | 1.69680 | 55.5 |
| 11 | 185.81817 | 3.941 | 1.00000 | |
| 12 | 244.48174 | 1.450 | 1.74077 | 27.7 |
| 13 | 42.81836 | 2.225 | 1.00000 | |
| 14 | 81.99098 | 3.910 | 1.74100 | 52.8 |
| 15 | −359.52152 | D15 | 1.00000 | |
| 16 | 56.22525 | 1.450 | 1.85000 | 25.5 |
| 17 | 41.20061 | 6.609 | 1.75500 | 52.3 |
| 18 | −333.94984 | D18 | 1.00000 | |
| 19 | (Aperture stop) | 1.488 | 1.00000 | |
| 20 | −133.09742 | 1.200 | 1.81600 | 46.6 |
| 21 | 40.80390 | 0.998 | 1.00000 | |
| 22 | 48.84393 | 2.545 | 1.90200 | 25.3 |
| 23 | 197.19167 | D23 | 1.00000 | |
| *24 | −159.18908 | 1.200 | 1.70000 | 55.0 |
| 25 | 46.35402 | 0.845 | 1.00000 | |
| 26 | 47.53111 | 2.169 | 1.90200 | 25.3 |
| 27 | 92.34748 | D27 | 1.00000 | |
| 28 | 59.48521 | 4.431 | 1.59319 | 67.9 |
| 29 | −192.71174 | 0.100 | 1.00000 | |
| 30 | −6013.33410 | 3.364 | 1.59319 | 67.9 |
| 31 | −71.43167 | 0.200 | 1.00000 | |
| 32 | 5300.14030 | 1.404 | 1.90366 | 31.3 |
| 33 | 31.44019 | 7.197 | 1.59319 | 67.9 |
| *34 | −117.32485 | D34 | 1.00000 | |
| 35 | 57.67894 | 3.814 | 1.70000 | 56.0 |
| 36 | 263.45851 | 0.763 | 1.77250 | 49.6 |
| 37 | 84.00000 | D37 | 1.00000 | |

[Aspheric Data]

| Surface | κ | A4 | A6 | A8 | A10 |
|---|---|---|---|---|---|
| 2 | −5.97000e−02 | 2.62042e−06 | 7.82559e−10 | 9.78767e−14 | 4.33213e−16 |
| 10 | 5.28200e−01 | 6.32647e−08 | 1.88164e−10 | 0.00000e+00 | 0.00000e+00 |
| 24 | −6.74850e+00 | 4.82591e−07 | 2.86667e−10 | 0.00000e+00 | 0.00000e+00 |
| 34 | −1.67545e+01 | 1.36811e−06 | 3.39381e−09 | 0.00000e+00 | 0.00000e+00 |

TABLE 11-continued

[Various Data]

|  | W | M | T |
|---|---|---|---|
| f | 24.77 | 47.53 | 67.85 |
| FNo | 2.90 | 2.90 | 2.91 |
| ω | 42.2 | 23.9 | 17.3 |
| Y | 21.60 | 21.60 | 21.60 |
| TL | 210.949 | 190.232 | 192.480 |
| BF | 43.417 | 43.503 | 43.670 |
| BF (air-conversion length) | 43.417 | 43.503 | 43.670 |

[Variable Distance Data]

Focusing on infinity

|  | W | M | T |
|---|---|---|---|
| D0 | ∞ | ∞ | ∞ |
| Magnification | — | — | — |
| f | 24.77 | 47.53 | 67.85 |
| D7 | 48.868 | 12.444 | 1.800 |
| D15 | 7.185 | 7.185 | 7.185 |
| D18 | 0.800 | 16.872 | 28.207 |
| D23 | 1.827 | 1.827 | 1.827 |
| D27 | 20.646 | 10.368 | 1.900 |
| D34 | 1.574 | 11.401 | 21.260 |
| D37 | 43.417 | 43.503 | 43.670 |

[Lens Group Data]

| Lens group | Starting surface | Focal length |
|---|---|---|
| 1st lens group | 1 | −39.52 |
| 2nd lens group | 8 | 42.67 |
| 21st lens group | 8 | 81.00 |
| 22nd lens group | 16 | 66.83 |
| 3rd lens group | 19 | −43.84 |
| 31st lens group | 19 | −83.74 |
| 32nd lens group | 24 | −98.45 |
| 4th lens group | 28 | 61.94 |
| 5th lens group | 35 | 285.15 |

[Focusing Data]

|  | W | M | T |
|---|---|---|---|
| Lens moving distance | 6.185 | 6.185 | 6.185 |
| Imaging distance (m) | 0.4485 | 0.4038 | 0.4202 |

[Conditional Expression Correspondence Values]

| Conditional Expression (1) | f(1~Gn)t/ft = 2.719 |
| Conditional Expression (2) | −f(Gn~G(VR))w/fw = 1.771 |
| Conditional Expression (3) | f(RP)/f(FP) = 1.452 |
| Conditional Expression (4) | ωt = 17.3 |
| Conditional Expression (5) | ωw = 42.2 |

It is understood from Table 11 that the variable magnification optical system ZL11 according to Example 11 satisfies Conditional Expressions (1) to (5).

Figure 32:
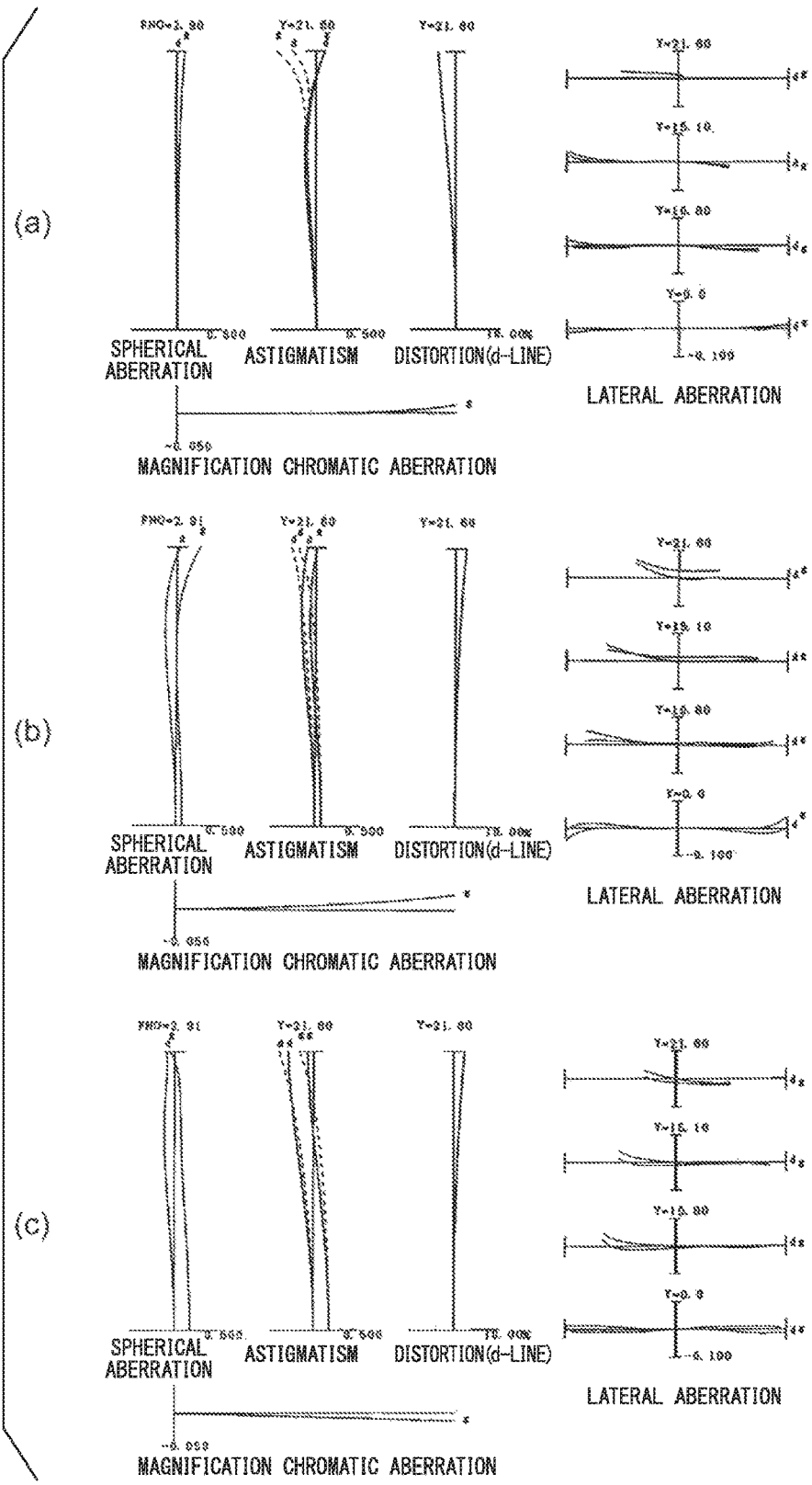
FIG. 32 shows graphs illustrating various aberrations of the variable magnification optical system according to Example 11 upon focusing on infinity, wherein parts (a), (b), and (c) are in the wide-angle end state, the intermediate focal length state, and the telephoto end state, respectively.
Figure 33:
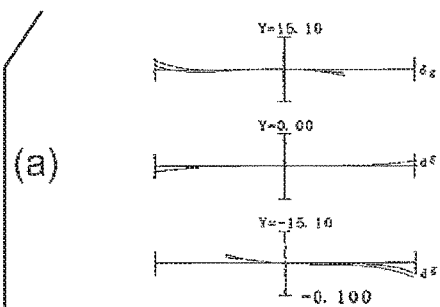
FIG. 33 shows graphs illustrating lateral aberrations of the variable magnification optical system according to Example 11 after image blur correction was performed upon focusing on infinity, wherein parts (a), (b), and (c) are in the wide-angle end state, the intermediate focal length state, and the telephoto end state, respectively.
Figure 33:
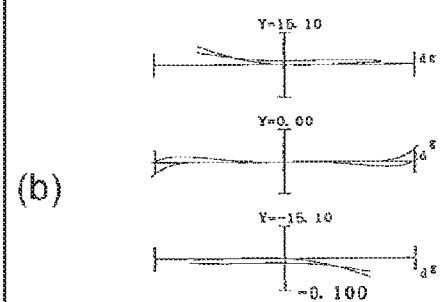
Figure 33:
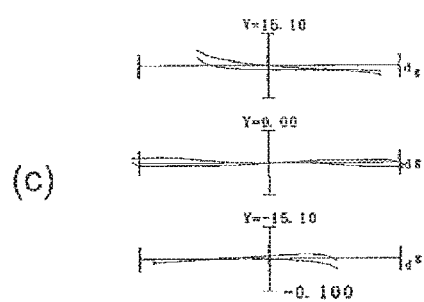

FIG. 32 shows graphs illustrating various aberrations (spherical aberration, astigmatism, distortion, magnification chromatic aberration, and lateral aberration) upon focusing on infinity, of the variable magnification optical system ZL11 according to Example 11, in which part (a) illustrates the wide-angle end state, part (b) illustrates the intermediate focal length state, and part (c) illustrates the telephoto end state. FIG. 33 shows graphs illustrating lateral aberration of the variable magnification optical system ZL11 according to Example 11 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±15.10 about the image height y=0.0 as illustrated in FIG. 33.

As is obvious from respective aberration graphs, it is understood that the variable magnification optical system ZL11 according to Example 11 has a satisfactory optical performance such that aberrations are satisfactorily corrected in states ranging from the wide-angle end state to the telephoto end state. Moreover, it is understood that the variable magnification optical system ZL11 has an excellent imaging performance upon image blur correction.

Example 12

Figure 34:
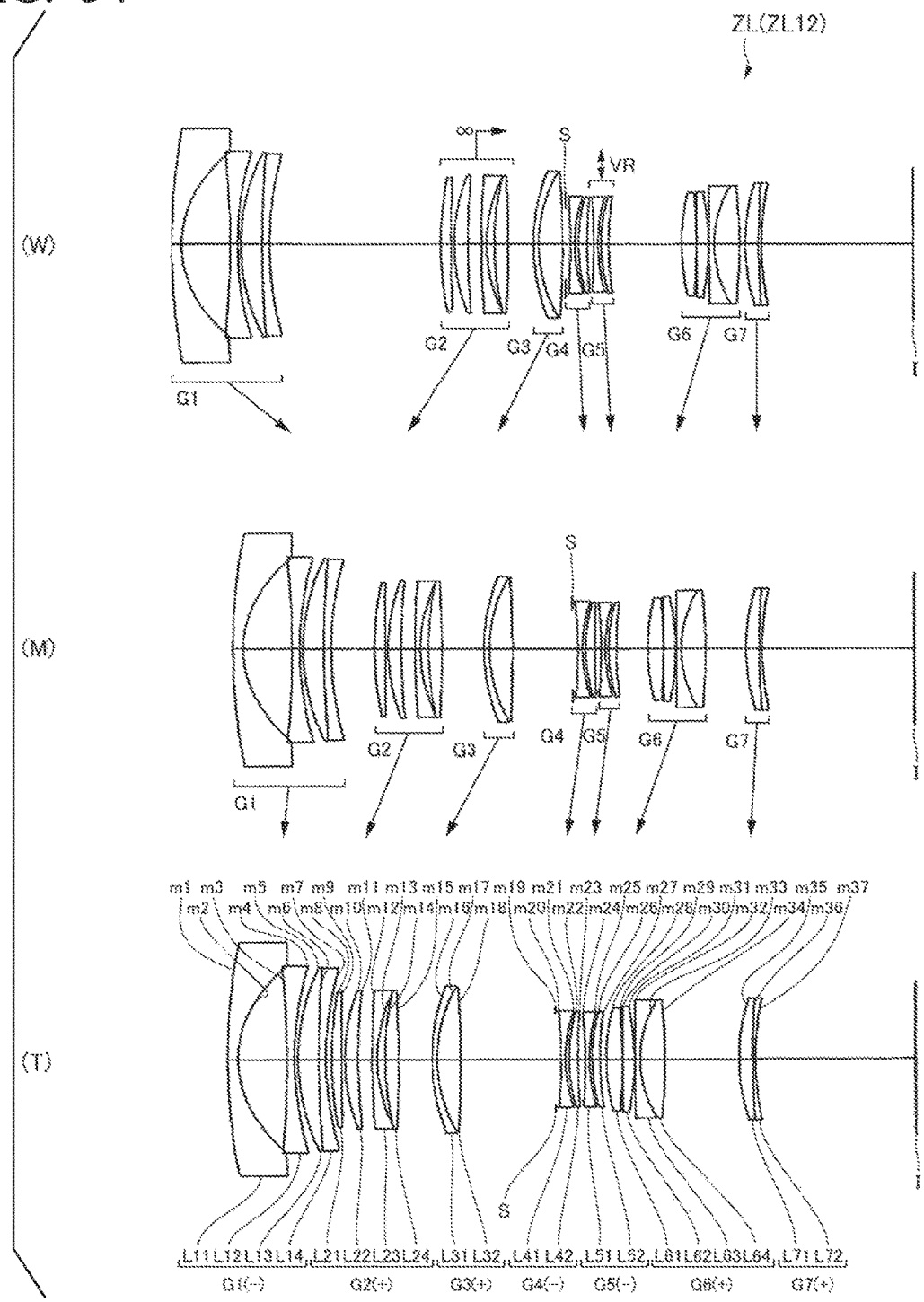
FIG. 34 is a cross-sectional view of a variable magnification optical system according to Example 12, wherein parts (W), (M), and (T) are in a wide-angle end state, an intermediate focal length state, and a telephoto end state, respectively.

Example 12 will be described with reference to FIGS. 34 to 36 and Table 12. As illustrated in FIG. 34, a variable magnification optical system ZL (ZL12) according to Example 12 is constituted by, in order from an object, a first lens group G1 having a negative refractive power, a second lens group G2 having a positive refractive power, a third lens group G3 having a positive refractive power, a fourth lens group G4 having a negative refractive power, a fifth lens group G5 having a negative refractive power, a sixth lens group G6 having a positive refractive power, and a seventh lens group G7 having a positive refractive power.

The first lens group G1 is constituted by, in order from the object, a negative meniscus lens L11 having a concave surface oriented toward the image side, a biconcave lens L12, and a cemented lens including a positive meniscus lens L13 having a convex surface oriented toward the object side and a negative meniscus lens L14 having a concave surface oriented toward the image side. The negative meniscus lens L11 has an aspherical image-side surface.

The second lens group G2 (focusing lens group) is constituted by a positive meniscus lens L21 having a convex surface oriented toward the object side, a positive meniscus lens L22 having a convex surface oriented toward the object side, a negative meniscus lens L23 having a concave surface oriented toward the image side, and a biconvex lens L24. The positive meniscus lens L22 has an aspherical object-side surface.

The third lens group G3 is constituted by a cemented lens including, in order from an object, a negative meniscus lens L31 having a concave surface oriented toward the image side and a biconvex lens L32.

The fourth lens group G4 (intermediate group) is constituted by, in order from the object, an aperture stop S, a biconcave lens L41, and a positive meniscus lens L42 having a convex surface oriented toward the object side of which the positions in the direction orthogonal to the optical axis are immovable.

The fifth lens group G5 (a vibration-reduction lens group) is constituted by, in order from the object, a biconcave lens L51 and a positive meniscus lens L52 having a convex surface oriented toward the object side. The biconcave lens L51 has an aspherical object-side surface.

The sixth lens group G6 is constituted by, in order from the object, a biconvex lens L61, a positive meniscus lens L62 having a concave surface oriented toward the image side, and a cemented lens including and a negative meniscus lens L63 having a concave surface oriented toward the image side and a biconvex lens L64. The biconcave lens L64 has an aspherical image-side surface.

The seventh lens group G7 is constituted by a cemented lens including, in order from an object, a positive meniscus lens L71 having a convex surface oriented toward the object side and a negative meniscus lens L72 having a concave surface oriented toward the image side.

Varying magnification from the wide-angle end state to the telephoto end state is performed by moving the first lens group G1 toward the image side and then moving the first lens group G1 toward the object side, moving the second lens group G2 toward the object side, moving the third lens group G3 toward the object side, moving the fourth lens group G4 toward the image side and then moving the same toward the object side, moving the fifth lens group G5 toward the image side and then moving the same toward the object side, moving the sixth lens group G6 toward the object side, and moving the seventh lens group G7 toward the object side such that the distances between the respective lens groups are changed.

Focusing from an object at infinity to an object at a close distance is performed by moving the second lens group G2 as a focusing lens group toward the image side.

When image blur occurs, image blur correction (vibration reduction) on the image plane I is performed by moving the fifth lens group G5 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K.

In Example 12, in the wide-angle end state, since the vibration reduction coefficient is −0.54 and the focal length is 24.77 mm, the moving distance of the vibration-reduction lens group VR for correcting the rotation blur of 0.30° is −0.24 mm. In the intermediate focal length state, since the vibration reduction coefficient is −0.61 and the focal length is 47.33 mm, the moving distance of the vibration-reduction lens group VR for correcting the rotation blur of 0.30° is −0.41 mm. In the telephoto end state, since the vibration reduction coefficient is −0.72 and the focal length is 67.34 mm, the moving distance of the vibration-reduction lens group VR for correcting the rotation blur of 0.30° is −0.50 mm.

Table 12 illustrates the values of respective specifications of Example 12. Surface numbers 1 to 37 in Table 12 correspond to optical surfaces of m1 to m37 illustrated in FIG. 34.

TABLE 12

| [Lens Specification] | | | | |
|---|---|---|---|---|
| Surface number | R | D | n(d) | vd |
| 1 | 169.82392 | 2.880 | 1.74389 | 49.5 |
| *2 | 28.00000 | 13.823 | 1.00000 | |
| 3 | −277.92141 | 2.100 | 1.69680 | 55.5 |
| 4 | 89.48130 | 0.972 | 1.00000 | |
| 5 | 57.53130 | 5.977 | 1.90366 | 31.3 |
| 6 | 288.24720 | 2.000 | 1.60311 | 60.7 |
| 7 | 89.16103 | D7 | 1.00000 | |
| 8 | 97.98839 | 2.906 | 1.62041 | 60.3 |
| 9 | 988.16122 | 0.870 | 1.00000 | |
| *10 | 52.75776 | 3.799 | 1.69680 | 55.5 |
| 11 | 185.81817 | 3.941 | 1.00000 | |

TABLE 12-continued

| Surface | R | D | nd | νd |
|---|---|---|---|---|
| 12 | 244.48174 | 1.450 | 1.74077 | 27.7 |
| 13 | 42.81836 | 2.225 | 1.00000 | |
| 14 | 81.99098 | 3.910 | 1.74100 | 52.8 |
| 15 | −359.52152 | D15 | 1.00000 | |
| 16 | 56.22525 | 1.450 | 1.85000 | 25.5 |
| 17 | 41.20061 | 6.609 | 1.75500 | 52.3 |
| 18 | −333.94984 | D18 | 1.00000 | |
| 19 | (Aperture stop) | 1.488 | 1.00000 | |
| 20 | −133.09742 | 1.200 | 1.81600 | 46.6 |
| 21 | 40.80390 | 0.998 | 1.00000 | |
| 22 | 48.84393 | 2.545 | 1.90200 | 25.3 |
| 23 | 197.19167 | D23 | 1.00000 | |
| *24 | −159.18908 | 1.200 | 1.70000 | 55.0 |
| 25 | 46.35402 | 0.845 | 1.00000 | |
| 26 | 47.53111 | 2.169 | 1.90200 | 25.3 |
| 27 | 92.34748 | D27 | 1.00000 | |
| 28 | 59.48521 | 4.431 | 1.59319 | 67.9 |
| 29 | −192.71174 | 0.100 | 1.00000 | |
| 30 | −6013.33410 | 3.364 | 1.59319 | 67.9 |
| 31 | −71.43167 | 0.200 | 1.00000 | |
| 32 | 5300.14030 | 1.404 | 1.90366 | 31.3 |
| 33 | 31.44019 | 7.197 | 1.59319 | 67.9 |
| *34 | −117.32485 | D34 | 1.00000 | |
| 35 | 57.67894 | 3.814 | 1.70000 | 56.0 |
| 36 | 263.45851 | 0.763 | 1.77250 | 49.6 |
| 37 | 84.00000 | D37 | 1.00000 | |

[Aspheric Data]

| Surface | κ | A4 | A6 | A8 | A10 |
|---|---|---|---|---|---|
| 2 | −5.97000e−02 | 2.62042e−06 | 7.82559e−10 | 9.78767e−14 | 4.33213e−16 |
| 10 | 5.28200e−01 | 6.32647e−08 | 1.88164e−10 | 0.00000e+00 | 0.00000e+00 |
| 24 | −6.74850e+00 | 4.82591e−07 | 2.86667e−10 | 0.00000e+00 | 0.00000e+00 |
| 34 | −1.67545e+01 | 1.36811e−06 | 3.39381e−09 | 0.00000e+00 | 0.00000e+00 |

[Various Data]

| | W | M | T |
|---|---|---|---|
| f | 24.77 | 47.33 | 67.34 |
| FNo | 2.90 | 2.90 | 2.91 |
| ω | 42.2 | 24.0 | 17.4 |
| Y | 21.60 | 21.60 | 21.60 |
| TL | 210.949 | 193.610 | 195.380 |
| BF | 43.417 | 43.433 | 45.688 |
| BF (air-conversion length) | 43.417 | 43.433 | 45.688 |

[Variable Distance Data]

Focusing on infinity

| | W | M | T |
|---|---|---|---|
| D0 | ∞ | ∞ | ∞ |
| Magnification | — | — | — |
| f | 24.77 | 47.33 | 67.34 |
| D7 | 48.868 | 12.444 | 1.600 |
| D15 | 7.185 | 12.000 | 9.500 |
| D18 | 0.800 | 16.872 | 26.900 |
| D23 | 1.827 | 1.827 | 2.000 |
| D27 | 20.646 | 9.000 | 1.800 |
| D34 | 1.574 | 11.401 | 21.260 |
| D37 | 43.417 | 43.433 | 45.688 |

[Lens Group Data]

| Lens group | Starting surface | Focal length |
|---|---|---|
| 1st lens group | 1 | −39.52 |
| 2nd lens group | 8 | 81.00 |
| 3rd lens group | 16 | 66.83 |
| 4th lens group | 19 | −83.74 |
| 5th lens group | 24 | −98.45 |
| 6th lens group | 28 | 61.94 |
| 7th lens group | 35 | 285.15 |

TABLE 12-continued

| [Focusing Data] | | | |
|---|---|---|---|
| | W | M | T |
| Lens moving distance | 6.185 | 11.000 | 8.500 |
| Imaging distance (m) | 0.4485 | 0.2946 | 0.3494 |

| [Conditional Expression Correspondence Values] | |
|---|---|
| Conditional Expression (1) | f(1~Gn)t/ft = 2.898 |
| Conditional Expression (2) | −f(Gn~G(VR))w/fw = 1.770 |
| Conditional Expression (3) | f(RP)/f(FP) = 1.452 |
| Conditional Expression (4) | ωt = 17.4 |
| Conditional Expression (5) | ωw = 42.2 |

It is understood from Table 12 that the variable magnification optical system ZL12 according to Example 12 satisfies Conditional Expressions (1) to (5).

Figure 35:
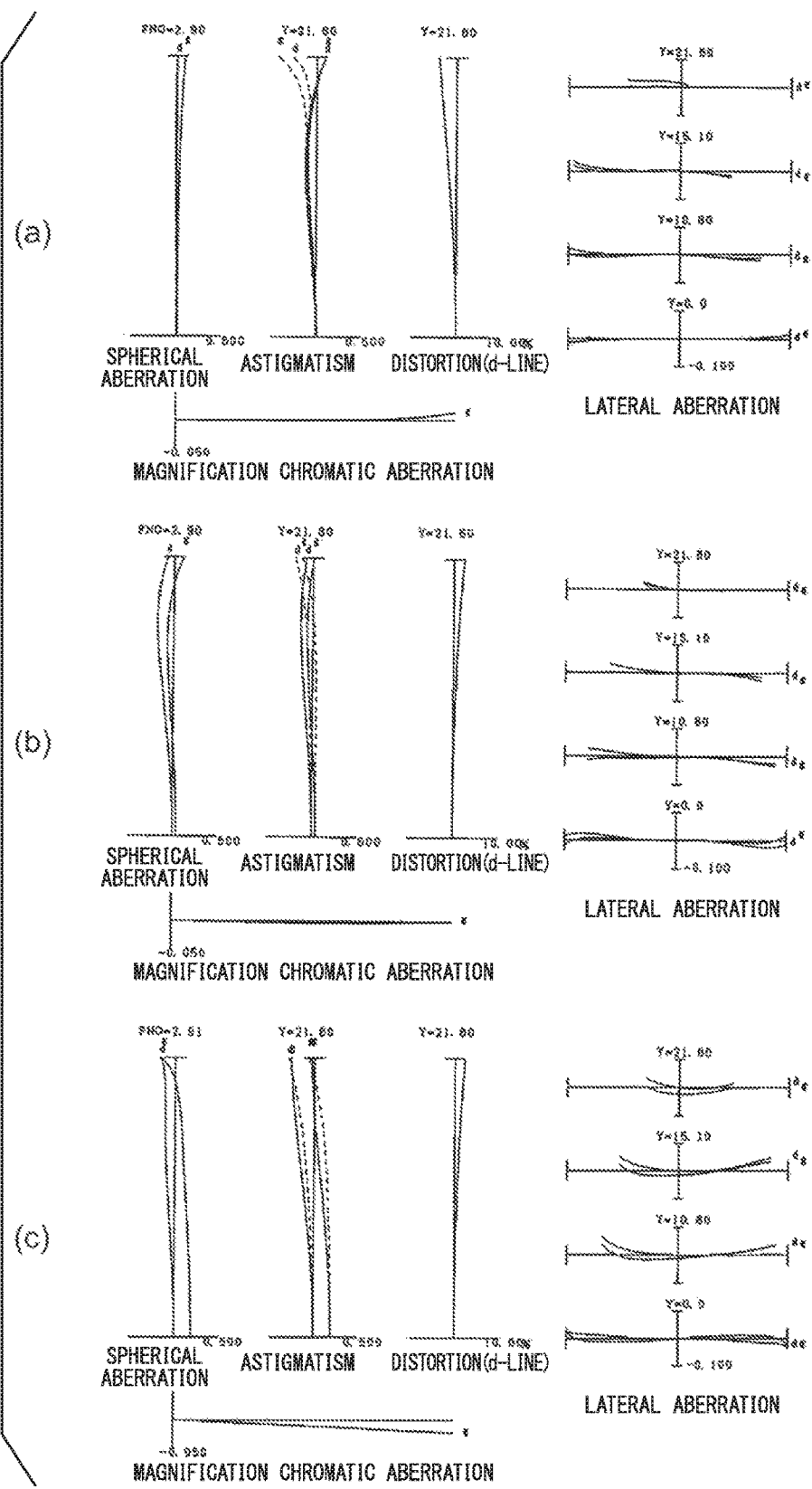
FIG. 35 shows graphs illustrating various aberrations of the variable magnification optical system according to Example 12 upon focusing on infinity, wherein parts (a), (b), and (c) are in the wide-angle end state, the intermediate focal length state, and the telephoto end state, respectively.
Figure 36:
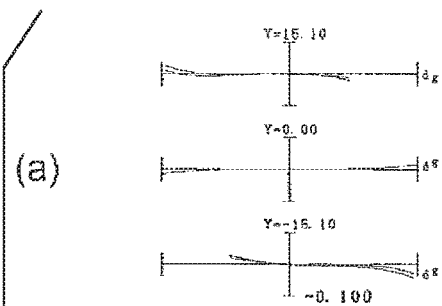
FIG. 36 shows graphs illustrating lateral aberrations of the variable magnification optical system according to Example 12 after image blur correction was performed upon focusing on infinity, wherein parts (a), (b), and (c) are in the wide-angle end state, the intermediate focal length state, and the telephoto end state, respectively.
Figure 36:
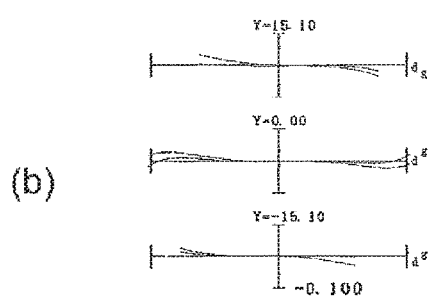
Figure 36:
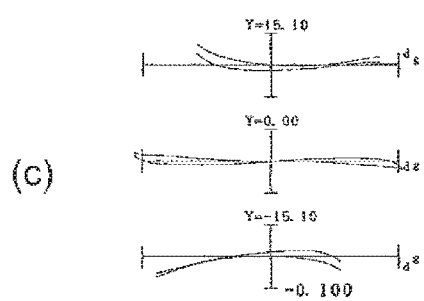

FIG. 35 shows graphs illustrating various aberrations (spherical aberration, astigmatism, distortion, magnification chromatic aberration, and lateral aberration) upon focusing on infinity, of the variable magnification optical system ZL12 according to Example 12, in which part (a) illustrates the wide-angle end state, part (b) illustrates the intermediate focal length state, and part (c) illustrates the telephoto end state. FIG. 36 shows graphs illustrating lateral aberration of the variable magnification optical system ZL12 according to Example 12 when image blur correction is performed upon focusing on infinity, in which part (a) illustrates the wide-angle end state, part (b) illustrates the intermediate focal length state, and part (c) illustrates the telephoto end state. In this example, the optical performance during vibration reduction is illustrated as a lateral aberration graph corresponding to an image height of ±27.10 about the image height y=0.0 as illustrated in FIG. 36.

As is obvious from respective aberration graphs, it is understood that the variable magnification optical system ZL12 according to Example 12 has a satisfactory optical performance such that aberrations are satisfactorily corrected in states ranging from the wide-angle end state to the telephoto end state. Moreover, it is understood that the variable magnification optical system ZL12 has an excellent imaging performance upon image blur correction.

According to the above-described examples, it is possible to implement a variable magnification optical system which has a F-value as bright as approximately F2.8 to F3.5 and a wide angle of view of approximately 50° or more in terms of a half-angle of view, and in which aberrations are corrected satisfactorily.

While the present invention has been described by assigning reference numerals to elements of the embodiment for better understanding of the present invention, the aspect of the present invention is not limited to this. The following content can be appropriately employed within a range where the optical performance of the variable magnification optical system is not diminished.

Although the numbered examples of a four-group configuration, a five-group configuration, and a seven-group configuration have been illustrated as numbered examples of the variable magnification optical system ZL, the present invention is not limited to these and can be applied to other group configurations (for example, a six-group configuration, an eight-group configuration, or the like). Specifically, a configuration in which a lens or a lens group is added at a side closest to the object and a configuration in which a lens or a lens group is added at a side closest to the image may be employed. A lens group having positive or negative refractive power may be added between the first lens group and the second lens group. Furthermore, a lens group which has negative or positive refractive power and of which the position in the direction orthogonal to the optical axis is immovable may be added at an image-plane-side of the vibration-reduction lens group VR (in this case, the distance between the vibration-reduction lens group VR and the lens group which has negative or positive refractive power and of which the position in the direction orthogonal to the optical axis is immovable may be changed or not) upon varying magnification. Moreover, although the fourth lens group G4 in Examples 1 to 3, 5, and 7 to 11 and the sixth lens group G6 in Examples 4, 6, and 12 have been illustrated as an example of the image-side lens group RP having the strongest positive refractive power among the lens groups having a positive refractive power arranged closer to the image side than the vibration-reduction lens group VR, the present invention is not limited to this. The distance between lenses included in the image-side lens group RP may be fixed upon varying magnification. A lens group refers to a portion having at least one lens isolated by air space which changes upon varying magnification or focusing.

The intermediate group is a lens group which is disposed closer to the image side than the second lens group and is disposed at an object-side of the vibration-reduction lens group at a position to face the vibration-reduction lens group. The aperture stop may be disposed at an object-side of the intermediate group at a position to face the intermediate group.

Moreover, as for lenses that form the intermediate group, the positions in the optical axis direction upon varying magnification may be changed integrally, and the lenses may be grouped into two or more lens groups, and the distance between the lens groups may be changed upon varying magnification.

At least a portion of the lenses of the intermediate group may be moved (or fixed) in the optical axis direction integrally with the vibration-reduction lens group upon varying magnification.

In the variable magnification optical system ZL, a portion of a lens group, an entire lens group, or a plurality of lens groups may be moved in the optical axis direction as a focusing lens group in order to perform focusing from an object at infinity to an object at a close distance. Moreover, such a focusing lens group can be applied to autofocus and is also suitable for driving based on an autofocus motor (for example, an ultrasonic motor or the like). Particularly, it is preferable to use at least a portion of the second lens group G2 as the focusing lens group described above.

In the variable magnification optical system ZL, an entire arbitrary lens group or a partial lens group may be moved so as to have a component in the direction vertical to the optical axis or may be rotated (oscillated) in an in-plane direction including the optical axis so as to function as a vibration-reduction lens group VR that corrects image blur occurring due to camera shake or the like. Particularly, it is preferable that at least a portion of an optical system disposed closer to the image side than the intermediate group Gn which is disposed closer to the image side than the aperture stop S and has negative refractive power is used as the vibration-reduction lens group VR. Moreover, in the case of a four- or five-group configuration, it is preferable that at least a portion of the third lens group G3 is used as the vibration-reduction lens group VR. Moreover, in the case of a seven-group configuration, it is preferable that at least a portion of the fifth lens group G5 is used as the vibration-reduction lens group VR. Furthermore, a lens of which the position in the direction orthogonal to the optical axis is fixed may be disposed at an image-side of the vibration-reduction lens group VR, and the lens may be moved or fixed upon varying magnification integrally with the vibration-reduction lens group VR.

In the variable magnification optical system ZL, the lens surface may be formed as a spherical surface or a flat surface and may be formed as an aspherical surface. When the lens surface is a spherical surface or a flat surface, it is possible to facilitate lens processing, assembly, and adjustment and to prevent deterioration of optical performance resulting from errors in the processing, assembly and adjustment. Moreover, deterioration of the rendering performance is little even when the image plane is shifted. When the lens surface is an aspherical surface, the aspherical surface may be an aspherical surface obtained by grinding, a glass-molded aspherical surface obtained by molding glass into an aspherical surface, or a composite aspherical surface obtained by forming a resin on the surface of glass into an aspherical shape. Moreover, the lens surface may be a diffraction surface and may be a refractive index distributed lens (a GRIN lens) or a plastic lens.

In the variable magnification optical system ZL, it is preferable that an aspherical surface is formed on a lens formed of a medium in which the refractive index nd for the d-line is smaller than 70. The lens formed of a medium in which the refractive index nd for the d-line is smaller than 70 is preferably disposed in a lens group having the strongest positive refractive power among the lens groups disposed closer to the image side than the vibration-reduction lens group VR. Moreover, the lens formed of a medium in which the refractive index nd for the d-line is smaller than 70 is more preferably disposed in a lens component disposed closest or the next closest to an object, of the lens group having the strongest positive refractive power among the lens groups disposed closer to the image side than the vibration-reduction lens group VR.

Furthermore, an aspherical surface of the lens formed of a medium in which the refractive index nd for the d-line is smaller than 70 is more preferably a surface located closest to the object plane, of the lens group having the strongest positive refractive power among the lens groups disposed closer to the image side than the vibration-reduction lens group VR.

In the variable magnification optical system ZL, it is preferable that the aperture stop S is disposed between the second lens group and the intermediate group Gn as described above. However, the role of the aperture stop may be substituted by the frame of a lens without providing a separate member as the aperture stop.

In the variable magnification optical system ZL, each lens surface may be coated with an anti-reflection film which has high transmittance in a wide wavelength region in order to decrease flare and ghosting and achieve satisfactory optical performance with high contrast.

The variable magnification ratio of the variable magnification optical system ZL is approximately between 2.0 and 3.5.

EXPLANATION OF NUMERALS AND CHARACTERS

ZL (ZL1 to ZL13) Variable magnification optical system
G1 First lens group
G2 Second lens group
G3 Third lens group
G4 Fourth lens group
VR Vibration-reduction lens group
S Aperture stop
I Image plane
1 Camera (Optical apparatus)

The invention claimed is:

1. A variable magnification optical system comprising:
a first lens group having a negative refractive power;
a second lens group having a positive refractive power;
an intermediate group disposed closer to an image side than the second lens group; and
a vibration-reduction lens group disposed closer to the image side than the intermediate group and configured to be movable so as to have a movement component in a direction orthogonal to an optical axis, wherein
the system performs varying magnification by changing at least the distance between the first lens group and the second lens group and the distance between the second lens group and the intermediate group, and
the system satisfies the following conditional expression:

$$1.500 < f(1 \sim Gn)t/ft < 100.000$$

where
$f(1 \sim Gn)t$: a composite focal length from the first lens group to the intermediate group in a telephoto end state
$ft$: a focal length of the entire system in the telephoto end state.

2. The variable magnification optical system according to claim 1, wherein
the system satisfies the following conditional expression:

$$1.360 < -f(Gn \sim G(VR))w/fw < 5.000$$

where
$f(Gn \sim G(VR))w$: a composite focal length from the intermediate group to the vibration-reduction lens group in a wide-angle end state
$fw$: a focal length of an entire system in the wide-angle end state.

3. The variable magnification optical system according to claim 1, wherein
the system includes an image-side lens group having the strongest positive refractive power among lens groups which are disposed closer to the image side than the vibration-reduction lens group and have positive refractive power,
the distance between the image-side lens group and the vibration-reduction lens group changes upon varying magnification, and the system satisfies the following conditional expression:

$$0.400 < f(RP)/f(FP) < 2.000$$

where
f(RP): a focal length of the image-side lens group
f(FP): a composite focal length in the wide-angle end state, of lenses disposed closer to the image plane side than the first lens group and disposed closer to the object side than the intermediate group.

4. The variable magnification optical system according to claim 1, wherein
the intermediate group has negative refractive power and of which the position in the direction orthogonal to the optical axis is fixed.

5. The variable magnification optical system according to claim 1, wherein
the intermediate group has one or more positive lens components and one or more negative lens components.

6. The variable magnification optical system according to claim 1, wherein
the second lens group includes at least four lens components.

7. The variable magnification optical system according to claim 1, wherein
the second lens group is constituted by, in order from the object, a 2-1st lens group having a positive refractive power and a 2-2nd lens group having a positive refractive power, and
the 2-1st lens group is moved toward the image side as a focusing lens group to perform focusing from an object at infinity to an object at a close distance.

8. An optical apparatus having the variable magnification optical system of claim 1 mounted thereon.

9. A method for manufacturing a variable magnification optical system, wherein
the variable magnification optical system comprises:
a first lens group having a negative refractive power,
a second lens group having a positive refractive power,
an intermediate group disposed closer to an image side than the second lens group, and
a vibration-reduction lens group disposed closer to the image side than the intermediate group and configured to be movable so as to have a movement component in a direction orthogonal to an optical axis;
the system performs varying magnification by changing at least the distance between the first lens group and the second lens group and the distance between the second lens group and the intermediate group; and
the method comprises:
arranging the respective lens groups in a lens barrel so as to satisfy the following conditional expression:

$$1.500 < f(1\sim Gn)t/ft < 100.000$$

where
f(1~Gn)t: a composite focal length from the first lens group to the intermediate group in a telephoto end state
ft: a focal length of the entire system in the telephoto end state.

10. A variable magnification optical system comprising:
a first lens group having a negative refractive power;
a second lens group having a positive refractive power;
an intermediate group disposed closer to an image side than the second lens group; and
a vibration-reduction lens group disposed closer to the image side than the intermediate group and configured to be movable so as to have a movement component in a direction orthogonal to an optical axis, wherein
the system performs varying magnification by changing at least the distance between the first lens group and the second lens group and the distance between the second lens group and the intermediate group,
(i) the second lens group includes at least four lens components and/or (ii) the second lens group is constituted by, in order from the object, a 2-1st lens group having a positive refractive power and a 2-2nd lens group having a positive refractive power with the 2-1st lens group being movable toward the image side as a focusing lens group to perform focusing from an object at infinity to an object at a close distance, and
the system satisfies the following conditional expression:

$$1.000 < f(1\sim Gn)t/ft < 100.000$$

where
f(1~Gn)t: a composite focal length from the first lens group to the intermediate group in a telephoto end state
ft: a focal length of the entire system in the telephoto end state.

11. A variable magnification optical system comprising:
a first lens group having a negative refractive power;
a second lens group having a positive refractive power;
an intermediate group disposed closer to an image side than the second lens group; and
a vibration-reduction lens group disposed closer to the image side than the intermediate group and configured to be movable so as to have a movement component in a direction orthogonal to an optical axis, wherein
the system performs varying magnification by changing at least the distance between the first lens group and the second lens group and the distance between the second lens group and the intermediate group,
the system is constituted by four or five lens groups, and
the system satisfies the following conditional expression:

$$1.000 < f(1\sim Gn)t/ft < 100.000$$

where
f(1~Gn)t: a composite focal length from the first lens group to the intermediate group in a telephoto end state
ft: a focal length of the entire system in the telephoto end state.

12. A variable magnification optical system comprising:
a first lens group having a negative refractive power;
a second lens group having a positive refractive power;
an intermediate group disposed closer to an image side than the second lens group; and
a vibration-reduction lens group disposed closer to the image side than the intermediate group and configured to be movable so as to have a movement component in a direction orthogonal to an optical axis, wherein
the system performs varying magnification by changing at least the distance between the first lens group and the second lens group and the distance between the second lens group and the intermediate group,
the intermediate group is moved integrally with the vibration-reduction lens group upon varying magnification, and
the system satisfies the following conditional expression:

$$1.000 < f(1\sim Gn)t/ft < 100.000$$

where
f(1~Gn)t: a composite focal length from the first lens group to the intermediate group in a telephoto end state ft: a focal length of the entire system in the telephoto end state.

13. A method for manufacturing a variable magnification optical system, wherein
the variable magnification optical system comprises:
a first lens group having a negative refractive power,
a second lens group having a positive refractive power,
an intermediate group disposed closer to an image side than the second lens group, and
a vibration-reduction lens group disposed closer to the image side than the intermediate group and configured to be movable so as to have a movement component in a direction orthogonal to an optical axis;
the system performs varying magnification by changing at least the distance between the first lens group and the second lens group and the distance between the second lens group and the intermediate group; and
the method comprises:
performing at least one of the following steps (A), (B), and (C):
(A) configuring the second lens group such that (i) the second lens group includes at least four lens components or (ii) the second lens group is constituted by, in order from the object, a 2-1st lens group having a positive refractive power and a 2-2nd lens group having a positive refractive power, with the 2-1st lens group being movable toward the image side as a focusing lens group to perform focusing from an object at infinity to an object at a close distance,
(B) configuring the system to be constituted by four or five lens groups,
(C) arranging the intermediate group to be moved integrally with the vibration-reduction lens group upon varying magnification; and
arranging the respective lens groups in a lens barrel so as to satisfy the following conditional expression:

$$1.000 < f(1 \sim Gn)t/ft < 100.000$$

where
f(1~Gn)t: a composite focal length from the first lens group to the intermediate group in a telephoto end state
ft: a focal length of the entire system in the telephoto end state.

* * * * *